US008169367B2

(12) United States Patent
Kuramoto et al.

(10) Patent No.: US 8,169,367 B2
(45) Date of Patent: May 1, 2012

(54) RADIO-FREQUENCY DEVICE, AND RADIO-FREQUENCY TAG COMMUNICATION DEVICE

(75) Inventors: Katsuyuki Kuramoto, Nagoya (JP); Tsuyoshi Ohashi, Hashima (JP); Kazunari Taki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1342 days.

(21) Appl. No.: 11/760,586

(22) Filed: Jun. 8, 2007

(65) Prior Publication Data
US 2007/0279277 A1 Dec. 6, 2007

Related U.S. Application Data

(63) Continuation-in-part of application No. PCT/JP2005/021644, filed on Nov. 25, 2005.

(30) Foreign Application Priority Data

Dec. 13, 2004 (JP) .................................. 2004-360030
Mar. 16, 2005 (JP) .................................. 2005-074517
Aug. 23, 2005 (JP) .................................. 2005-241519

(51) Int. Cl.
*H01Q 3/00* (2006.01)

(52) U.S. Cl. ..................................................... 342/359

(58) Field of Classification Search .................. 342/367, 342/368, 370–372, 377, 450, 463, 465, 359; 340/10.1, 10.3, 10.31–10.34, 572.1, 572.4, 340/572.7; 455/41.2
See application file for complete search history.

(56) References Cited

U.S. PATENT DOCUMENTS

| 6,195,559 | B1 | 2/2001 | Rapeli et al. |
| 2003/0157897 | A1 | 8/2003 | Maeda et al. |
| 2006/0022884 | A1* | 2/2006 | Hayashi et al. ............... 343/757 |
| 2006/0164213 | A1* | 7/2006 | Burghard et al. ............ 340/10.2 |

FOREIGN PATENT DOCUMENTS

| JP | S59-046565 A | | 3/1984 |
| JP | 06174823 A | * | 6/1994 |
| JP | H08-097619 A | | 4/1996 |
| JP | 2000-236205 A | | 8/2000 |
| JP | 2001-509999 A | | 7/2001 |
| JP | 2001-307032 A | | 11/2001 |
| JP | 2002-271229 A | | 9/2002 |
| JP | 2002-368663 A | | 12/2002 |

(Continued)

OTHER PUBLICATIONS

Japan Patent Office; Office Action for Patent Application No. JP2004-360030, mailed Oct. 19, 2010.
Japanese Patent Office, Office Action for Japanese Patent Application No. 2005-074517, mailed Sep. 16, 2008. (partial translation).

(Continued)

*Primary Examiner* — Harry Liu
(74) *Attorney, Agent, or Firm* — Baker Botts L.L.P.

(57) ABSTRACT

A radio-frequency device includes a PAA processing portion configured to control a directivity of reception of a receiver antenna device, a received-signal-strength detecting portion configured to detect a strength of the received signal received by the receiver antenna device, and a direction detecting portion configured to detect the direction toward the communication object, on the basis of a direction in which a higher one of two strength values of the received signal respectively detected in first and second maximum-reception-directivity directions of a predetermined angular difference established by the PAA processing portion is minimal. Accordingly, the direction toward the radio-frequency tag can be suitably detected.

17 Claims, 51 Drawing Sheets

FOREIGN PATENT DOCUMENTS

| | | |
|---|---|---|
| JP | 2003-032139 A | 1/2003 |
| JP | 2003-243921 A | 8/2003 |
| JP | 2004-046904 A | 2/2004 |
| JP | 2004-348559 A | 12/2004 |
| JP | 2005-045384 A | 2/2005 |

OTHER PUBLICATIONS

Japan Patent Office, International Search Report for International Patent Application No. PCT/JP2005/021644, mailed Feb. 14, 2006.

* cited by examiner

PAA WEIGHT REGISTER $W_1 = \cos(\phi) - \sin(\phi)\,i$
$W_0 = 1 + 0\,i$
$W_{-1} = \cos(\phi) + \sin(\phi)\,i$

78

$\left(\begin{array}{l} \text{WHERE } \phi = \Delta/\lambda \cdot 2\pi \\ \quad\quad \Delta = d\cdot\sin\theta \\ \quad\quad \lambda\text{:WAVELENGTH}, \quad d\text{:ELEMENT-TO-ELEMENT DISTANCE} \\ \quad\quad \theta\text{:MAIN LOBE DIRECTION} \end{array}\right)$ θ_HOL = 10° (0° and 20°)

θ_HOL = 15° (5° and 25°)

$\theta_{HOL} = 20°$ (10° and 30°)

Vertical plane

25° and 45°

Vertical plane

25° and 46.5° (COMPENSATED)

TRANSMISSION WEIGHT

FIG. 45

| OPERATION | COMMAND | CODE |
|---|---|---|
| TAG INDENTIFICATION | PING | 0x08 |
| | SCROLL ID | 0x01 |
| WRITING ON TAG | ERASE ID | 0x32 |
| | PROGRAM ID | 0x31 |
| | VERIFY | 0x38 |
| | LOCK | 0x31 |

(a)

(b)

RADIO-FREQUENCY DEVICE, AND RADIO-FREQUENCY TAG COMMUNICATION DEVICE

The present application is a Continuation-in-Part of International Application No. PCT/JP2005/021644 filed Nov. 25, 2005, which claims the benefits of Japanese Patent Application Nos., 2004-360030, 2005-74517, 2005-241519 filed on Dec. 13, 2004, Mar. 16, 2005, and Aug. 23, 2005, respectively; the disclosures of which are incorporated herein by reference.

BACKGROUND OF THE INVENTION

Field of the Invention

The present invention relates to improvements of a radio-frequency device configured to detect a direction toward a desired communication object, according to a signal received from the communication object, and a radio-frequency tag communication device configured to effect radio communication with radio-frequency tags for writing and reading information on and from the radio-frequency tags.

Description of Related Art

As an example of the radio-frequency device for effecting communication with a desired communication object, there is known an RFID (Radio-Frequency Identification) communication system wherein a radio-frequency tag communication device (interrogator) reads out information, in a non-contact fashion, from small-sized radio-frequency tags (transponders) on which desired information is written. In this RFID communication system, the radio-frequency tag communication device is capable of reading out the information from the radio-frequency tags, even where the radio-frequency tags are contaminated or located at positions invisible from the radio-frequency tag communication device. For this reason, the RFID communication system is expected to be used in various fields, such as management and inspection of articles of commodity.

As one form of application of such a radio-frequency tag communication device, there is known a technique to change the directivity of communication between the communication object in the form of the radio-frequency tag and the radio-frequency tag communication device, for thereby detecting the direction toward the radio-frequency tag. For instance, Patent Document 1 discloses a method of reception of a radio-frequency signal, in which the angle of directivity of a directivity-variable antenna device is controlled. In this method, the angular range of directivity of the directivity-variable antenna device is controlled on the basis of a ratio of a desired wave potential and an interference wave potential of the signal received by the directivity-variable antenna device, for suitably detecting the direction toward the communication object in the form of the radio-frequency tag.

As one form of the radio-frequency tag communication device, there is proposed a portable radio-frequency tag communication device (handy scanner) which is movably provided in a desired area of detection such as a room. For example, Patent Document 2 discloses a portable terminal, which is a light-weight and small-sized radio-frequency tag communication device which is easy for the user to carry.

In the above-described radio-frequency tag communication device, the directivity of communication is usually controlled to improve the sensitivity of communication. Various techniques are used to suitably control the directivity of communication. For example, Patent Document 3 discloses a directivity control technique for a radar device. According to this technique, which applies to an array antenna device provided with a plurality of antenna elements and capable of a phased array control, the antenna elements are selectively used for communication, to thereby change distances between the adjacent antenna elements, for thereby controlling the directivity characteristic of the array antenna device, so that the sensitivity of reception is suitably matched over the entire area of detection, without lowering the maximum communication distance and sensitivity.

Patent Document 1: JP-2003-243921 A
Patent Document 2: JP-2001-307032 A
Patent Document 3: JP-6-174823 A Although the conventional technique is advantageous for a reduced amount of calculation in a generally known operation of BFA (Beam Forming Antenna) processing for the directional detection, the conventional technique suffers from a drawback of a low degree of resolution and consequent incapability to accurately detect the direction toward the desired communication object in the form of the radio-frequency tag. On the other hand, there are known other techniques such as MUSIC process and ESPRIT process capable of the directional detection with a high degree of resolution. However, these techniques undesirably requires complicated processing and a large amount of calculation. Namely, there has not yet been developed a technique for the directional detection with a high degree of resolution and with a simple processing operation.

For maximizing the maximum distance of communication of the conventional portable radio-frequency tag communication device, it is considered to control the main lobe direction of a directivity-variable antenna device. However, the state of communication may vary with a change of attitude of the portable radio-frequency tag communication device, for example, when the device is inclined by the user. Accordingly, the conventional portable radio-frequency tag communication device suffers from instability to maintain its optimum state of communication. In this respect, there has been a need for developing a radio-frequency tag communication device capable of optimally controlling the directivity of communication irrespective of the attitude of the device.

In the directivity control of the array antenna device provided with the plurality of antenna elements described above, it is required to increase the number of the antenna elements, for reducing the width of the main lobe to thereby narrow an effective angular range of the directivity of communication, so that the device undesirably tends to be large-sized. Thus, there has been a need for developing a radio-frequency tag communication device which is simple in construction and which has a comparatively high level of directivity of communication.

SUMMARY OF THE INVENTION

The present invention was made in view of the background art described above. It is an object of this invention to provide a radio-frequency device which permits detection of the direction toward the communication object, with a high degree of resolution and with a simple processing. It is another object of this invention to provide a radio-frequency tag communication device capable of optimally controlling the directivity of communication irrespective of the attitude of the device. It is a further object of this invention to provide a radio-frequency tag communication device which is simple in construction and which has a comparatively narrow effective angular range of directivity of communication.

One of the objects described above can be achieved according to a first aspect of the present invention, which provides a radio-frequency device including a receiver antenna device for receiving a received signal from a desired communication object, and configured to detect a direction in which the communication object is located, on the basis of the received signal received by the receiver antenna device, the radio-frequency device being characterized by comprising a reception-directivity control portion configured to control a directivity of reception of the receiver antenna device, a received-signal-strength detecting portion configured to detect a strength of the received signal received by the receiver antenna device, and a direction detecting portion configured to detect the direction in which the communication object is located, on the basis of a direction in which a higher one of two strength values of the received signal respectively detected in first and second maximum-reception-directivity directions of a predetermined angular difference established by the reception-directivity control portion is minimal.

Another of the objects described above can also be achieved according to a second aspect of the present invention, which provides a radio-frequency tag communication device including an antenna device and configured to transmit a transmitted signal toward a radio-frequency tag and receive a reply signal transmitted from the radio-frequency tag in response to the transmitted signal, for thereby effecting radio communication with the radio-frequency tag, the radio-frequency tag communication device being characterized by comprising an attitude sensor device configured to detect an attitude of the antenna device in a predetermined coordinate system, and a directivity control portion configured to control a directivity of communication with the radio-frequency tag, according to the attitude detected by attitude sensor device.

The further object described above can also be achieved according to a third aspect of this invention, which provides a radio-frequency tag communication device configured to transmit an interrogating wave toward a desired radio-frequency tag and to receive a reply wave transmitted from the radio-frequency tag, for thereby effecting radio communication with the radio-frequency tag, said radio-frequency tag communication device being characterized by comprising a directivity control portion configured to change a directivity of transmission of the interrogating wave during a period between moments of initiation and termination of transmission of a unit portion of the interrogating wave, which unit portion permits the radio communication with the radio-frequency tag.

The radio-frequency device according to the first aspect of this invention comprises the reception-directivity control portion configured to control the directivity of reception of the receiver antenna device, the received-signal-strength detecting portion configured to detect the strength of the received signal received by the receiver antenna device, and the direction detecting portion configured to detect the direction in which the communication object is located, on the basis of the direction in which the higher one of the two strength values of the received signal respectively detected in the first and second maximum-reception-directivity directions of a predetermined angular difference established by the reception-directivity control portion is minimal. The direction detecting portion is operated based on a fact that the received signal strength is minimal at the bottom of a gain existing in an area of overlapping of two main lobes extending in the respective two directivity directions of the predetermined angular difference, so that the resolution of detection can be made higher than in the case based on the main lobe direction in which the sensitivity of communication with the communication object is maximum. Accordingly, the direction toward the communication object can be suitably detected. Where the null of the reception directivity pattern is used, the resolution is high with respect to the received signal having a high strength, but is ineffectively low with respect to the received signal having a low strength. In the present radio-frequency device, however, the direction toward the communication object can be suitably detected even where the received signal has a low strength. Namely, the first aspect of the invention provides a radio-frequency device which permits detection of the direction toward the communication object, with a simple processing and a high degree of resolution over a wide range of detection.

In a preferred form of the first aspect of the invention, the direction detecting portion is configured to effect, prior to the above-indicated detection, preliminary detection to detect the direction toward the communication object, on the basis of a direction in which a highest value of the strength of the received signal is detected by the received-signal-strength detecting portion as the maximum-reception-directivity direction in which the directivity of reception is highest is changed at a predetermined angular interval. In this case, it is possible to efficiently obtain an approximate direction toward the communication object, on the basis of the main lobe direction in which the sensitivity of communication with the communication object is maximum.

Preferably, the direction detecting portion is configured to determine initial values of the first and second maximum-reception-directivity directions on the basis of the direction toward the communication object as detected in the preliminary detection. In this case, the approximate direction detected in the preliminary detection is utilized to reduce the time required for the main detection described above.

Preferably, the direction detecting portion is configured to repeat the main detection as the first and second maximum-reception-directivity directions are changed at a predetermined angular interval. In this case, the direction toward the communication object can be practically detected.

Preferably, the receiver antenna device consists of at least two antenna elements, so that the directivity of reception of the receiver antenna device can be easily controlled.

Preferably, the receiver antenna device is an array antenna device consisting of the at least two antenna elements, so that the directivity of reception of the receiver antenna device can be easily controlled.

Preferably, the radio-frequency device further comprises a received-signal memory portion for storing the received signals received by the receiver antenna device. In this case, the received signals can be easily combined together into a composite signal to be subjected to the operation of the reception-directivity control portion.

Preferably, the direction detecting portion is configured to compensate an angle formed between the first and second maximum-reception-directivity directions such that the angle formed between the first and second maximum-reception-directivity directions increases with an increase of an angle formed between a reference direction and a predetermined original direction that are used for determining the first and second maximum-reception-directivity directions. In this case, the direction in which the communication object is located can be more accurately detected.

Preferably, the radio-frequency device comprises a transmitter antenna device for transmitting a predetermined signal to the communication object. In this case, the direction toward the communication object can be suitably detected by transmitting the predetermined signal, even where the communication object is a passive tag, for example.

Preferably, the reception-directivity control portion is configured to set an initial value of the directivity of reception of the receiver antenna device such that the initial value corresponds to a direction in which a directivity of transmission of the signal to be transmitted from the transmitter antenna device is maximum. In this case, the initial value of the directivity of reception can be suitably determined.

Preferably, the radio-frequency device further comprises a transmission-directivity control portion configured to control a directivity of transmission of the signal to be transmitted from the transmitter antenna device (86). In this case, the direction toward the communication object can be suitably detected, even where the communication object is relatively distant from the radio-frequency device.

Preferably, the transmission-directivity control portion is configured to control the directivity of transmission independently of the directivity of reception. In this case, at least one of the directivity of transmission and the directivity of reception can be suitably controlled.

Preferably, the transmission-directivity control portion is configured to control the directivity of transmission such that the directivity of transmission is coincident with the directivity of reception. In this case, the radio communication with the communication object can be suitably effected.

Preferably, the transmission-directivity control portion is configured to control the directivity of transmission such that the controlled directivity of transmission is aligned with a direction of a centerline between the first and second maximum-reception-directivity directions. In this case, the radio communication with the communication object can be suitably effected.

The radio-frequency tag communication device according to the second aspect of this invention comprises the attitude sensor device configured to detect the attitude of the antenna device in the predetermined coordinate system, and the directivity control portion configured to control the directivity of communication with the radio-frequency tag, according to the attitude detected by the attitude sensor device. Accordingly, the direction of the main lobe of the antenna device is kept in the predetermined direction, irrespective of a change of the attitude of the radio-frequency tag communication device. Namely, the second aspect of the invention provides the radio-frequency tag communication device capable of optimally controlling the directivity of communication irrespective of its attitude.

In a preferred form of the second aspect of the invention, the radio-frequency tag communication device is a portable device movable in a predetermined area. Although the attitude of the portable device is likely to vary during use by the user, the maximum directivity of communication is obtained in the desired direction irrespective of the attitude of the portable device.

Preferably, the attitude sensor device includes an inclination sensor configured to detect an angle of inclination of the antenna device with respect to a gravity direction. In this case, the maximum directivity of communication is obtained in the desired direction irrespective of the attitude of the radio-frequency tag communication device with respect to the gravity direction.

Preferably, the attitude sensor device includes an azimuth sensor configured to detect an angle of inclination of the antenna device with respect to a geomagnetic direction. In this case, the maximum directivity of communication is obtained in the desired direction irrespective of the attitude of the radio-frequency tag communication device with respect to the geomagnetic direction.

Preferably, the directivity control portion is configured to control directivity of communication such that the controlled directivity of communication is maximized in a predetermined one direction. In this case, the maximum directivity of communication is obtained in the predetermined one direction, irrespective of the attitude of the radio-frequency tag communication device.

Preferably, the directivity control portion is configured to control the directivity of communication such that the controlled directivity of communication is maximized in a selected one of a plurality of predetermined directions. In this case, the directivity of communication with a selected one of a plurality of radio-frequency tags is controlled to maximize the sensitivity of communication in the corresponding one of the plurality of predetermined directions, irrespective of the attitude of the radio-frequency communication device.

Preferably, the radio-frequency tag communication device further comprises a selector device configured to selectively enable or disable the directivity control portion to control the directivity of communication. In this case, the control of the directivity of communication according to a change of the attitude of the radio-frequency tag communication device can be easily inhibited if this control is not necessary.

Preferably, the antenna device includes a plurality of antenna elements commonly used to transmit the transmitted signal and receive the reply signal. In this case, the directivity of communication can be suitably controlled with the antenna device which is simple in construction.

Preferably, the antenna elements include at least three antenna elements having a directivity of communication in a predetermined one direction. In this case, the directivity of communication can be practically controlled.

Preferably, the antenna device includes five antenna elements the directivity of which is controllable with respect to a gravity direction and a geomagnetic direction, the five antenna elements including one antenna element commonly used for the gravity and geomagnetic directions. In this case, the directivity of communication can be practically controlled with respect to the gravity direction and the geomagnetic direction.

Preferably, the radio-frequency tag communication device is a portable device comprising a display portion configured to display images relating to the communication with the radio-frequency tag, and a holder portion at which the radio-frequency tag communication device is held for carrying, the display portion and the holder portion being hinged to each other pivotally foldably, and wherein the above-indicated selector device is disposed on said holder portion. This portable radio-frequency tag communication device can be practically used.

Preferably, the radio-frequency tag communication device is capable of writing desired information on the radio-frequency tag, and the above-indicated selector device enables the directivity control portion to control the directivity of communication upon writing of the desired information on the radio-frequency tag. In this case, the maximum directivity of communication is obtained in the desired direction, upon writing of the desired information on the radio-frequency tag, which writing requires a relatively large amount of electric energy and accordingly requires a relatively accurate control of the directivity of communication.

The radio-frequency tag communication device according to the third aspect of this invention comprises the directivity control portion configured to change a directivity of transmission of the interrogating wave during a period between moments of initiation and termination of transmission of a unit portion of the interrogating wave, which unit portion permits the radio communication with the radio-frequency tag. In this radio-frequency tag communication device, the effective angular range of the directivity of communication with the radio-frequency tag can be set to correspond to an overlapping area of communications effected before and after a change of the directivity of transmission of the unit portion of the interrogating wave. Namely, the third aspect of the invention provides the radio-frequency tag communication device which is simple in construction and which has a comparatively narrow effective angular range of directivity of communication.

In one preferred form of the third aspect of this invention, the directivity control portion changes the directivity of transmission of the interrogating wave during the period between the moments of initiation and termination of transmission of the unit portion of the interrogating wave, such that effective areas of communication corresponding to the directivity of transmission before and after a change of the directivity of communication partially overlap each other. In this case, the effective angular range of the directivity of communication with the radio-frequency tag can be set to correspond to an overlapping area of communications effected before and after the change of the directivity of transmission of the unit portion of the interrogating wave.

Preferably, the directivity control portion changes the directivity of transmission such that an overlapping area of communications before and after the change of the directivity of transmission is narrower than a sum of the effective area of communication corresponding to the directivity of transmission before the change and the effective area of communication corresponding to the directivity of transmission after the change. In this case, the effective angular range of the directivity of communication with the radio-frequency tag can be practically set.

Preferably, the directivity control portion is capable of changing an overlapping area of communications before and after the change of the directivity of transmission. In this case, the effective angular range of the directivity of communication with the radio-frequency tag can be set as desired depending upon a specific manner of communication with the radio-frequency tag.

Preferably, the interrogating wave includes a command portion including a command for radio communication with the radio-frequency tag, and a non-command portion not including the command. In this case, the radio-frequency tag communication device which is simple in construction has a comparatively narrow effective angular range of directivity of communication, where the commonly used interrogating wave is used for the radio communication with the radio-frequency tag.

Preferably, the directivity control portion changes the directivity of transmission of the interrogating wave during the period between the moments of initiation and termination of transmission of the above-indicated command portion. In this case, a reply wave is received from only the radio-frequency tag which has received the entirety of the command portion, so that the effective angular range of the directivity of communication or effective area of communication with the radio-frequency tag can be set to correspond to the overlapping area of communications effected before and after the change of the directivity of transmission of the unit portion of the interrogating wave.

Preferably, the directivity control portion changes the directivity of transmission of the interrogating wave during a period of initiation and termination of transmission of the non-command portion, after the transmission of said command portion. In this case, the reply wave is transmitted from only the radio-frequency tag which has received the non-command portion as an electric power supply source after the reception of the entirety of the command portion. Accordingly, the effective angular range of the directivity of communication with the radio-frequency tag can be set to correspond to the overlapping area of communications effected before and after the change of the directivity of transmission of the unit portion of the interrogating wave.

Preferably, the directivity control portion changes the directivity of transmission of the interrogating wave at a moment of switching from the transmission of the command portion to the transmission of the non-command portion. In this case, the reply wave is transmitted from only the radio-frequency tag which has received the non-command portion as the electric power supply source after the reception of the entirety of the command portion. Accordingly, the effective angular range of the directivity of communication with the radio-frequency tag can be set to correspond to the overlapping area of communications effected before and after the change of the directivity of transmission of the unit portion of the interrogating wave. In addition, the communication is less likely to be adversely influenced by a noise or any other phenomenon caused by the switching.

Preferably, the directivity control portion changes the directivity of transmission of the interrogating wave when a predetermined time has passed after the moment of termination of the unit portion of the interrogating wave. In this case, the effective angular range of the directivity of communication with the radio-frequency tag can be set to correspond to the overlapping area of communications effected before and after the change of the directivity of transmission of the unit portion of the interrogating wave, by suitably determining the predetermined time.

Preferably, the directivity control portion changes a direction of a main lobe of the directivity of transmission of the interrogating wave, during the period between the moments of initiation and termination of the unit portion of the interrogating wave. In this case, the overlapping area of communications effected before and after the change of the directivity of transmission of the unit portion of the interrogating wave can be practically changed as desired.

Preferably, the directivity control portion changes a characteristic of directivity of transmission of the interrogating wave during the period between the moments of initiation and termination of transmission of the unit portion of the interrogating wave. In this case, the overlapping area of communications effected before and after the change of the directivity of transmission of the unit portion of the interrogating wave can be practically changed as desired.

Preferably, the radio-frequency tag communication device is configured to change an electric energy of transmission of the interrogating wave during the period between the moments of initiation and termination of transmission of the unit portion of said interrogating wave. In this case, the overlapping area of communications effected before and after the change of the directivity of transmission of the unit portion of the interrogating wave can be practically changed as desired.

Preferably, the directivity control portion changes the directivity of transmission of the interrogating wave during the period between the moments of initiation and termination of transmission of the unit portion of the interrogating wave, such that directions in which the directivity of transmission is maximum before and after a change of the directivity of transmission are symmetrical with each other with respect to an axis indicative of a predetermined reference direction. In this case, the overlapping area of communications effected before and after the change of the directivity of transmission of the unit portion of the interrogating wave can be practically changed with respect to the predetermined reference direction.

Preferably, the predetermined reference direction is a direction of a man lobe of a directivity of reception of the reply wave transmission from the radio-frequency tag in response to the interrogating wave. In this case, the overlapping area of communications effected before and after the change of the directivity of transmission of the unit portion of the interrogating wave can be practically changed with respect to the direction in which the reply wave is received from the radio-frequency tag.

Preferably, the directivity control portion changes the directivity of transmission of the interrogating wave during the period between the moments of initiation and termination of transmission of the unit portion of the interrogating wave, such that directions in which the directivity of transmission is maximum before and after a change of the directivity of transmission are symmetrical with each other with respect to an axis indicative of a predetermined reference direction, the directivity control portion changing said reference direction each time the interrogating wave is transmitted toward the radio-frequency tag. In this case, the overlapping area of communications effected before and after the change of the directivity of transmission of the unit portion of the interrogating wave can be practically changed with respect to the predetermined reference direction, and the direction in which the radio-frequency tag exists can be suitably detected, by gradually changing the reference direction.

Preferably, the directivity control portion changes the directivity of transmission of the interrogating wave after a moment of initiation of reception of the reply wave from the radio-frequency tag in response to the interrogating wave, such that a direction of a man lobe of the directivity of transmission is parallel to the predetermined reference direction. In this case, the direction of the main lobe of the directivity of transmission is made coincident with the direction in which the radio-frequency tag to be detected is located, so that the radio-frequency tag can be suitably supplied with an electric energy.

Preferably, the directivity control portion changes the directivity of transmission of the interrogating wave after a moment of initiation of reception of the reply wave from the radio-frequency tag in response to said interrogating wave, such that a main lobe of the directivity of transmission is substantially coincident with the overlapping area of communications before and after the change of the directivity of transmission. In this case, the direction of the main lobe of the directivity of transmission is made coincident with the direction in which the radio-frequency tag to be detected is located, so that the radio-frequency tag can be suitably supplied with an electric energy.

Preferably, said directivity control portion changes the directivity of transmission of the interrogating wave such that an area of overlapping of main lobes of the directivity of transmission before and after a change of the directivity of transmission of the unit portion of the interrogating wave is narrowed each time the interrogating wave is transmitted toward the radio frequency tag. In this case, the direction in which the radio-frequency tag exists can be suitably detected, by narrowing the effective angular range of the directivity of communication with the radio-frequency tag.

BRIEF DESCRIPTION OF THE DRAWING

FIG. 45 is a view indicating commands used for radio communication with the radio-frequency tag circuit element of FIG. 3;

NOMENCLATURE OF REFERENCE SIGNS

Figure 1:
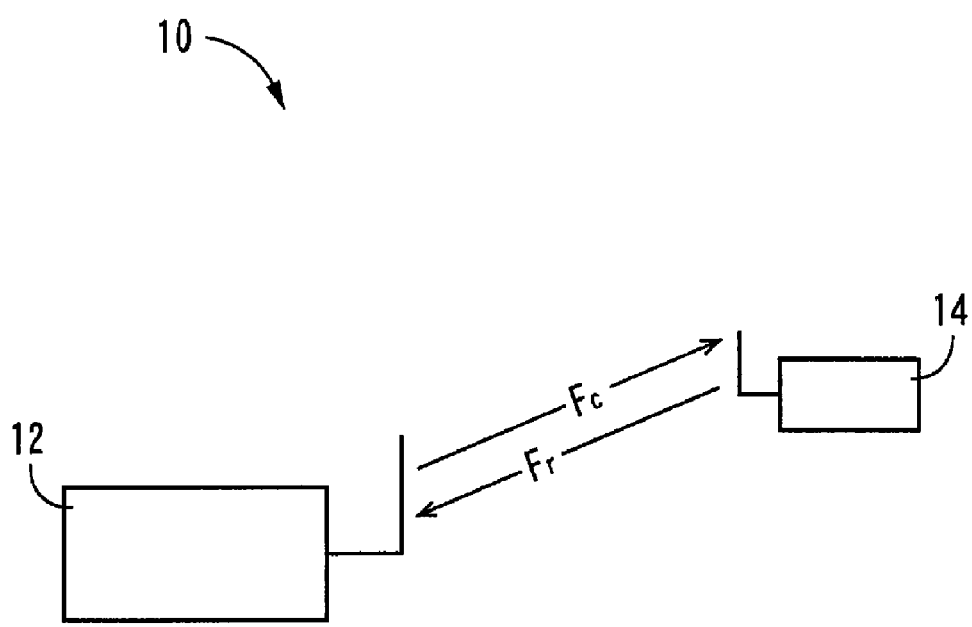
FIG. 1 is a view for explaining a radio-frequency tag communication system in which a radio-frequency device according to a first aspect of the present invention is suitably used.

10: Communication system, 12, 80: Radio-frequency tag communication device (Radio-frequency device), 14: Radio-frequency tag (Communication object), 16: DSP, 18: Transmitted-signal D/A converting portion, 20: Frequency-converting-signal generating portion, 22: Up converter, 24: Transmitter antenna elements, 26, 86: Transmitter antenna device, 28: Receiver antenna elements, 30: Receiver antenna device, 32: Down converter, 34: Received-signal A/D converting portions, 36: Memory portion (Received-signal memory portion), 38: Transmitted-bit-string generating portion, 40: FSK encoding portion, 42: AM modulating portion, 44: PAA processing portion (Reception-directivity control portion), 46: AM demodulating portion, 48: FSK decoding portion, 50: Reply-bit-string interpreting portion, 52: Received-signal-strength detecting portion, 54, 90: Direction detecting portion, 56: PAA weight control portion, 58: PAA weight multiplying portions, 60: Received-signal combining portion, 61: Radio-frequency tag circuit element, 62: Antenna portion, 64: IC-circuit portion, 66: Rectifying portion, 68: Power source portion, 70: Clock extracting portion, 72: Memory portion, 74: Modulating/demodulating portion, 76: Control portion, 78: PAA weight register, 82: Memory portion, 84: Transmission PAA weight multiplying portions, 88: PAA processing portion (Reception-directivity control portion, Transmission-directivity control portion, 92: Yagi antenna device, 94: Directivity control device, 96, 98: Antenna unit (Receiver antenna device), 112, 206: Radio-frequency tag communication device, 116: Display portion, 118: Holder portion, 120: Operator's control portion, 120*s*: Selector pushbutton (Selector device), 122: Shaft portion, 124: Transmitted-bit-string generating portion, 126: FSK encoding portion, 128: AM modulating portion, 130: Transmitted-signal memory portion, 132: Transmission weight multiplying portion, 134: Transmission PAA weight control portion (Directivity control portion), 136: Vertical array antenna device, 138: Vertical antenna elements, 140: Horizontal array antenna device, 142: Horizontal antenna elements, 144: Local-signal generating portion, 146: High-frequency-wave transmitter/receiver portions, 148: Switching portion, 150: Received-signal memory portion, 152: Reception weight multiplying portion, 154: Reception PAA weight multiplying portion (Directivity control portion), 156: AM demodulating portion, 158: FSK decoding portion, 160: Reply-bit-string interpreting portion, 162: Gravity sensor (Inclination sensor), 164: Geomagnetic sensor (Direction sensor), 166: Inclination detecting portion, 168: Inclination-information memory portion, 170: Multipliers, 172: Transmitted-signal D/A converting portion, 174: Up converter, 176: Transmitted-signal amplifier, 178: Directional coupler, 180: Received-signal amplifier, 182: Down converter, 184: Received-signal A/D converting portion, 186: Multipliers, 208: Received-signal-strength detecting portion, 312: Radio-frequency tag communication device, 320: Command-bit-string generating portion, 322: Encoding portion, 324: AM modulating portion, 326: Transmitter memory portion, 328: Transmission weight multiplying portion, 330: Antenna elements, 332: Local-signal oscillator, 334: High-frequency-wave transmitter/receiver portion, 336: Reception memory portion, 338: Reception weight multiplying portion, 340: AM demodulating portion, 342: Decoding portion, 344: Reply-bit-string interpreting portion, 346: PAA weight control portion (Directivity control portion), 348: Multiplier, 350: Transmitted-signal D/A converting portion, 352: Up converter, 354: Transmitted-signal amplifier, 356: Directional coupler, 358: Received-signal amplifier, 360: Down converter, 362: Received-signal A/D converter, 364: Multiplier, 366: Combiner

DETAILED DESCRIPTION OF THE PREFERRED EMBODIMENTS

Referring to the drawings, preferred embodiments of this invention will be described in detail.
Embodiment 1

FIG. 1 is a view for explaining a radio-frequency tag communication system 10 in which a radio-frequency device according to a first aspect of the present invention is suitably used. This radio-frequency tag communication system 10 is a so-called "RFID (Radio-Frequency Identification) system consisting of a radio-frequency tag communication device 12 constructed according to one embodiment of the first aspect of the invention, and at least one radio-frequency tag 14 (one radio-frequency tag in this embodiment each of which is a communication object with which the radio-frequency tag communication device 12 is provided for radio communication. In the RFID system, the radio-frequency tag communication device 12 functions as an interrogator, while the radio-frequency tag 14 functions as a transponder. Described in detail, the radio-frequency tag communication device 12 is arranged to transmit an interrogating wave $F_c$ (transmitted signal) toward the radio-frequency tag 14, and the radio-frequency tag 14 which has received the interrogating wave $F_c$ modulates the received interrogating wave $F_c$ according to a predetermined information signal (data) to generate a reply wave $F_r$ (reply signal) to be transmitted toward the radio-frequency tag communication device 12, whereby radio communication is effected between each radio-frequency tag communication device 12 and the radio-frequency tag 14.

Figure 2:
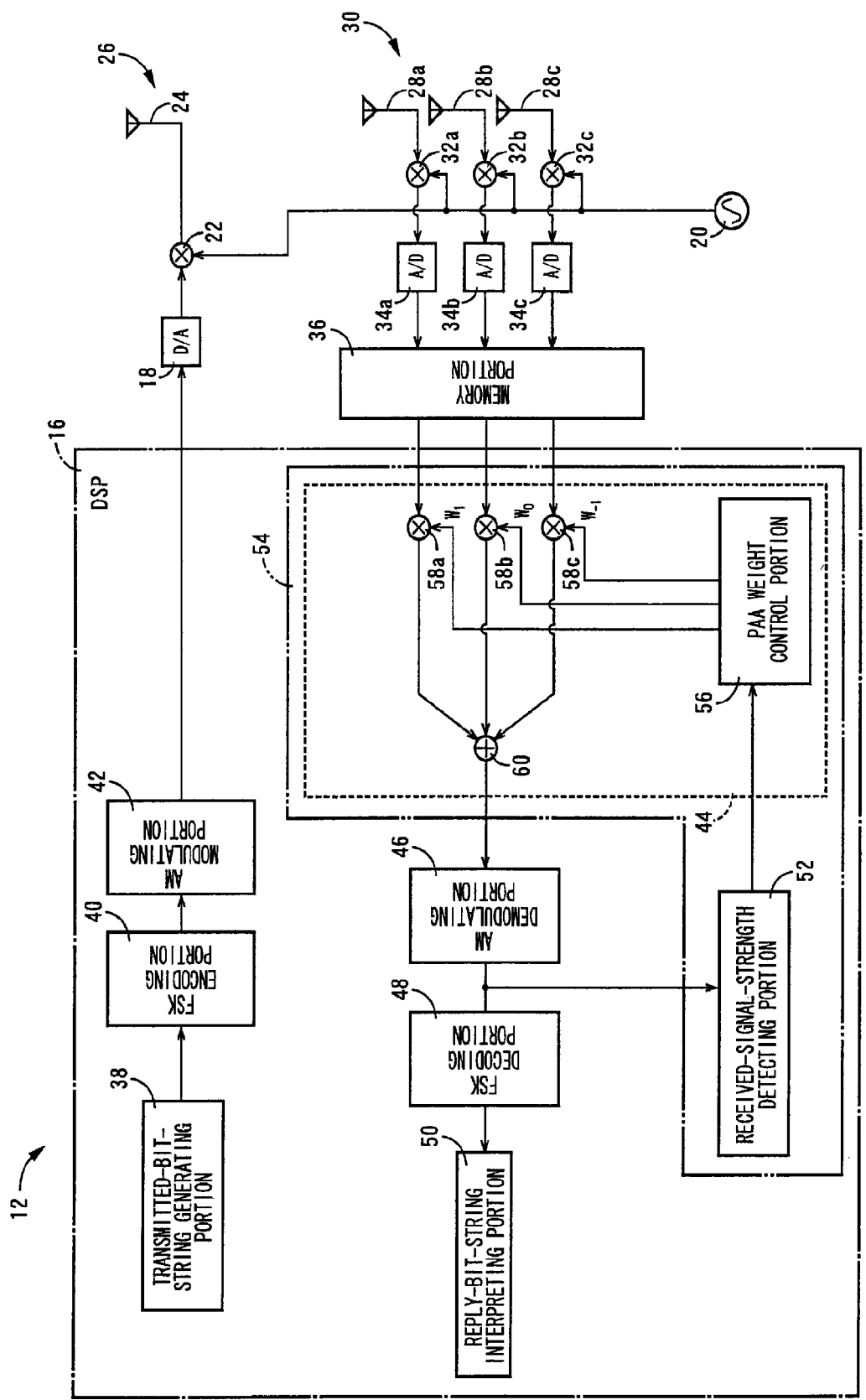
FIG. 2 is a view for explaining an arrangement of one embodiment of the radio-frequency device in the form of a radio-frequency tag communication device according to the first aspect of the invention.

FIG. 2 is a view for explaining an arrangement of the radio-frequency tag communication device 12. As shown in FIG. 2, the radio-frequency tag communication device 12 is arranged to effect radio communication with the radio-frequency tag 14, for writing information on the radio-frequency tag 14, for detecting the direction in which the radio-frequency tag 14 is located, and for other purposes. The radio-frequency tag communication device 12 includes: a DSP (Digital Signal Processor) 16 configured to effect digital signal processing operations to transmit a digital transmitted signal and to demodulate a reply signal received from the radio-frequency tag 14; a transmitted-signal D/A converting portion 18 configured to convert the transmitted signal received from the DSP 16, into an analog signal; a frequency-converting-signal generating portion 20 configured to generate a predetermined frequency converting signal; an up converter 22 configured to increase the frequency of the analog transmitted signal received from the transmitted-signal D/A converting portion 18, by an amount equal to the frequency of the frequency converting signal generated by the frequency-converting-signal generating portion 20; a transmitter antenna device 26 having a transmitter antenna element 24 for transmitting, as the interrogating wave $F_c$, the transmitted signal received from the up converter 22, toward the radio-frequency tag 14; a receiver antenna device 30 having a plurality of (three in the example of FIG. 2) receiver antenna elements 28a, 28b and 28c (hereinafter collectively referred to as "receiver antenna elements 28", unless otherwise specified) for receiving the reply wave $F_r$ transmitted from the radio-frequency tag 14 in response to the interrogating wave $F_c$; a plurality (three in the example of FIG. 2) of down converters 32a, 32b and 32c (hereinafter collectively referred to as "down converters 32", unless otherwise specified) configured to reduce the frequencies of received signals received by those receiver antenna elements 28, by an amount equal to the frequency of the frequency converting signal generated by the frequency-converting-signal generating portion 20; a plurality of (three in the example of FIG. 2) received-signal A/D converting portions 34a, 34b and 34c (hereinafter referred to collectively as "received-signal AID converting portions 34", unless otherwise specified) configured to convert the received signals received from the down converters 32, into digital signals; and a memory portion 36 configured to store the digital received signals received from the received-signal A/D converting portions 34 and to apply the digital received signals to the DSP 16, according to a command received from the DSP 16.

The DSP 16 described above is a so-called microcomputer system incorporating a CUP, a ROM and a RAM and configured to be operable to perform signal processing operations according to programs stored in the ROM, while utilizing a temporary data storage function of the RAM. The DSP 16 has functional portions including: a transmitted-bit-string generating portion 38 configured to generate a string of command bits corresponding to the transmitted signal to be transmitted to the radio-frequency tag 14; an FSK encoding portion 40 configured to encode the digital signal received from the transmitted-bit-string generating portion 38, according to an FSK method, for example; an AM modulating portion 42 configured to modulate the digital signal encoded by the FSK encoding portion 40, according to an AM method, and to apply the modulated digital signal to the transmitted-signal D/A converting portion 18; a PAA (Phased Array Antenna) processing portion 44 configured to effect a phased-array processing operation by multiplying the received signal received by each of the plurality of receiver antenna elements 28, by a suitable weight; an AM demodulating portion 46 configured to demodulate the received signals subjected to the phased-array processing operation by the PAA processing portion 44, according to the AM method, for obtaining an AM-demodulated wave; an FSK decoding portion 48 configured to decode the AM-demodulated wave received from the AM demodulating portion 46, according to the FSK method; a reply-bit-string interpreting portion 50 configured to interpret the decoded signal received from the FSK decoding portion 48, for thereby reading an information signal modulated by the radio-frequency tag 14; a received-signal-strength detecting portion 52 configured to detect the strength of the received signals on the basis of the AM-demodulated wave received from the AM demodulating portion 46; and a direction detecting portion 54 configured to detect the direction in which the communication object in the form of the radio-frequency tag 14 is located, on the basis of the strength of the received signals detected by the received-signal-strength detecting portion 52. It is noted that the radio-frequency tag communication device 12 may include an encoding portion configured to encode the digital signal received from the transmitted-bit-string generating portion 38, according to a pulse-width modulating method, and a decoding portion configured to decode the pulse-width modulated signal. The radio-frequency tag communication device 12 may employ other encoding and decoding methods such as ASK (Amplitude Shift Keying), PSK (Phase Shift Keying) and OOK (On Off Keying) methods, for radio communication between the tag and the reader/writer.

The PAA processing portion 44 includes: a PAA weight control portion 56 configured to calculate a PAA weight to be given to each of the received signals received by the plurality of receiver antenna elements 28, on the basis of the strength of the received signals detected by the received-signal-strength detecting portion 52; a plurality of (three in the example of FIG. 2) reception PAA weight multiplying portions 58a, 58b and 58c (hereinafter collectively referred to as "reception PAA weight multiplying portions "58", unless otherwise specified) configured to multiply the received signals received by the plurality of receiver antenna elements 28, by respective PAA weights calculated by the PAA weight control portion 56; and a received-signal combining portion 60 configured to combine together (to sum up) the received signals multiplied by the PAA weights by the reception PAA weight multiplying portions 58, and to apply a sum of the received signals to the AM demodulating portion 46. The PAA processing portion 44 is arranged to control the directivity of reception during radio communication with the radio-frequency tag 14. Namely, the PAA processing portion 44 is a reception-directivity control portion configured to control the directivity of reception of the receiver antenna 30.

Figure 3:
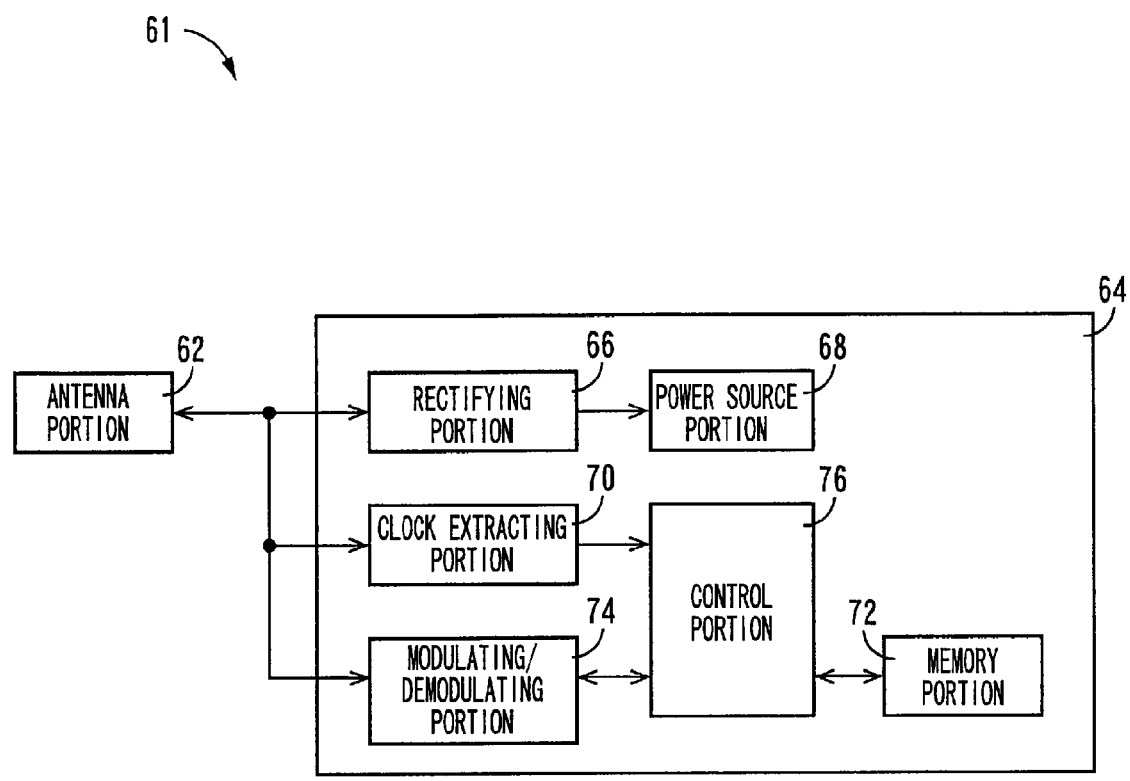
FIG. 3 is a view for explaining an arrangement of a circuit element of a communication object in the form of a radio-frequency tag with which the radio-frequency tag communication device of FIG. 2 is provided to effect radio communication.

FIG. 3 is a view for explaining an arrangement of a circuit element 61 provided in the radio-frequency tag 14. As shown in FIG. 3, the circuit element 61 of the radio-frequency tag 14 includes an antenna portion 62 for signal transmission and reception to and from the radio-frequency tag communication device 12, and an IC-circuit portion 64 for processing signals received by the antenna portion 62. The IC-circuit portion 64 includes as functional portions thereof a rectifying portion 66 configured to rectify the interrogating wave $F_c$ received by the antenna portion 62 from the radio-frequency tag 12; a power source portion 68 for storing an energy of the interrogating wave $F_c$ rectified by the rectifying portion 66; a clock extracting portion 70 for extracting a clock signal from the carrier wave received by the antenna portion 62, and applying the extracted clock signal to a control portion 76; a memory portion 72 functioning as an information memory portion capable of storing desired information signals; a modulating/demodulating portion 74 connected to the antenna portion 62 and configured to perform signal modulation and demodulation; and the above-indicated control portion 76 configured to control the operation of the radio-frequency tag 14 via the above-described rectifying portion 66, clock extracting portion 70 and modulating/demodulating portion 74. The control portion 76 perform basic controls such as a control operation to store the desired information in the memory portion 72, as a result of the radio communication with the radio-frequency tag communication device 12, and a control operation to control the modulating/demodulating portion 74 for generating the reply wave $F_r$ by modulating the interrogating wave $F_c$ received by the antenna portion 62, on the basis of the information signal stored in the memory portion 72, and to transmit the generated reply wave $F_r$ as a reflected signal from the antenna portion 62.

Figure 4:
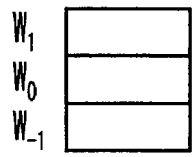
FIG. 4 is a view illustrating a PAA weight register provided in a PAA processing portion of the radio-frequency tag communication device of FIG. 2.
Figure 4:
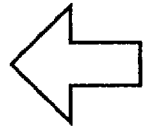

FIG. 4 is a view illustrating a PAA weight register 78 provided in the PAA processing portion 44. This PAA weight register 78 stores calculated PAA weights $W_1$, $W_0$ and $W_{-1}$ used by the respective PAA weight multiplying portions 58a, 58b and 58c. The PAA processing portion 44 is arranged to read out the PAA weights $W_1$, $W_0$ and $W_{-1}$ from the PAA weight register 78, and to apply the PAA weights $W_1$, $W_0$ and $W_{-1}$ to the respective PAA weight multiplying portions 58a, 58b and 58c, so that the received signals are multiplied by the respective PAA weights $W_1$, $W_0$ and $W_{-1}$. As shown in FIG. 4, the PAA weight $W_1$ used by the PAA weight multiplying portion 58a is calculated according to the following equation (1), and the PAA weight $W_0$ used by the PAA weight multiplying portion 58b is calculated according to the following equation (2), while the PAA weight $W_{-1}$ used by the PAA weight multiplying portion 58c is calculated according to the following equation (3). In these equations (1)-(3),"φ" and "Δ" are represented by the following equations (4) and (5), respectively, and "λ", "d" and "θ" represent a wavelength, an element-to-element distance and a main lobe direction. The PAA weight register 78 may have a table indicative of weights which correspond to respective directivity values and which are to be used for the respective receiver antenna elements 28. A set of the above-indicated equations for calculating the PAA weights $W_1$, $W_0$ and $W_{-1}$ is an example in which the PAA weight $W_0$ is used as a reference, and the PAA weights $W_1$ and $W_{-1}$ are determined on the basis of the reference. However, the PAA weights are not limited to the $W_1$, $W_0$ and $W_{-1}$.

$$W1=\cos(\phi)-\sin(\phi)i \tag{1}$$

$$W0=1+0i \tag{2}$$

$$W-1=\cos(\phi)+\sin(\phi)i \tag{3}$$

$$\phi=2\pi\cdot\Delta/\lambda \tag{4}$$

$$\Delta=-\sin\theta \tag{5}$$

Figure 5:
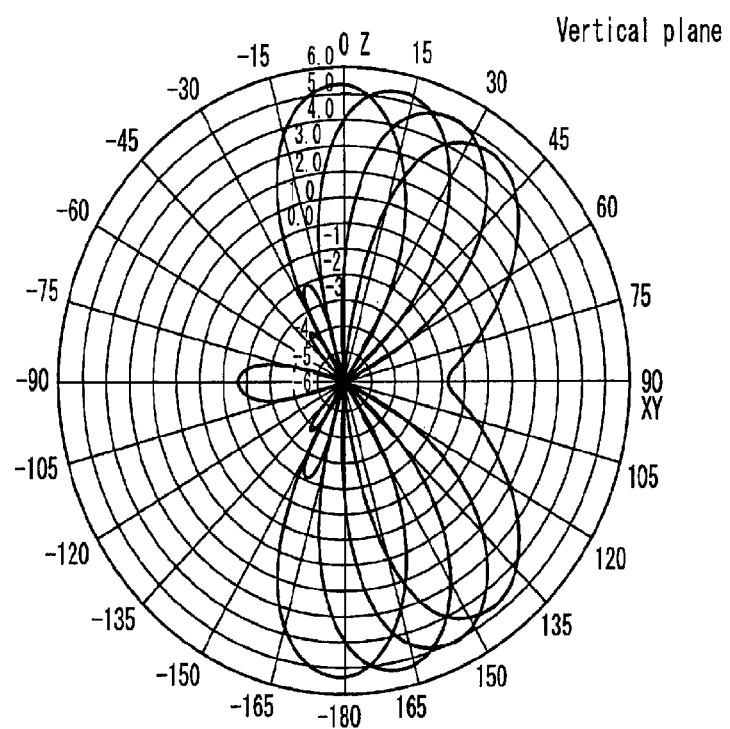
FIG. 5 is a view for explaining a change of a main lobe with a change of directivity of reception by the PAA processing portion of the radio-frequency tag communication device of FIG. 2, such that the direction of the main lobe is changed at an angular interval of 15° between 0° and 45°.
Figure 6:
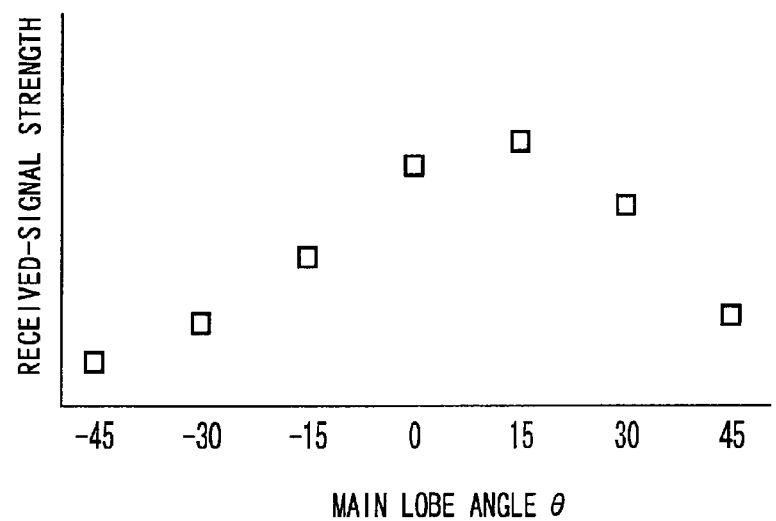
FIG. 6 is a view indicating a change of a strength of a received signal detected in the direction of the main lobe when the direction of the main lobe is changed at the angular interval of 15° between −45° and 45° by the PAA processing portion of the radio-frequency tag communication device of FIG. 2.

FIG. 5 is a view for explaining a change of a main lobe with a change of directivity of reception by the PAA processing portion 44 such that the direction of the main lobe is changed at an angular interval of 15° between 0° and 45°. In a directivity pattern as shown in FIG. 5, an area in which the sensitivity of communication is highest is generally called a main lobe, and the other areas having maximal values of sensitivity of communication are generally called side lobes, while a point of a minimal value of sensitivity of communication located between the lobes is generally called a null point. The direction detecting portion 54 described above is arranged to effect preliminary detection of the direction toward the communication object, prior to main detection. In the preliminary detection, the direction (maximum-reception-directivity direction) in which the directivity of reception is highest is changed at a predetermined angular interval (at an angular interval of 15°, for example), and the strength of the received signals is detected by the received-signal-strength detecting portion 52, so that the direction in which the communication object is located is detected on the basis of the direction in which the highest strength is detected. Described in detail, the angle θ representative of the direction of the main lobe is changed by the PAA processing portion 44, and the strength of the reply signal received from the radio-frequency tag 14 in each direction of the main lobe, by the received-signal-strength detecting portion 52 as the angle θ is changed. Thus, the direction in which the communication object in the form of the radio-frequency tag 14 is located can be roughly detected. Since the direction toward the radio-frequency tag 14 cannot be detected accurately due to a low degree of resolution in the preliminary detection by controlling the direction of the main lobe. However, the preliminary detection can be effectively used to efficiently determine whether the radio-frequency tag is present or not, and to efficiently obtain an approximate direction toward the radio-frequency tag 14. FIG. 6 is a view indicating a change of the strength of the received signals detected in the direction of the main lobe when the direction of the main lobe is changed at the angular interval of 15° between −45° and 45°. It will be understood from FIG. 6 indicating the detected strength values that the strength of the received signals is highest at the angle θ of 15°.

This means that the communication object in the form of the radio-frequency tag 14 is located approximately in the direction of θ=15°.

Figure 7:
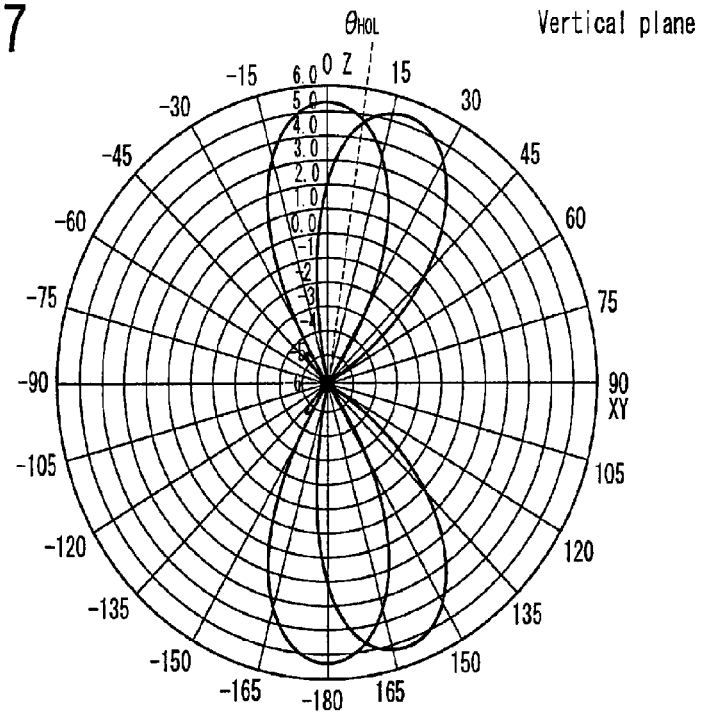
FIG. 7 is a view indicating directivity patterns in respective two directivity directions of a predetermined angular difference used for a detecting operation of a direction detecting portion of the radio-frequency tag communication device of FIG. 2, where a center angle between the two directivity directions is 10°.
Figure 8:
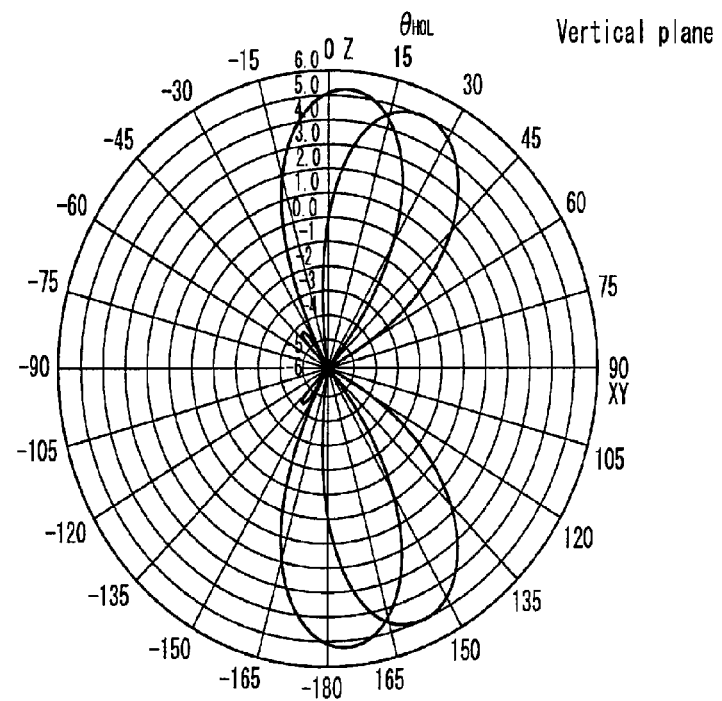
FIG. 8 is a view indicating directivity patterns in respective two directivity directions of a predetermined angular difference used for the detecting operation of the direction detecting portion of the radio-frequency tag communication device of FIG. 2, where the center angle between the two directivity directions is 15°.
Figure 9:
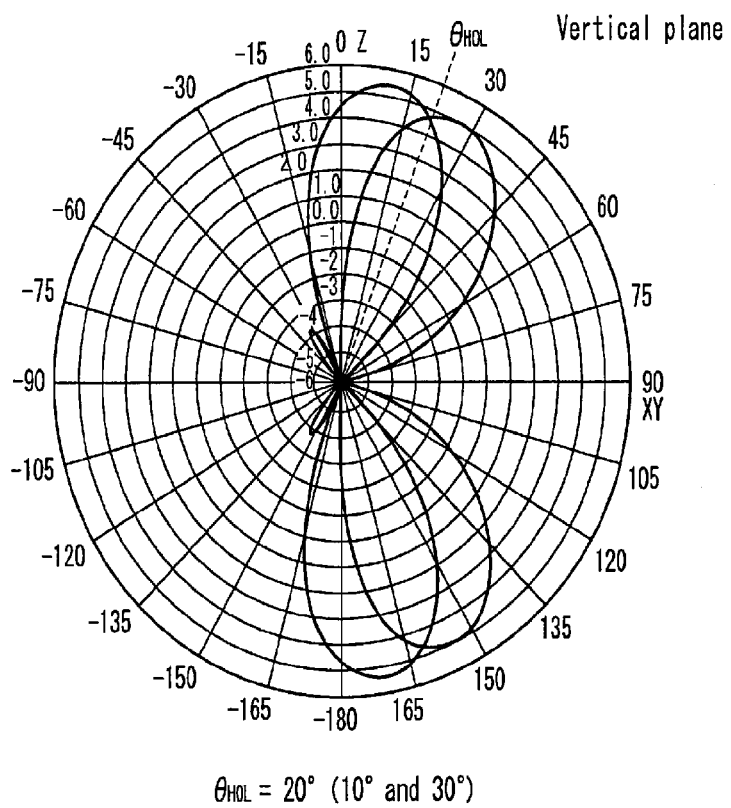
FIG. 9 is a view indicating directivity patterns in respective two directivity directions of a predetermined angular difference used for the detecting operation of the direction detecting portion of the radio-frequency tag communication device of FIG. 2, where the center angle between the two directivity directions is 20°.

The direction detecting portion 54 is arranged to effect the main detection by first determining a higher one of the two strength values of the received signals respectively detected in a first directivity direction in which the strength is maximized by the PAA processing portion 44, and in a second directivity direction which is also established by the PAA processing portion 44 and which is different from the first directivity direction by a predetermined angle. The direction in which the communication object is located is determined on the basis of the direction in which the determined higher strength value of the received signals is minimal. Each of FIGS. 7-9 indicates directivity patterns in respective two directivity directions (maximum-reception-directivity directions) of a predetermined angular difference. In the example of FIG. 7, the angle θ of the first directivity direction is 0°, while the angle θ of the second directivity direction is 20°. In the example of FIG. 8, the angle θ of the first directivity direction is 5°, while the angle θ of the second directivity direction is 25°. In the example of FIG. 9, the angle θ of the first directivity direction is 10°, while the angle θ of the second directivity direction is 30°. Where the two directivity patterns having the two directivity directions of a comparatively small angular difference of 20° are superimposed on each other, as indicated in FIGS. 7-9, there exists a bottom of an apparent gain in an area of overlapping of the corresponding two main lobes, and the sensitivity of communication is minimal at an angle corresponding to the bottom, that is, almost at a center angle $\theta_{HOL}$ intermediate between the above-indicated two angles.

Figure 10:
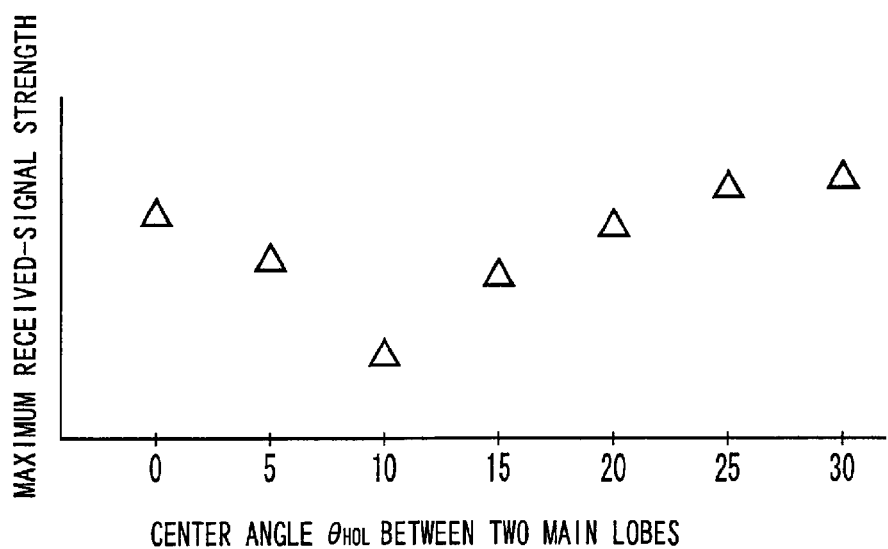
FIG. 10 is a view indicating a change of a higher one of two strength values of the received signal respectively detected in first and second directivity directions, with a change of the center angle between the two directivity directions at an angular interval of 5° between 0° and 30° by the PAA processing portion of the radio-frequency tag communication device of FIG. 2.

The direction detecting portion 54 is preferably arranged to change the first and second directivity directions at a predetermined angular interval, to detect the strength values of the received signals as the two directivity directions are changed, and to determine that the direction in which the strength value detected by the received-signal-strength detecting portion 52 is minimal is the direction in which the communication object in the form of the radio-frequency tag 14 exists. FIG. 10 is a view indicating a change of the higher one of the two strength values of the received signals respectively detected in the first and second directivity directions, with a change of the center angle $\theta_{HOL}$ between the first and second directivity directions at an angular interval of 5° between 0° and 30°. Namely, FIG. 10 indicates the higher strength values of the received signals. In the main detection, the center angle $\theta_{HOL}$ is preferably changed at an angular interval smaller than that in the preliminary detection in which the main lobe direction is changed. In the example of FIG. 10, the higher strength value gradually decreases as the center angle $\theta_{HOL}$ increases from 0° to 10° and is minimized at the center angle of 10°, while the higher strength value gradually increases as the center angle $\theta_{HOL}$ increases from 10° to 30°. Where the higher one of the two strengths of the received signals in the respective first and second directivity directions (two maximum-reception-directivity directions) is detected, the strength value is minimal at the center angle $\theta_{HOL}$ indicative of the direction in which the communication object in the form of the radio-frequency tag 14 is located. In the example of FIG. 10 in which the higher strength value is minimal at the center angle $\theta_{HOL}$ of 10°, the radio-frequency tag 14 is located in the direction represented by this center angle $\theta_{HOL}$ of 10°. Thus, the main detection is based on a fact that the received signal strength is minimal at the bottom of the gain existing in the area of overlapping of the two main lobes extending in the respective two maximum-reception-directivity directions of a predetermined angular difference. Accordingly, the resolution of detection can be made higher in the main detection than in the preliminary detection in which the main lobe direction is changed. The strength values indicated in FIG. 10 were obtained in the main detection in which the center angle $\theta_{HOL}$ was changed within a range of±15° which has a center at 15° at which the strength value was maximal in the preliminary detection of FIG. 6. The direction detecting portion 54 is preferably configured to determine the initial values of the first and second directivity directions on the basis of the direction determined in the preliminary detection as the direction in which the communication object is located.

Figure 11:
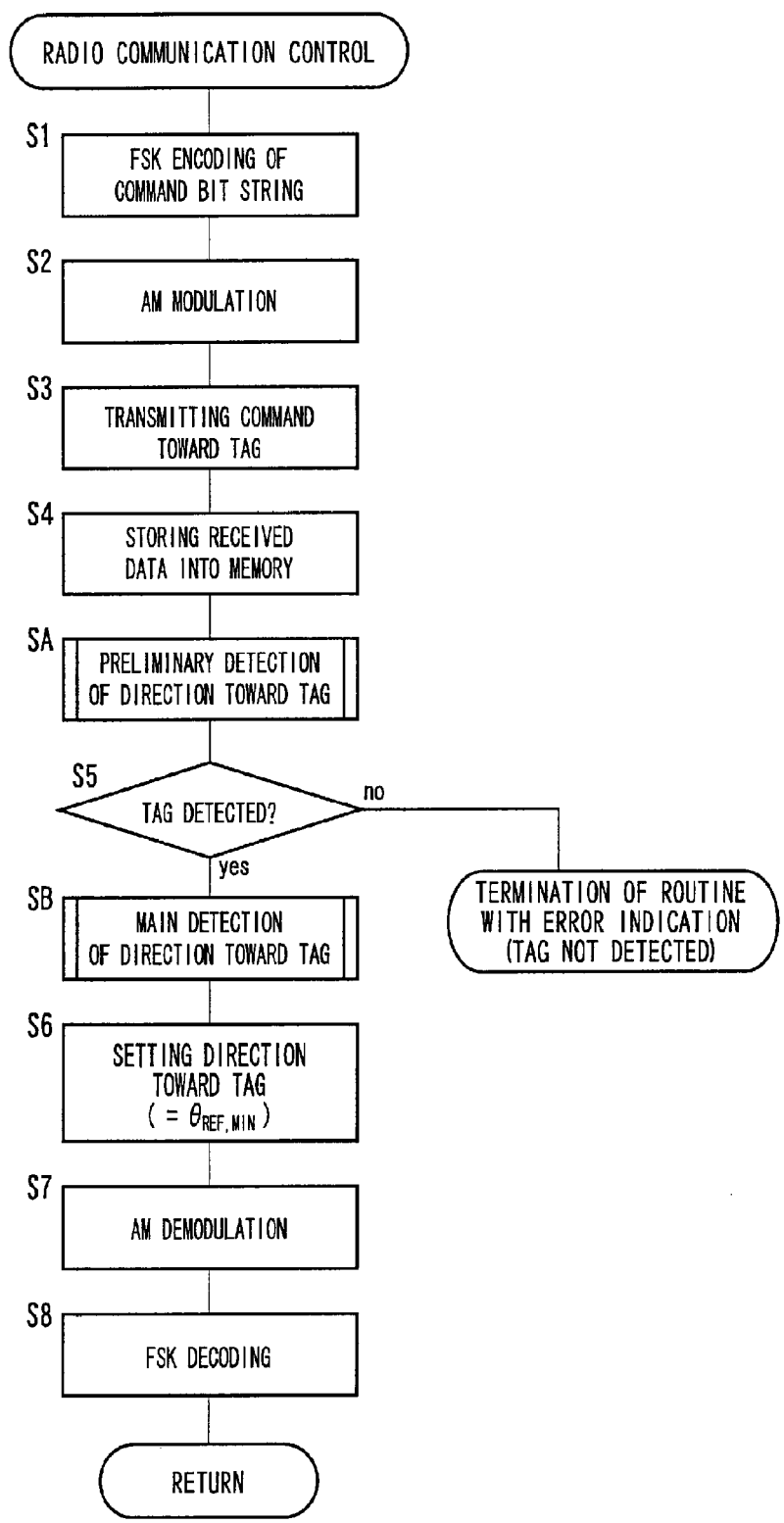
FIG. 11 is a flow chart illustrating a control routine executed by a DSP of the radio-frequency tag communication device of FIG. 2, to effect radio communication with the radio-frequency tag of FIG. 3.

FIG. 11 is a flow chart illustrating a control routine executed by the DSP 16 of the radio-frequency tag communication device 12, to effect radio communication with the radio-frequency tag 14. This control routine is repeatedly executed with a predetermined cycle time.

The control routine is initiated with step S1 ("step" being hereinafter omitted) corresponding to the operations of the transmitted-bit-string generating portion 38 and FSK encoding portion 40, in which a string of command bits corresponding to the transmitted signal to be transmitted to the radio-frequency tag 14 is generated and FSK-encoded. Then, the control flow goes to S2 corresponding to the operation of the AM modulating portion 42, in which the signal encoded in S1 is AM-modulated. The control flow then goes to S3 in which the transmitted signal modulated in S2 is transmitted as the interrogating wave $F_c$ from the transmitter antenna device 26 toward the radio-frequency tag 14, through the transmitted-signal D/A converting portion 18 and up converter 22. Then, the control flow goes to S4 in which the reply wave $F_r$ transmitted from the radio-frequency tag 14 in response to the interrogating wave $F_c$ is received through the receiver antenna device 30 and stored in the memory portion 36 through the down converter 32 and received-signal A/D converting portion 34. Then, the preliminary detection of the direction toward the radio-frequency tag 14 (by changing the main lobe direction) is effected as illustrated in the flow chart of FIG. 12, and the control flow goes to S5 to determine whether the direction in which the radio-frequency tag 24 is located has been detected. If a negative determination is obtained in S5, it is determined that the communication object in the form of the radio-frequency tag 14 is not present, and the present control routine is terminated with indication of an error. If an affirmative determination is obtained in S5, the main detection of the direction toward the radio-frequency tag 14 based on the fact that the bottom of the gain exists in the area of overlapping of the two main lobes extending in the two respective directivity directions is effected as illustrated in the flow chart of FIG. 13. Then, the control flow goes to S6 to determine that an angle $\theta_{REF,MIN}$ indicates the direction in which the radio-frequency tag 14 is located. The control flow then goes to S7 corresponding to the operation of the AM demodulating portion 46, in which the received signals subjected to the phased-array processing operation by the PAA processing portion 44 are AM-demodulated. Then, the control flow goes to S8 in which the AM-demodulated wave is FSK-decoded, and the decoded wave is interpreted to thereby read the information signal modulated by the radio-frequency tag 14. Thus, the present control routine is terminated.

Figure 12:
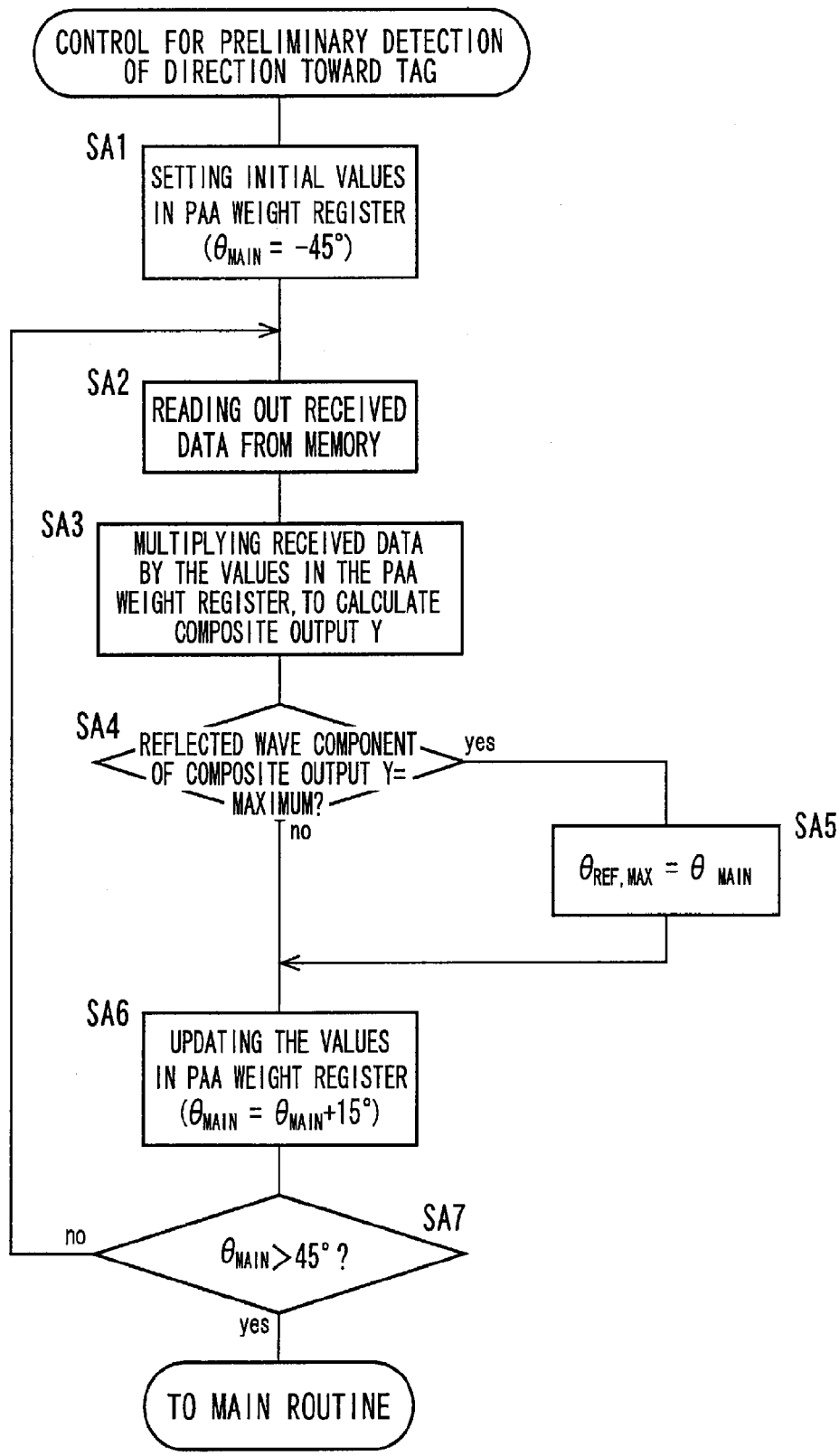
FIG. 12 is a flow chart illustrating a part of the control routine of FIG. 11, to effect preliminary detection of the direction toward the radio-frequency tag.

FIG. 12 is a flow chart illustrating a part of the control routine of FIG. 11, to effect the preliminary detection of the direction toward the radio-frequency tag 14, in which the direction is detected by changing the main lobe direction. This control routine is initiated with SA1 to set the initial values in the PAA weight register 78, so that a direction $\theta_{MAIN}$ of the main lobe is set to −45°. Then, the control flow goes to SA3 in which the received signals received by the respective receiver antenna elements 28 and stored in the memory portion 36 in S4 of FIG. 11 are read out from the memory portion 36. The control flow then goes to SA3 in which the received signals read out in SA2 are multiplied by the respective values in the PAA weight register 78, to calculate a composite output Y of the received-signal combining portion 60. SA4 is then implemented to determine whether the reply wave component (reflected wave component) included in the composite output Y is maximum (maximal), that is, the strength of the received signals is highest. If an affirmative determination is obtained in SA4, the control flow goes to SA5 in which the angle $\theta_{REF,MAX}$ indicative of the approximate direction in which the radio-frequency 14 is located is set to $\theta_{MAIN}$, and goes to SA6 and the subsequent steps. If a negative determination is obtained in SA4, the control flow goes to SA6 to update the values in the PAA weight register 78 are updated to decrement the direction $\theta_{MAIN}$ of the main lobe by 15°. SA6 is followed by SA7 to determine whether the main lobe direction $\theta_{MAIN}$ is larger than 45°. If a negative determination is obtained in SA7, the control flow goes back to SA2 and the subsequent steps. If an affirmative determination is obtained in SA7, the present control routine is terminated, and the control flow goes back to the main control routine of FIG. 11.

Figure 13:
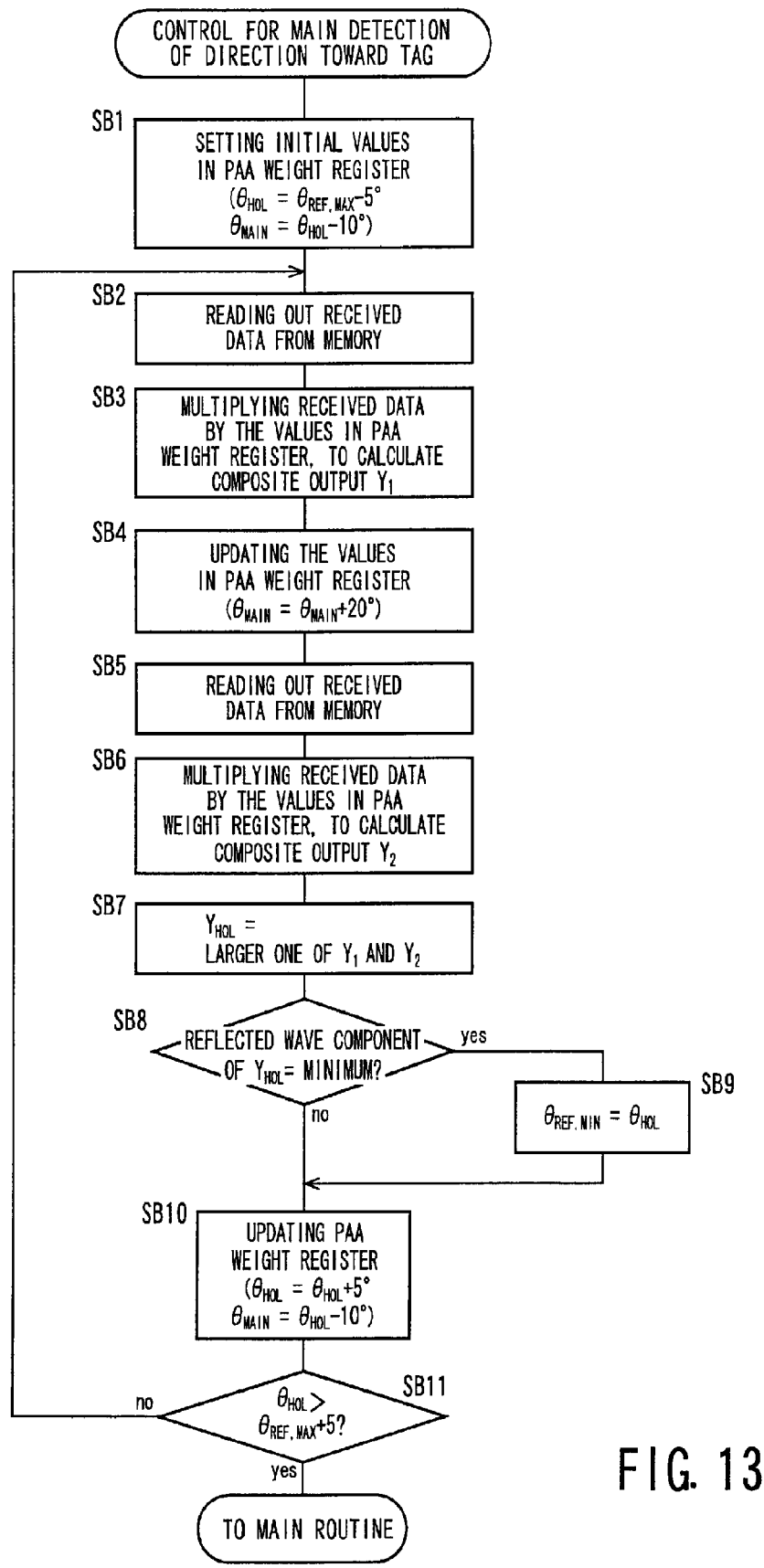
FIG. 13 is a flow chat illustrating another part of the control routine of FIG. 11, to effect main detection of the direction toward the radio-frequency tag.

FIG. 13 is a flow chat illustrating another part of the control routine of FIG. 11, to effect the main detection of the direction toward the radio-frequency tag 14, which is based on the fact that there exists the bottom of the gain in the area of overlapping of the two main lobes in the respective two maximum-reception-directivity directions. This control routine is initiated with SB1 to set initial values in the PAA weight register 78, so that the center angle $\theta_{HOL}$ between the two maximum-reception-directivity directions is equal to $(\theta_{REF,MAX}-50°)$ set in SA5 of FIG. 12, while the angle $\theta_{MAIN}$ indicative of the direction of the first main lobe is equal to $(\theta_{HOL}-10°)$. Then, the control flow goes to SB2 in which the received signals received by the respective receiver antenna elements 28 and stored in the memory portion 36 in S4 of FIG. 11 are read out from the memory portion 36. The control flow then goes to SB3 in which the received signals read out in SB2 are multiplied by the values in the PAA weight register 78, to calculate a composite output $Y_1$ of the received-signal combining portion 60. SB4 is then implemented to update the values in the PAA weight register 78, so that the angle $\theta_{MAIN}$ indicative of the direction of the second main lobe is equal to $\theta_{MAIN}=+20°$. The control flow then goes to SB5 in which the received signals received by the respective receiver antenna elements 28 and stored in the memory portion 36 in S4 of FIG. 11 are read out from the memory portion 36, and to SB6 in which the received signals read out in SB5 are multiplied by the values in the PAA weight register 78, to calculate a composite output $Y_2$ of the received-signal combining portion 60. SB7 is then implemented to compare the composite output Y1 calculated in SB3 and the composite output Y2 calculated in SB6, and to select a larger one of these two outputs $Y_1$, $Y_2$ as $Y_{HOL}$. SB8 is then implemented to determine whether the reflected wave component included in the composite output $Y_{HOL}$ is minimum (minimal). If an affirmative determination is obtained in SB8, the control flow goes to SB95 in which the angle $\theta_{REF, MIN}$ indicative of the direction in which the radio-frequency 14 is located is set to $\theta_{HOL}$, and goes to SB10 and the subsequent steps. If a negative determination is obtained in SB8, the control flow goes to SB10 to update the values in the PAA weight register 78 are updated so that the center angle $\theta_{HOL}$ between the two maximum-reception-directivity directions is equal to $(\theta_{HOL}+5°)$, while the angle $\theta_{MAIN}$ indicative of the direction of the first main lobe is equal to $(\theta_{HOL}-10°)$. Then, the control flow goes to SB11 to determine whether the center angle $\theta_{HOL}$ between the two maximum-reception-directivity directions is larger than a predetermined threshold of $(\theta_{REF,MAX}+5°)$. If a negative determination is obtained in SB117, the control flow goes back to SB2 and the subsequent steps. If an affirmative determination is obtained in SB11, the present control routine is terminated, and the control flow goes back to the main control routine of FIG. 11. In the control routine of FIG. 11, steps S6, SA and SB correspond to the operation of the direction detecting portion 54, and steps SA and SB correspond to the PAA processing portion 44.

The radio-frequency device according to the present embodiment comprises the reception-directivity control portion in the form of the PAA processing portion 44 (SA and SB) configured to control the directivity of reception of the receiver antenna device 30, the received-signal-strength detecting portion 52 configured to detect the strength of the received signal received by the receiver antenna device 30, and the direction detecting portion 54 (S6, SA and SB) configured to detect the direction in which the communication object in the form of the radio-frequency tag 14 is located, on the basis of the direction in which the higher one of the two strength values of the received signal respectively detected in the first and second maximum-reception-directivity directions of the predetermined angular difference established by the PAA processing portion 44 is minimal. The direction detecting portion 54 is operated based on the fact that the received signal strength is minimal at the bottom of the gain existing in the area of overlapping of the two main lobes extending in the respective two directivity directions of the predetermined angular difference, so that the resolution of detection can be made higher than in the case based on the main lobe direction in which the sensitivity of communication with the radio-frequency tag 14 is maximum. Accordingly, the direction toward the radio-frequency tag 14 can be suitably detected. Where the null of the reception directivity pattern is used, the resolution is high with respect to the received signal having a high strength, but is ineffectively low with respect to the received signal having a low strength. In the present radio-frequency device, however, the direction toward the radio-frequency tag 14 can be suitably detected even where the received signal has a low strength. Namely, the present embodiment provides the radio-frequency device 12 which permits detection of the direction toward the radio-frequency tag 14, with a simple processing and a high degree of resolution over a wide range of detection.

Further, the direction detecting portion 54 is configured to effect, prior to the above-indicted detection, preliminary detection to detect the direction toward the communication object, on the basis of the direction in which the highest value of the strength of the received signal is detected by the received-signal-strength detecting portion 52 as the maximum-reception-directivity direction in which the directivity of reception is highest is changed at a predetermined angular interval. Accordingly, it is possible to efficiently obtain an approximate direction toward the radio-frequency tag 14, on the basis of the main lobe direction in which the sensitivity of communication with the radio-frequency tag 14 is maximum.

Further, the direction detecting portion 54 is configured to determine the initial values of the first and second maximum-reception-directivity directions on the basis of the direction toward the communication object as detected in the preliminary detection. Thus, the approximate direction detected in the preliminary detection is utilized to reduce the time required for the main detection.

Further, the direction detecting portion 54 is configured to repeat the main detection as the first and second maximumreception-directivity directions are changed at a predetermined angular interval. Accordingly, the direction toward the radio-frequency tag 14 can be practically detected.

Further, the receiver antenna device 30 consists of at least two receiver antenna elements 28, so that the directivity of reception of the receiver antenna device 30 can be easily controlled.

Further, the receiver antenna device 30 is an array antenna consisting of the at least two antenna elements, so that the directivity of reception of the receiver antenna device 30 can be easily controlled.

Further, the radio-frequency tag communication device further comprises a received-signal memory portion in the form of the memory portion 36 for storing the received signals received by the receiver antenna device 30. Accordingly, the received signals can be easily combined together into a composite signal to be subjected to the operation of the reception-directivity control portion. In addition, the radio-frequency tag 14 can be detected with a reduced number of transmissions of the transmitted signal to the communication object in the form of the radio-frequency tag 14.

Further, the radio-frequency tag communication device comprises the transmitter antenna device 26 for transmitting the predetermined signal to the radio-frequency tag 14. Accordingly, the direction toward the communication object can be suitably detected by transmitting the predetermined signal, even where the communication object is a passive tag, for example.

Further, the PAA processing portion 44 is configured to control the directivity of transmission independently of the directivity of reception. Accordingly, at least one of the directivity of transmission and the directivity of reception can be suitably controlled.

Other embodiments of the present invention will be described in detail by reference to the drawings. It is noted that the same reference signs are used in the following embodiments, to identify the corresponding elements, which will not be described.

Embodiment 2

Figure 14:
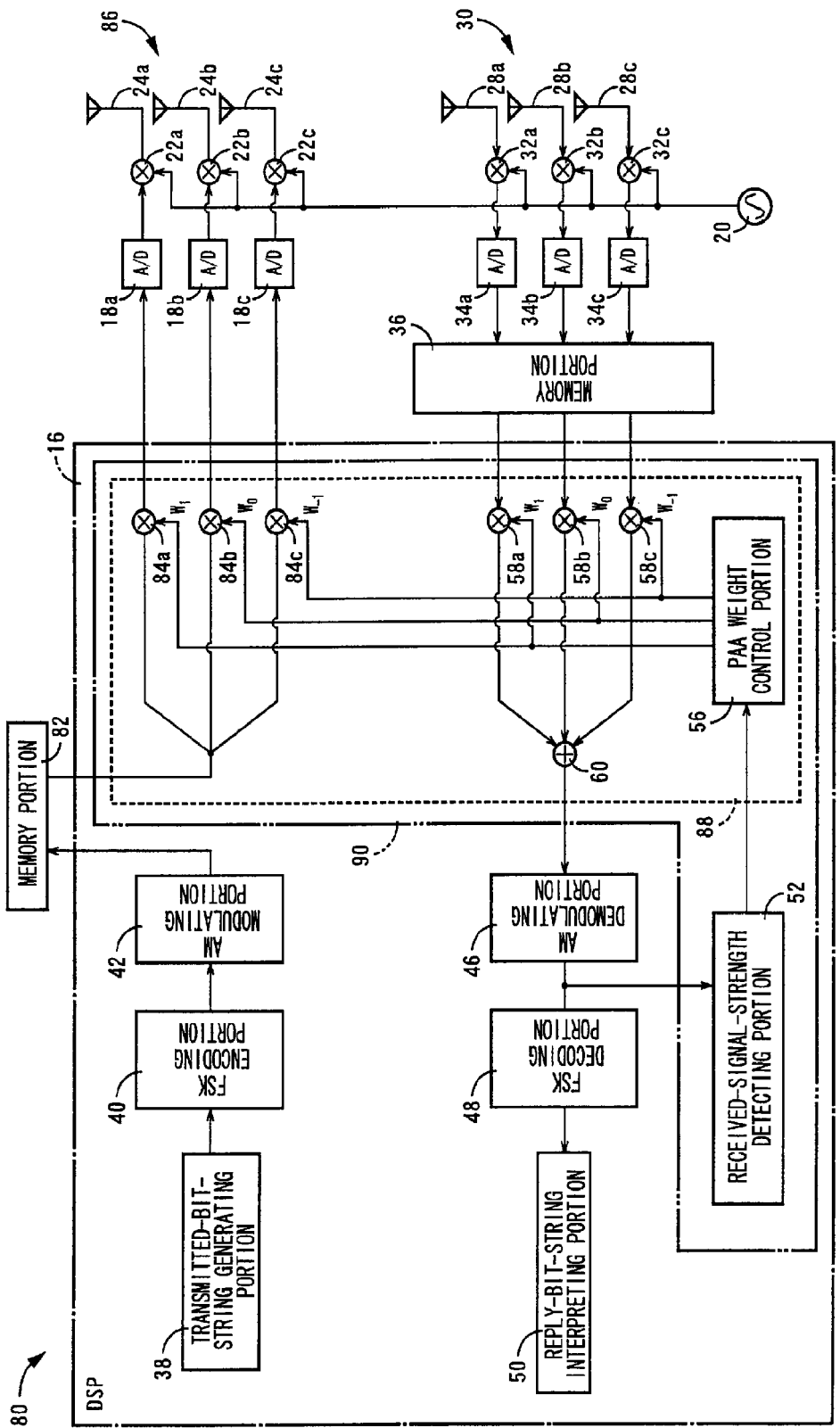
FIG. 14 is a view for explaining an arrangement of another embodiment of the radio-frequency device in the form of a radio-frequency tag communication device according to the first aspect of this invention.

FIG. 14 is a view for explaining an arrangement of a second embodiment of a radio-frequency tag communication device 80 according to the first aspect of this invention. As shown in FIG. 14, the radio-frequency tag communication device 80 includes: a memory device in the for of a memory portion 82 configured to store the transmitted signal generated by modulation by the AM modulating portion 42, and to apply the transmitted signal to the DSP 16 according to a command from the DSP 16; a plurality of (three in the example of FIG. 14) transmission PAA weight multiplying portions 84a, 84b, 84c (hereinafter collectively referred to as "transmission weight PAA weight multiplying portions 84", unless otherwise specified) configured to multiply the transmitted signal by PAA weights calculated by the PAA weight control portion 56; a plurality of (three in the example of FIG. 14) transmitted-signal D/A converting portions 18a, 18b, 18c (hereinafter collectively referred to as "transmitted-signal D/A converting portions 18", unless otherwise specified) configured to convert the transmitted signals multiplied by the PAA weights by the transmission PAA weight multiplying portions 84, into analog signals; a plurality of (three in the example of FIG. 14) up converters 22a, 22b, 22c (hereinafter collectively referred to as "up converters 22", unless otherwise specified) configured to increase the frequencies of the analog transmitted signals by an amount equal to the frequency of the frequency converting signal generated by the frequency-converting-signal generating portion 20; and a transmitter antenna device 86 having a plurality of (three in the example of FIG. 14) transmitter antenna elements 24a, 24b, 24c (hereinafter collectively referred to as "transmitter antenna elements 24", unless otherwise specified) configured to transmit, as the interrogating waves $F_c$, the transmitted signals received from the up converters 22.

In the radio-frequency tag communication device 80 described above, the PAA weight control portion 56, reception PAA weight multiplying portions 58, received-signal combining portion 60, and transmission PAA weight multiplying portions 84 cooperate to constitute a PAA processing portion 88. In this PAA processing portion 88, the directivity of transmission is controlled by the transmission PAA weight multiplying portions 84 according to the transmission PAA weights received from the PAA weight control portion 56, while the directivity of reception is controlled by the reception PAA weight multiplying portions 58 according to the reception PAA weights received from the PAA weight control portion 56.

In the radio-frequency tag communication device 80, the received-signal-strength detecting portion 52, PAA weight control portion 56, reception PAA weight multiplying portions 58, received-signal combining portion 60, and transmission PAA weight multiplying portions 88 cooperate to constitute a direction detecting portion 90. For the direction detecting portion 90 to detect the direction toward the radio-frequency tag 14, the PAA processing portion 88 is preferably configured to set an initial value of the directivity of reception of the receiver antenna device 30 such that the initial value corresponds to a direction in which the directivity of transmission of the signal to be transmitted from the transmitter antenna device 86 is maximum.

Figure 15:
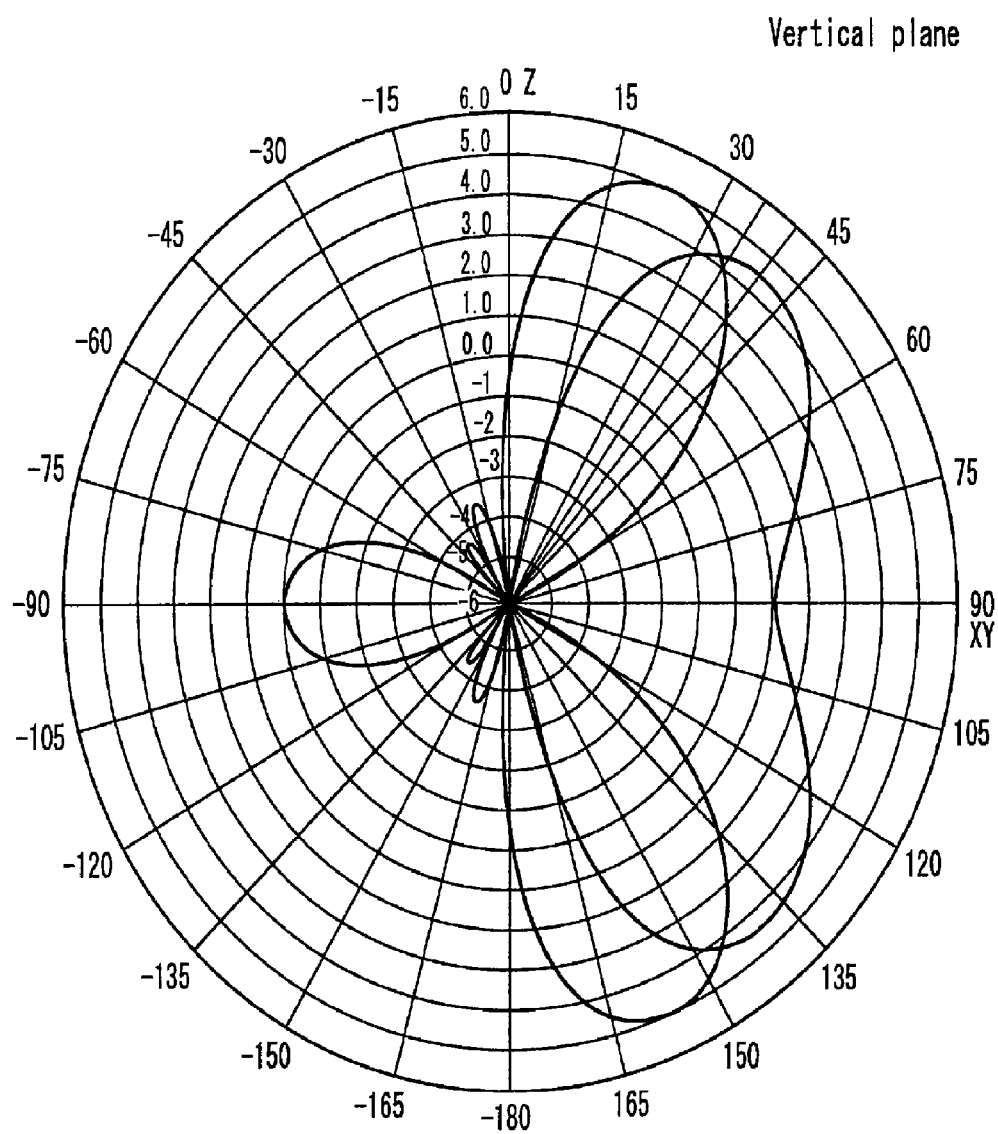
FIG. 15 is a view for explaining the compensation of the angle between the first and second directivity directions by the direction detecting portion of the radio-frequency tag communication device of FIG. 14.
Figure 16:
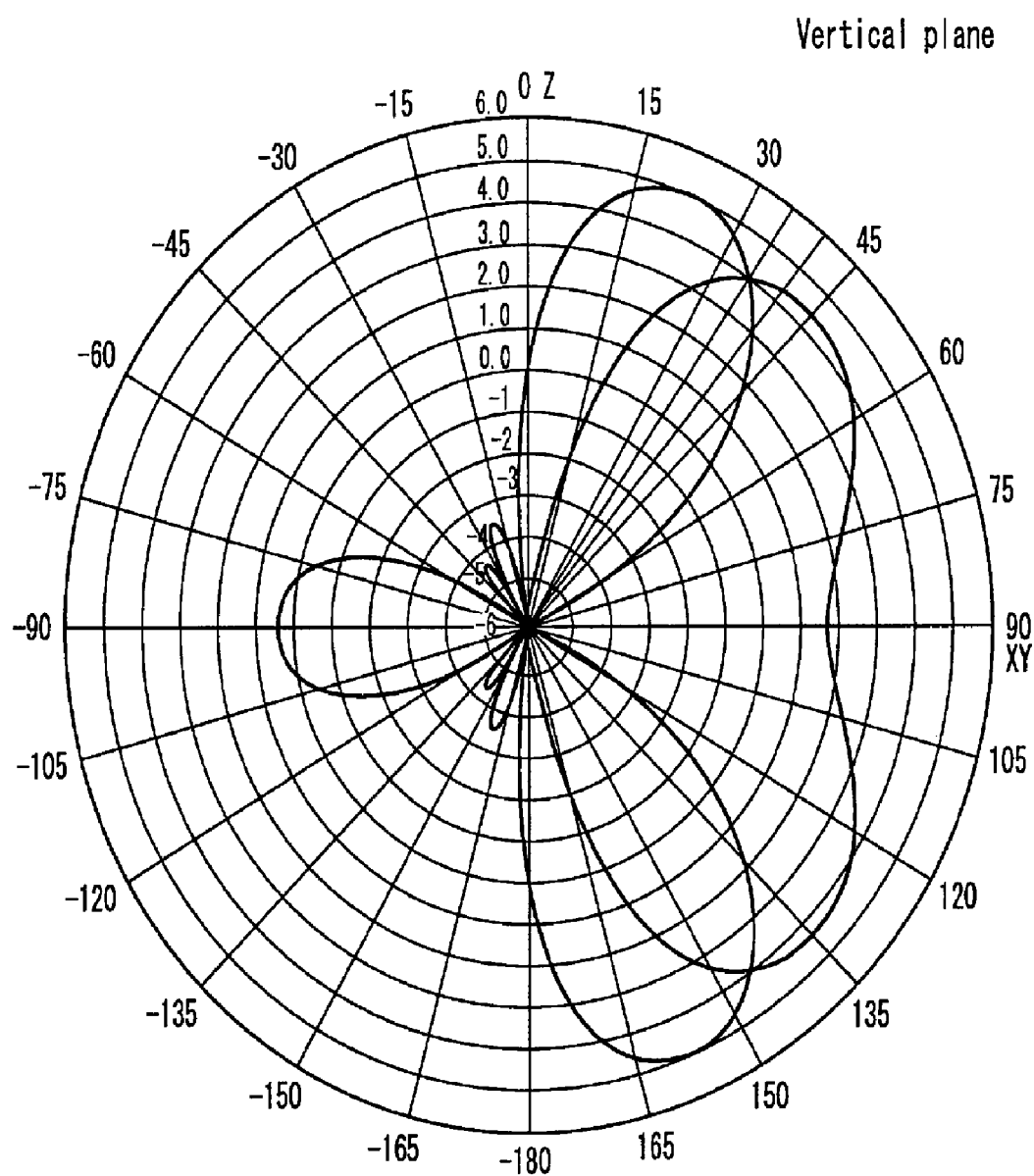
FIG. 16 is a view for explaining compensation of the angle between the first and second directivity directions by the direction detecting portion of the radio-frequency tag communication device of FIG. 14.

The direction detecting portion 90 is further configured to detect the direction in which the radio-frequency tag 14 is located, on the basis of the direction in which the higher one of the two strength values of the received signal respectively detected in the first and second maximum-reception-directivity directions. To this end, the direction detecting portion 90 is preferably arranged to compensate an angle formed between the first and second maximum-reception-directivity directions such that the angle between the first and second maximum-reception-directivity directions increases with an increase of an angle formed between a reference direction and a predetermined original direction that are used for determining the first and second maximum-reception-directivity directions. FIGS. 15 and 16 are views for explaining the compensation of the angle between the first and second maximum-reception-directivity directions, where the original direction is 0°. For instance, the direction toward the radio-frequency tag 14 is detected by changing the reference direction $\theta_{ST}$ at a predetermined angular interval of 5° from the original direction of 0°, and determining the first and second directivity directions such that the angle of the first direction is smaller by a predetermined angle, for example, by 10° than the angle of the reference direction $\theta_{ST}$, while the angle of the second direction is larger by a predetermined angle, for example, by 10° than the angle of the reference direction $\theta_{ST}$. In this case, there may arise a mismatch between the reference direction $\theta_{ST}$, and the direction $\theta_{HOL}$ corresponding to the bottom of the gain in an area of overlapping of the main lobes extending in the two directivity directions. Where the angle of the reference direction $\theta_{ST}$ is 35°, and the angles of the two directivity directions are respectively 25° and 45°, for example, as indicated in FIG. 15, the direction $\theta_{HOL}$ corresponding to the bottom of the gain in the area of overlapping of the main lobes is offset or shifted with respect to the reference direction $\theta_{ST}$ in the direction toward the original direction of 0°, that is, the angle of the direction $\theta_{HOL}$ is about 34°. In this case, the angle of the second directivity direction is compensated in the plus direction by a predetermined angle, for example, by 1.5°, that is, changed to 46.5°, as indicated in FIG. 16. As a result, the direction $\theta_{HOL}$ corresponding to the bottom of the gain in the area of overlapping of the main lobes is matched with the reference direction $\theta_{ST}$. Thus, the direction in which the communication object in the form of the radio-frequency tag 14 is located can be detected with a higher degree of accuracy. It is noted that this compensation is equally applicable to the direction detecting portion 54 in the first embodiment.

Figure 17:
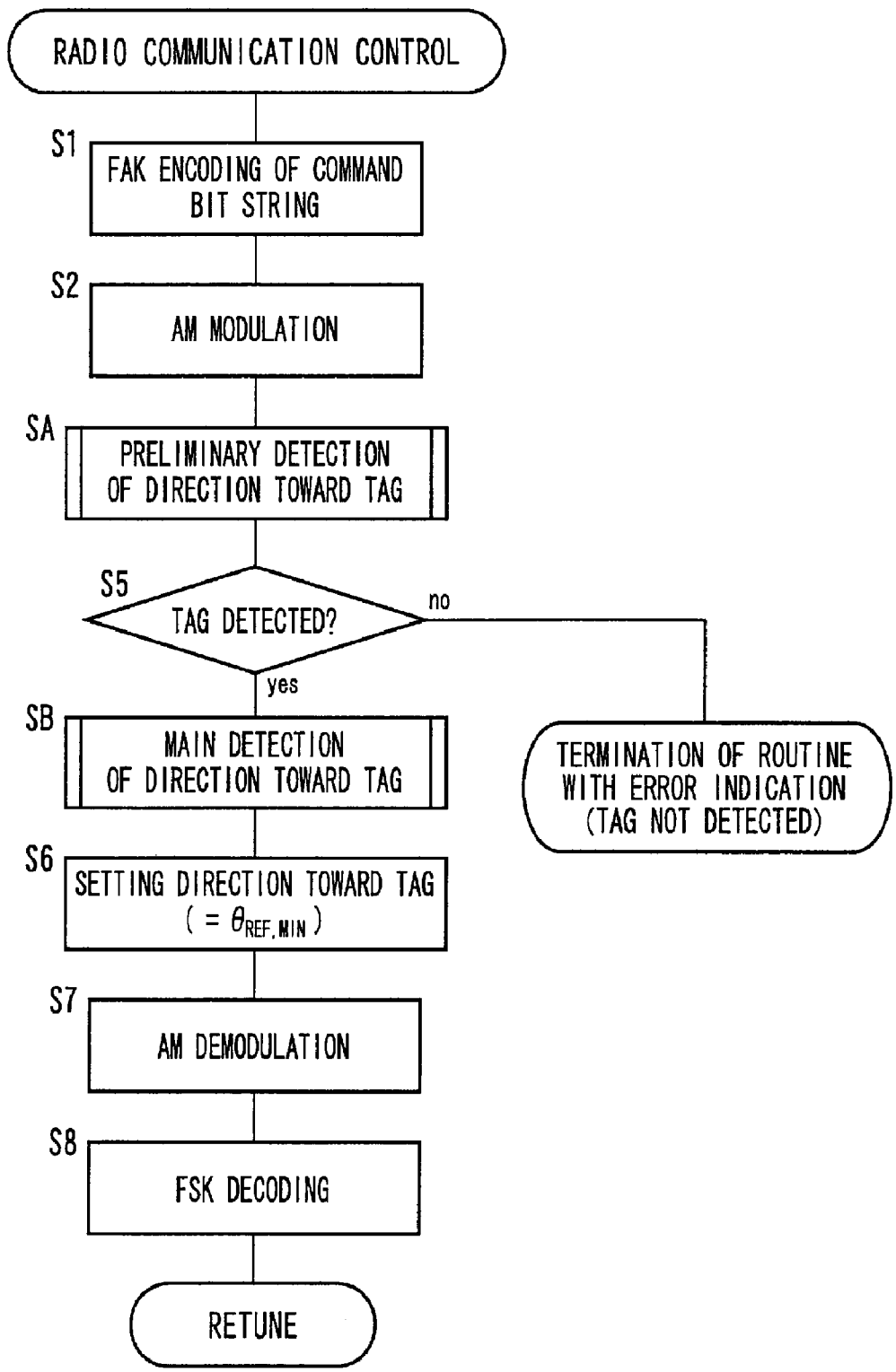
FIG. 17 is a flow chart illustrating a control routine executed by a DSP of the radio-frequency tag communication device of FIG. 14, to effect radio communication with the radio-frequency tag of FIG. 3.

FIG. 17 is a flow chart illustrating a control routine executed by the DSP 19 of the radio-frequency tag communication device 80, to effect radio communication with the radio-frequency tag 14. This control routine corresponds to that of FIG. 11 described above. The same reference signs as used in the preceding embodiment will be used to identify the same steps, which will not be described. In the present control routine, S2 is followed by the preliminary detection control illustrated in FIG. 18, and S5 to determine whether the communication object in the form of the radio-frequency tag 14 has been detected or not. If a negative determination is obtained in S5, it is determined that the radio-frequency tag 14 is not present, and the present control routine is terminated with indication of an error. If an affirmative determination is obtained in S5, the control flow goes to the main detection control illustrated in FIG. 19, and then goes to S6 and the subsequent steps described above.

Figure 18:
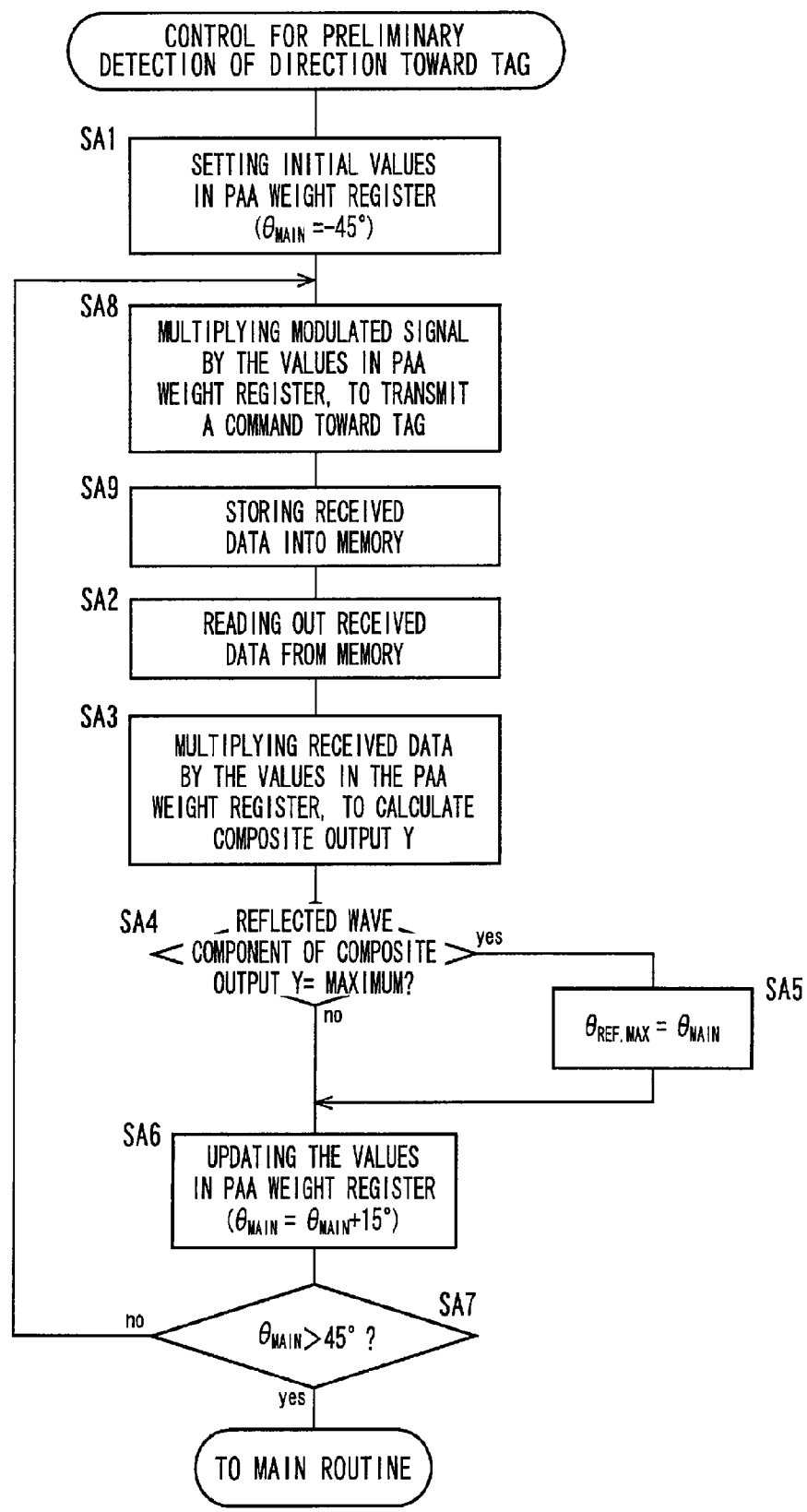
FIG. 18 is a flow chart illustrating a part of the control routine of FIG. 17, to effect preliminary detection in the direction toward the radio-frequency tag.

The control illustrated in FIG. 18 corresponds to that illustrated in FIG. 12, and the same reference signs as used in FIG. 12 will be used in FIG. 18 to identify the same steps, which will not be described. In the present control, SA1 is followed by SA8 in which the transmitted signals obtained by modulation in S2 are multiplied by the values in the PAA weight register 78 and are transmitted as the interrogating wave $F_c$ from the transmitter antenna device 86 toward the radio-frequency tag 14 through the transmitted-signal D/A converting portions 18 and up converters 22. Then, the control flow goes to SA9 in which the reply wave $F_r$ transmitted from the radio-frequency tag 14 in response to the interrogating wave $F_c$ is received by the receiver antenna device 30, and stored in the memory device 36 through the down converters 32 and the received-signal A/D converting portions 34. The control flow then goes to SA2 and the subsequent steps described above.

Figure 19:
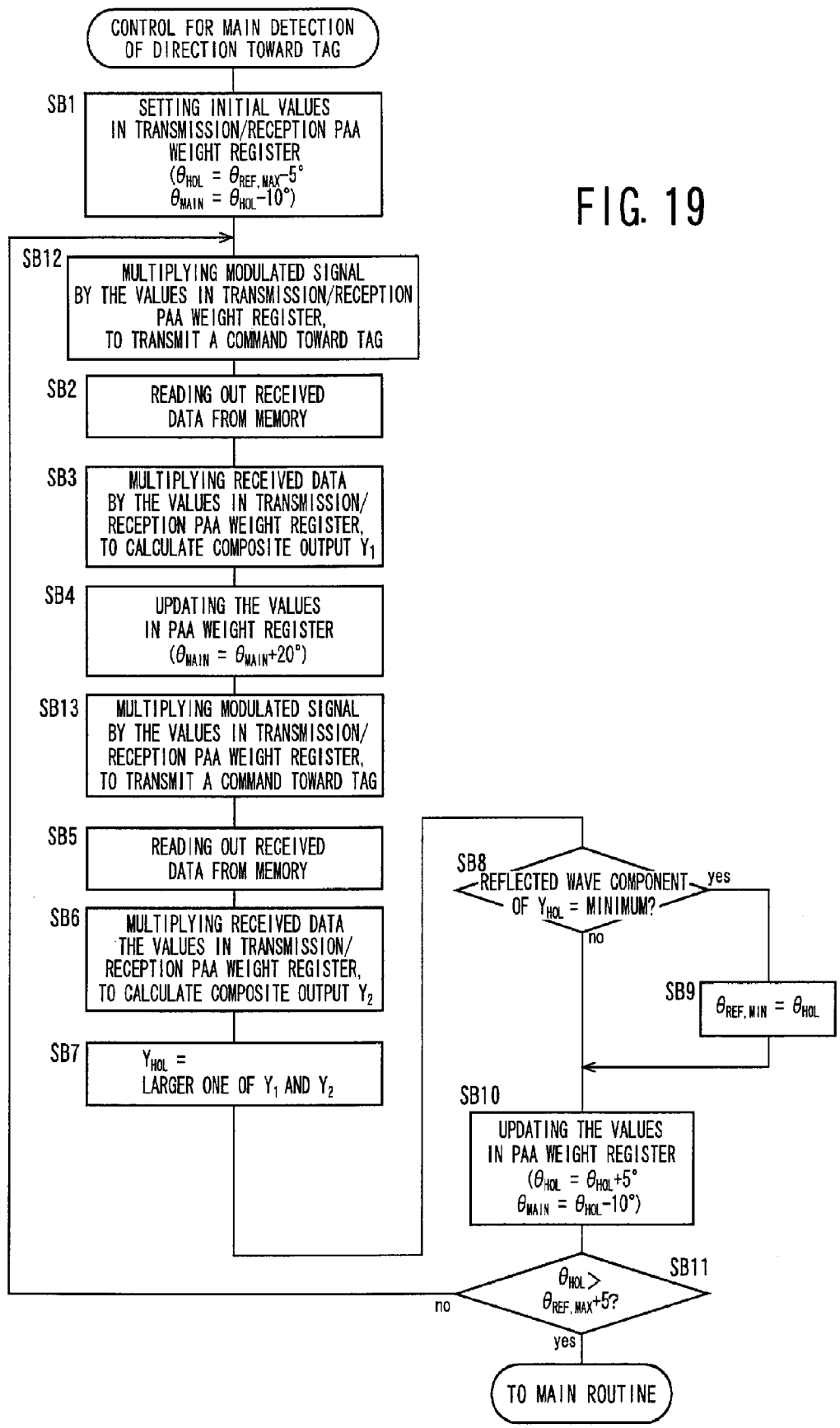
FIG. 19 is a flow chat illustrating another part of the control routine of FIG. 17, to effect main detection in the direction toward the radio-frequency tag.

The control illustrated in FIG. 19 corresponds to that illustrated in FIG. 13, and the same reference signs as used in FIG. 13 will be used in FIG. 19 to identify the same steps, which will not be described. In the present control, SB1 is followed by SB2 in which the transmitted signals obtained by modulation in S2 are multiplied by the values in the PAA weight register 78, and are transmitted as the interrogating wave $F_c$ from the transmitter antenna device 86 toward the radio-frequency tag 14 through the transmitted-signal D/A converting portions 18 and up converters 22. Then, SB2 and the subsequent steps described above are implemented. SB4 is followed by SB13 in which the transmitted signals obtained by modulation in S2 are multiplied by the values in the PAA weight register 78, and are transmitted as the interrogating wave $F_c$ from the transmitter antenna device 86 toward the radio-frequency tag 14 through the transmitted-signal D/A converting portions 18 and up converters 22. Then, SB5 and the subsequent steps described above are implemented. In the present embodiment, S6, SA and SB correspond to the operation of the direction detecting portion 90, while SA and SB correspond to the operation of the PAA processing portion 88.

In the present embodiment described above, the direction detecting portion 90 (S6, SA and SB) is configured to compensate the angle formed between the first and second maximum-reception-directivity directions such that the angle formed between the first and second maximum-reception-directivity directions increases with an increase of the angle formed between the reference direction and the predetermined original direction used for determining the first and second maximum-reception-directivity directions. Accordingly, the direction in which the communication object in the form of the radio-frequency tag 14 is located can be more accurately detected.

Further, the radio-frequency tag communication device comprises the transmission-directivity control portion in the form of the PAA processing portion 88 configured to control the directivity of transmission of the signal to be transmitted from the transmitter antenna device 86. Accordingly, the direction toward the communication object can be suitably detected, even where the communication object is relatively distant from the radio-frequency device.

Further, the reception-directivity control portion in the form of the PAA processing portion 88 (SA and SB) is configured to set the initial value of the directivity of reception of the receiver antenna device 30 such that the initial value corresponds to the direction in which the directivity of transmission of the signal to be transmitted from the transmitter antenna device 86 is maximum. Accordingly, the initial value of the directivity of reception can be suitably determined.

Further, the PAA processing portion 88 is arranged to control the directivities of reception and transmission such that the directivity of reception and the directivity of transmission are coincident with each other, so that the radio communication with the radio-frequency tag 14 can be suitably effected.

While the embodiments according to the first aspect of this invention have been described above in detail by reference to the drawings, it is to be understood that the first aspect is not limited to the illustrated embodiments, but may be otherwise embodied.

Figure 20:
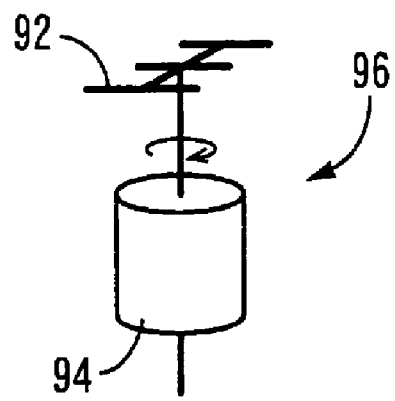
FIG. 20 is a view illustrating another example of a receiver antenna device provided in the radio-frequency device of the first aspect of the invention.
Figure 21:
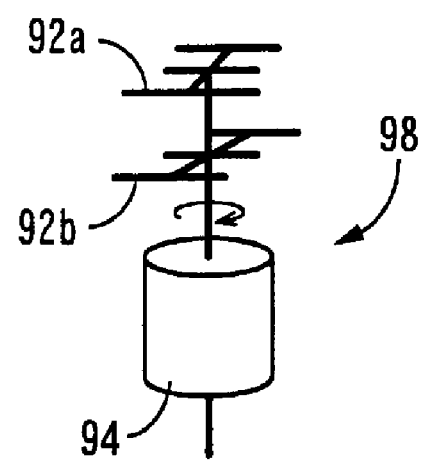
FIG. 21 is a view illustrating a further example of the receiver antenna device provided in the radio-frequency device of the first aspect of the invention.

In the preceding embodiments, the radio-frequency tag communication device 12, 80 is provided with the receiver antenna device 30 having the plurality of receiver antenna elements 28, and is arranged to control the directivity of reception by multiplying the received signals received by the respective receiver antenna elements 28, by the respective PAA weights. However, the radio-frequency tag communication device may be provided with an antenna device 96 consisting of a Yagi antenna 92 having a predetermined directivity, and a directivity control device 94 operable to mechanically rotate the Yagi antenna 92 about an axis, as shown in FIG. 20, for thereby changing the directivity of reception of the antenna device 96 during the detection of the direction toward the radio-frequency tag communication device. The antenna device 96 may be replaced by an antenna device 98 including two Yagi antennas 92a, 92b which have respective different directivities and which are mechanically rotated about an axis by the directivity control device 94, while maintaining the directivities of the two Yagi antennas 92a, 92b, as shown in FIG. 21, for thereby changing the directivity of reception of the antenna device 98. This antenna device 98 permits concurrent reception of the received signals in the first and second maximum-reception-directivity directions.

Figure 22:
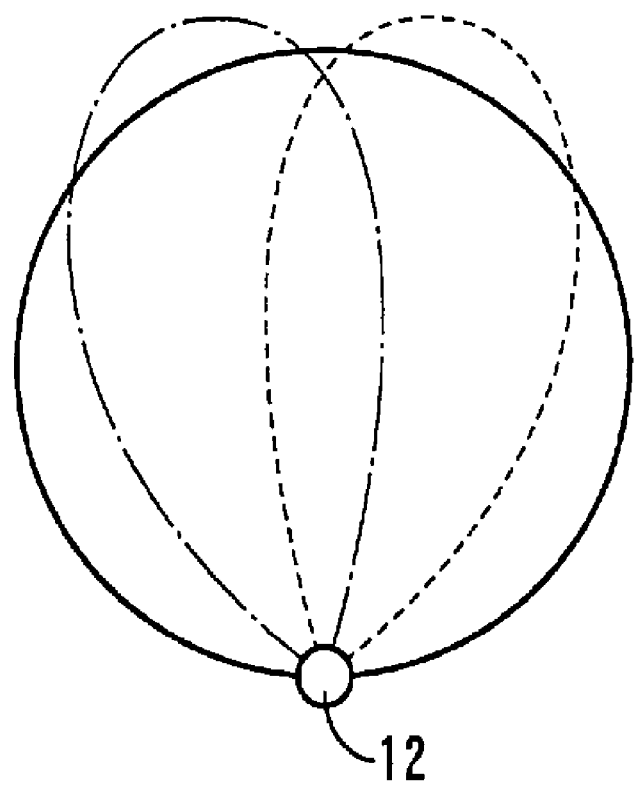
FIG. 22 is a view for explaining a control of directivity of transmission to a direction intermediate between first and second directivity directions, by a PAA processing portion of the radio-frequency tag communication device of FIG. 14.

Further, the transmission-directivity control portion in the form of the PAA processing portion 88 is configured to control the directivity of transmission such that the directivity of transmission is aligned with a direction of a centerline between the first and second maximum-reception-directivity directions. Although the foregoing description of the preceding embodiment does not specifically refer to this control of the directivity transmission, the present control permits suitable radio communication with the communication object in the form of the radio-frequency tag 14. In this case, it is desirable that the controlled directivity of transmission has a main lobe characteristic covering both of the main lobe extending in the first maximum-reception-directivity direction indicated by one-dot chain line in FIG. 22, and the main lobe extending in the second maximum-reception-directivity direction indicated by broken line in FIG. 22. Where the transmission main lobe had a width so small as that of the reception main lobe, a lowest-directivity area between the two reception directivity areas would be unfavorably offset by a highest-transmission-directivity area. This drawback can be effectively eliminated by the transmission main lobe characteristic which covers both the main lobe extending in the first maximum-reception-directivity direction and the main lobe extending in the second maximum-reception-directivity direction.

In the preceding embodiments, the radio-frequency tag communication device 12, 80 is provided with the transmitter antenna element(s) 24 for transmitting the transmitted signal, and the plurality of receiver antenna elements 28 for receiving the received signal. However, the radio-frequency tag communication device may be provided with common transmitter/receiver antenna elements for transmitting the transmitted signal and receiving the received signal. In this case, the antenna device of the radio-frequency tag communication device 12, 80 can be simplified in construction.

In the preceding embodiments, the received-signal-strength detecting portion 52, the direction detecting portion 54, the PAA weight control portion 56, etc. are functional portions of the DSP 16. However, these functional portions may be replaced by respective discrete control devices, which may be controlled by either digital or analog signal processing operations.

It is to be understood that the first aspect of this invention may be embodied with various other changes not departing from the spirit and scope of the first aspect.

Embodiment 3

Figure 23:
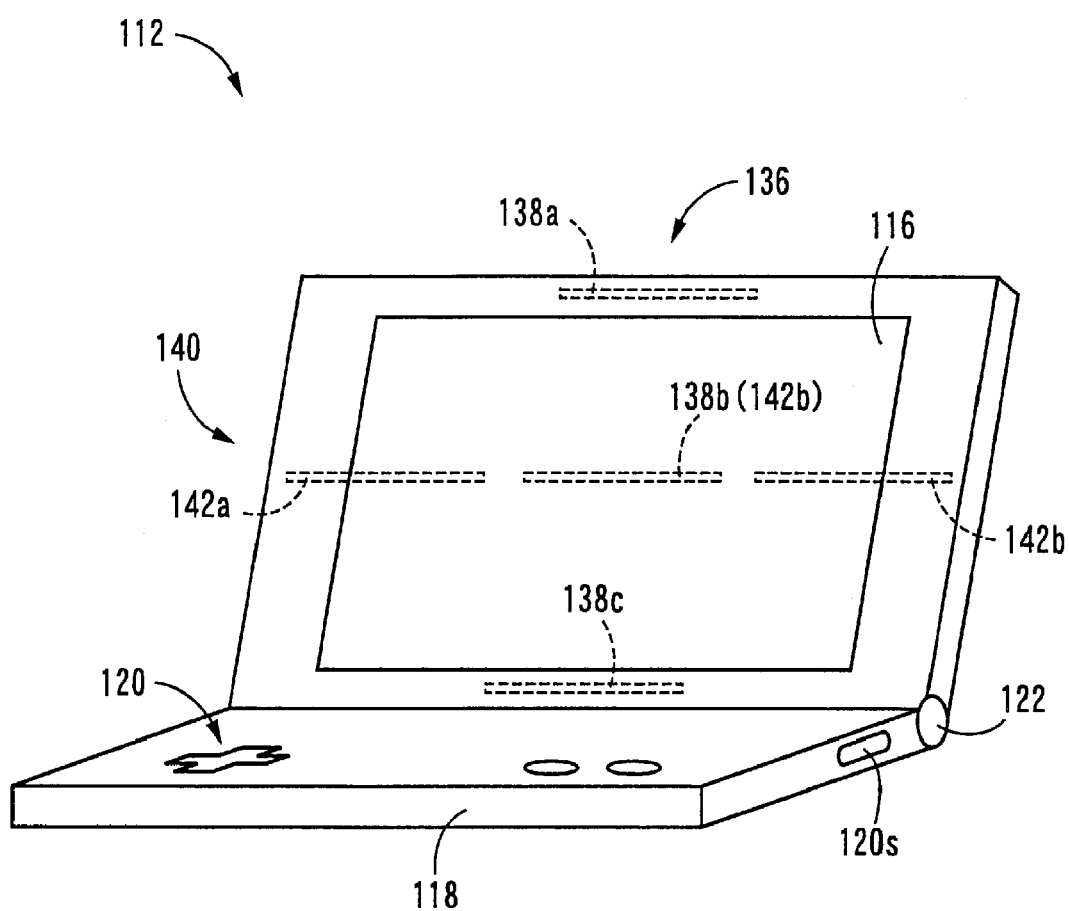
FIG. 23 is a perspective view showing an appearance of one embodiment of a radio-frequency tag communication device according to a second aspect of this invention.

FIG. 23 is a perspective view showing an appearance of one embodiment of a radio-frequency tag communication device 112 according to a second aspect of this invention. Like the radio-frequency tag communication device 12 in the above-described radio-frequency tag communication system 10 shown in FIG. 1, the radio-frequency tag communication device 112 shown in FIG. 23 is suitably used as an interrogator of the radio-frequency tag communication system 10. The radio-frequency tag communication device 112 includes: a planar display portion (first planar portion) 116 configured to display images relating to radio communication with the radio-frequency tag 14; a planar holder portion (second planar portion) 118 at which the radio-frequency tag communication device 112 is held for carrying; and an operator's control portion 120 having a plurality of operating pushbuttons (switches) disposed on the holder portion 118. The display portion 116 and the holder portion 118 are hinged to each other pivotally foldably about a shaft portion 122. The radio-frequency tag communication device 112 is a portable device (handy scanner) which is movable in a predetermined area (for example, in a room in which the communication object in the form of the radio-frequency tag 14 is located). The operator's control portion 120 includes a selector pushbutton 120s provided to selectively permit or inhibit the directivity control described below. The radio-frequency tag communication device 112 includes a vertical array antenna device 136 consisting of a plurality of vertical antenna elements 138a, 138b and 138c, and a horizontal array antenna device 140 consisting of a plurality of horizontal antenna elements 142a, 142b and 142c (the horizontal antenna element 142b also functioning as the vertical antenna element 138b). The vertical antenna elements 138 and the horizontal antenna elements 142 are integrally built in the display portion 116, and their attitudes with respect to a reference coordinate are changed with a change of the attitude of the display portion 116.

Figure 24:
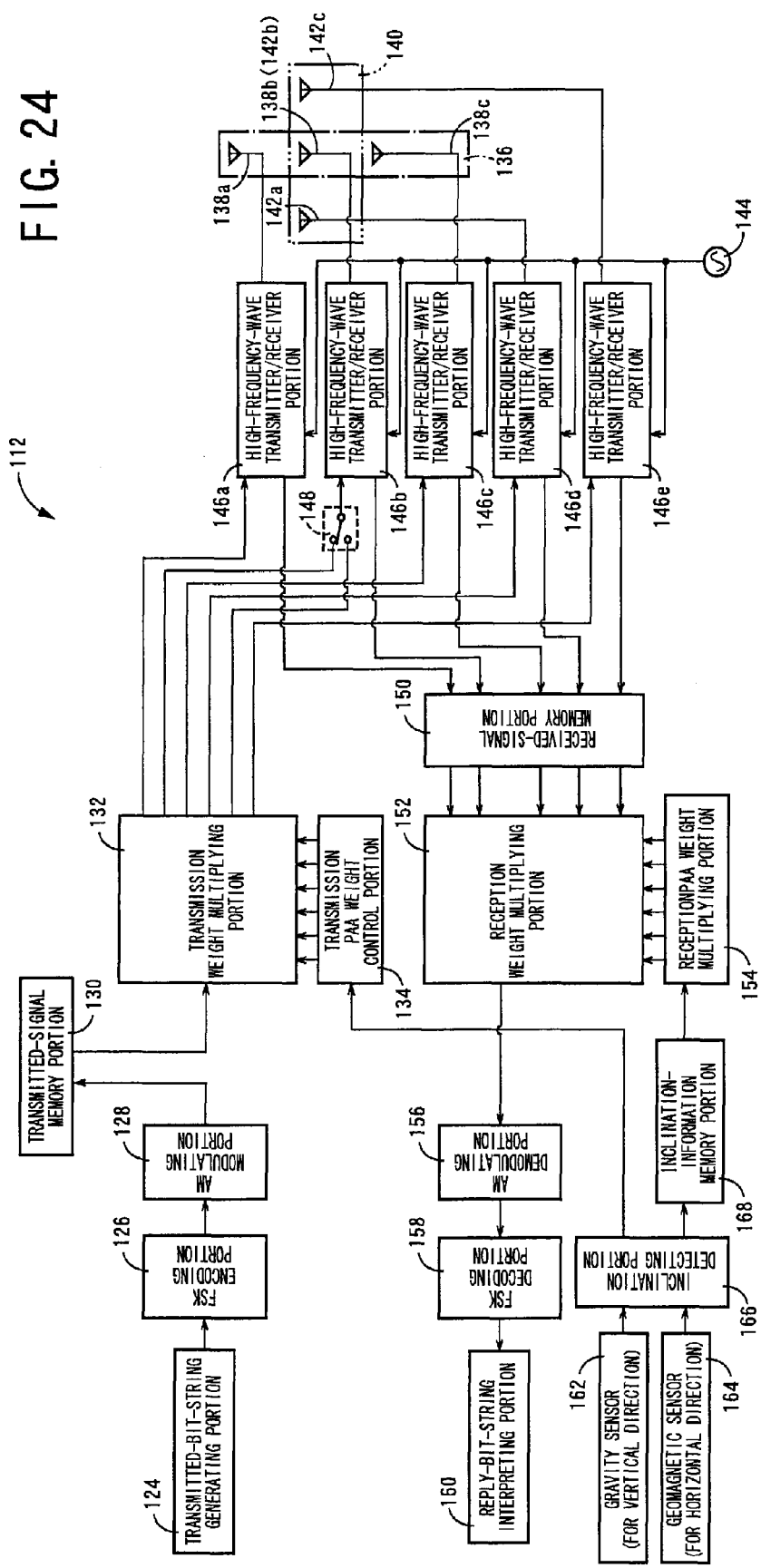
FIG. 24 is a view for explaining an arrangement of the radio-frequency tag communication device of FIG. 23.

FIG. 24 is a view for explaining an arrangement of the radio-frequency tag communication device 112. As shown in FIG. 24, the radio-frequency tag communication device 112 includes: a transmitted-bit-string generating portion 124 configured to generate a string of command bits corresponding to the transmitted signal to be transmitted to the radio-frequency tag 14; an FSK encoding portion 126 configured to encode the digital signal received from the transmitted-bit-string generating portion 124, according to the FSK method, for example; an AM modulating portion 128 configured to modulate the digital signal encoded by the FSK encoding portion 126, according to the AM method, and to apply the modulated digital signal to a transmitted-signal memory portion 130; a PAA (Phased Array Antenna) processing portion in the form of a transmission weight multiplying portion 132 configured to read out the transmitted signal from the transmitted-signal memory portion 130 from time to time, and to multiply the transmitted signal received by predetermined transmission weights (transmission PAA weights); and a transmission PAA weight control portion 134 configured to control the transmission weight used by the transmission weight multiplying portion 132.

The radio-frequency tag communication device 112 further includes: a local-signal generating portion 144 configured to generate a predetermined local signal; and a plurality (five in the example of FIG. 24) of high-frequency-wave transmitter//receiver portions 146a, 146b, 146c, 146d and 146e (hereinafter collectively referred to as "high-frequency-wave transmitter/receiver portions 146", unless otherwise specified) each configured to increase the frequency of the transmitted signal received from the transmission weight multiplying portion 132, according to the local signal received from the local-signal generating portion 14, to apply the transmitted signal to the corresponding one of the vertical and horizontal antenna elements 138, 142, to reduce the frequency of the received signal received by the corresponding vertical or horizontal antenna element 138,142, according to the local signal received from the local-signal generating portion 144, and to apply the received signal to a received-signal memory portion 150. The same antenna element is used as the horizontal antenna element 142b and the vertical antenna element 138b, that is, commonly used for the vertical array antenna device 136 and the horizontal array antenna device 140. Between the transmission weight multiplying portion 132 and the high-frequency-wave transmitter/receiver portion 146b, there is provided a switching portion 148 configured to selectively apply the transmitted signal to one of the vertical array antenna device 136 and the horizontal array antenna device 140.

The radio-frequency tag communication device 112 further includes: a reception PAA processing portion in the form of a reception weight multiplying portion 152 configured to read out the received signal from the received-signal memory portion 150 from time to time, and to multiply the received signal by a predetermined reception weight (reception PAA weight); a reception PAA weight control portion 154 configured to control the reception weight used by the reception weight multiplying portion 152; an AM demodulating portion 156 configured to demodulate the received signal received from the reception weight multiplying portion 152, according to the AM method, for obtaining an AM-demodulated wave; an FSK decoding portion 158 configured to decode the AM-demodulated wave received from the AM demodulating portion 156, according to the FSK method; and a reply-bit-string interpreting portion 160 configured to interpret the decoded signal received from the FSK decoding portion 158, for thereby reading an information signal modulated by the radio-frequency tag 14.

The radio-frequency tag communication device 112 further includes an attitude sensor device configured to detect an attitude of the antenna device in a predetermined coordinate system. The attitude sensor device consists of a gravity sensor 162 which is an inclination sensor for detecting an angle of inclination of the vertical array antenna device 136 with respect to the gravity direction, and a geomagnetic sensor 164 which is a direction sensor for detecting the azimuth of the horizontal array antenna device 140 with respect to the geomagnetic direction. The radio-frequency tag communication device 112 further includes: an inclination detecting portion 166 for detecting angles of inclination of the vertical array antenna device 136 and the horizontal array antenna device 140 (or angles of inclination of the body of the radio-frequency tag communication device 112), on the basis of the outputs of the gravity sensor 162 and the geomagnetic sensor 164; and an inclination-information memory portion 168 for storing a reception PAA weight corresponding to the angles of inclination detected by the inclination detecting portion 166.

Figure 25:
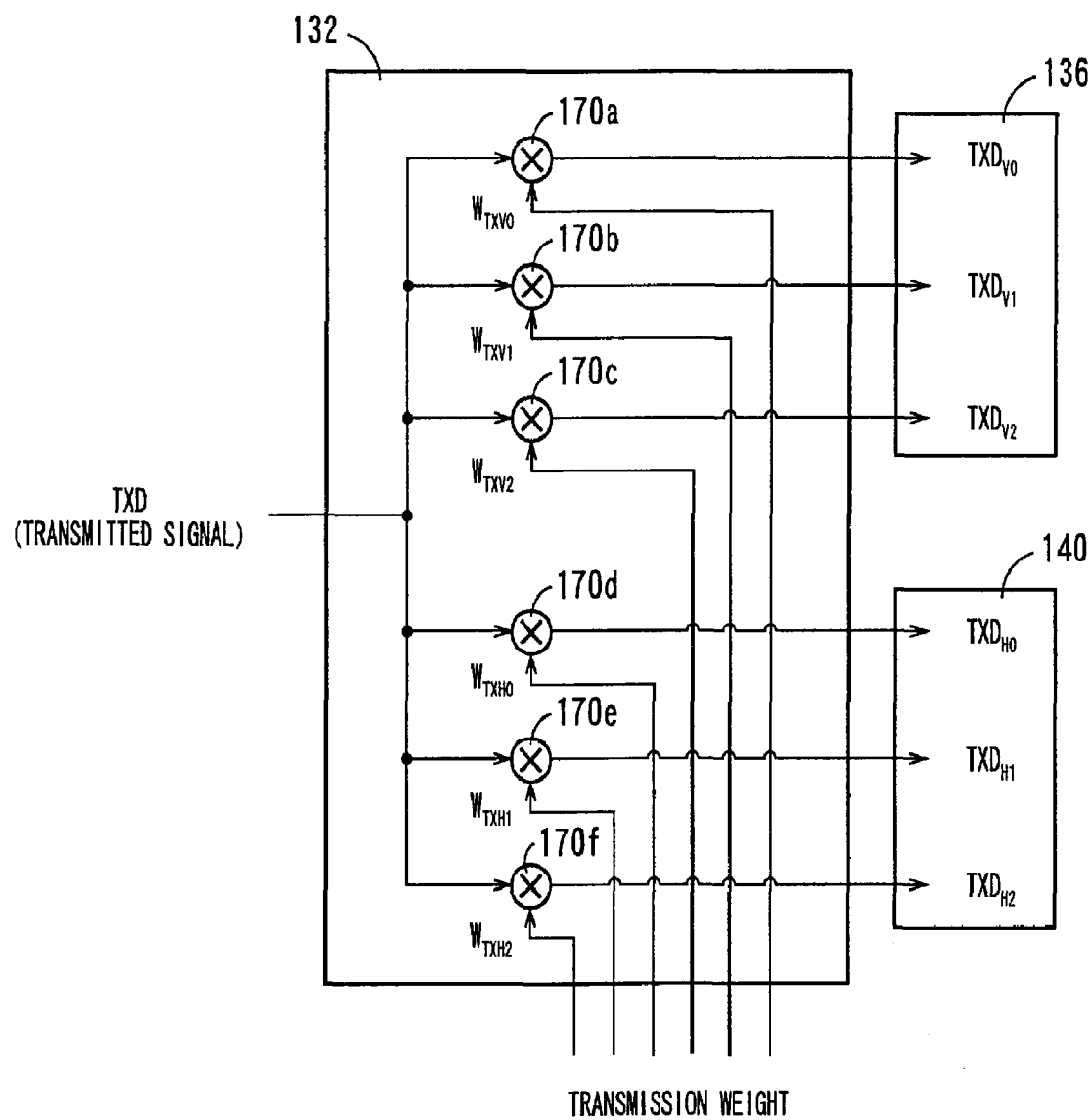
FIG. 25 is a view showing in detail an arrangement of a transmission weight multiplying portion of the radio-frequency tag communication device of FIG. 24.

FIG. 25 is a view showing in detail an arrangement of the transmission weight multiplying portion 132. As shown in FIG. 25, the transmission weight multiplying portion 132 includes a plurality of (six in the example of FIG. 25) multipliers 170a, 170b, 170c, 170d, 170e and 170f (hereinafter collectively referred to as "multipliers 170", unless otherwise specified) configured to multiply the transmitted signals read out from the transmitted-signal memory portion 130, by respective transmission PAA weights, and to apply the transmitted signals multiplied by the weights to the respective high-frequency-wave transmitter/receiver portions 146 corresponding to the respective antenna elements 138, 142. The multiplier 170a corresponds to the vertical antenna element 138a, and the multiplier 170b corresponds to the vertical antenna element 138b, while the multiplier 170c corresponds to the vertical antenna element 138c. The multiplier 170d corresponds to the horizontal antenna element 138d, and the multiplier 170e corresponds to the horizontal antenna element 138e, while the multiplier 170f corresponds to the horizontal antenna element 138f. As described above, the same antenna element is commonly used as the vertical antenna element 138b and the horizontal antenna element 142b, and the switching portion 148 selects one of the transmitted signals received from the multipliers 170b and 170e to the antenna element functioning as the vertical antenna element 138b or horizontal antenna element 142b.

Figure 26:
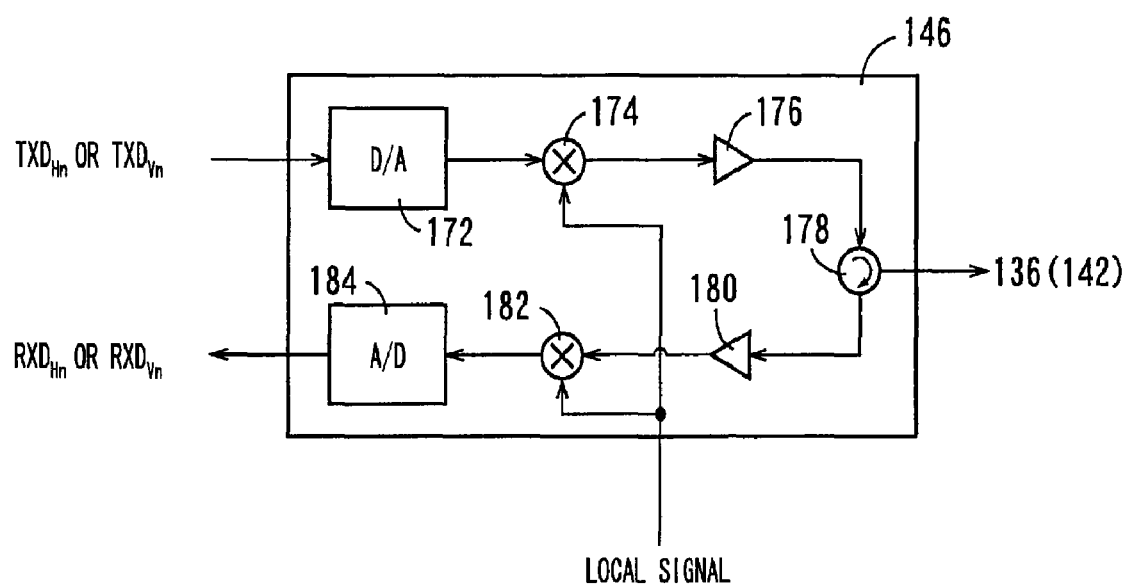
FIG. 26 is a view showing in detail an arrangement of a high-frequency-wave transmitter/receiver portion of the radio-frequency tag communication device of FIG. 24.
Figure 27:
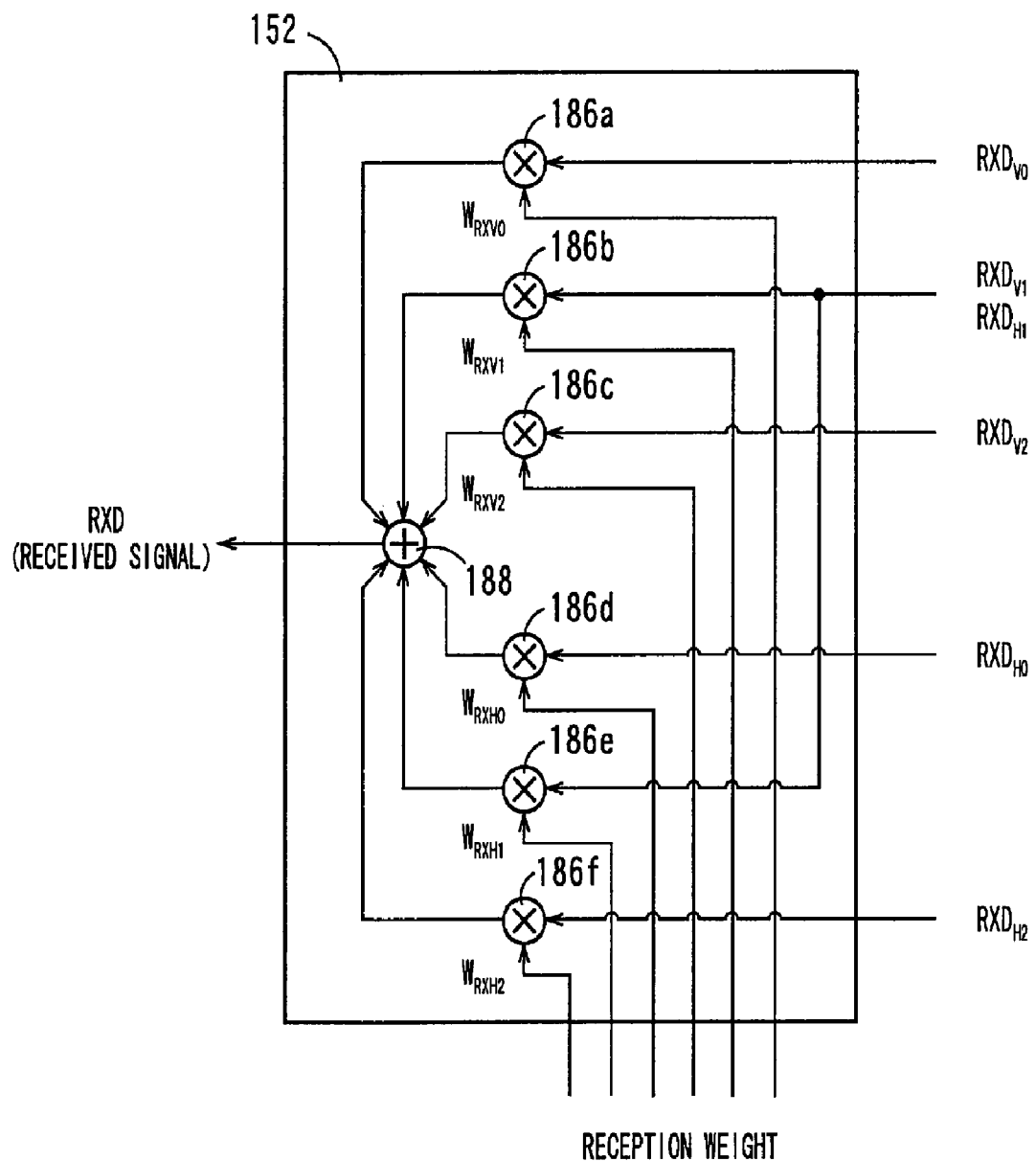
FIG. 27 is a view showing in detail an arrangement of a reception weight multiplying portion of the radio-frequency tag communication device of FIG. 24.

FIG. 26 is a view showing in detail an arrangement of each high-frequency-wave transmitter/receiver portion 146. As shown in FIG. 26, the high-frequency-wave transmitter/receiver portion 146 includes: a transmitted-signal D/A converting portion 172 configured to convert the transmitted signal received from the transmission weight multiplying portion 132, into an analog signal: an up converter 174 configured to increase the frequency of the analog transmitted signal received from the transmitted-signal D/A converting portion 172, by an amount equal to the frequency of the local signal generated by the local-signal generating portion 144; a transmitted-signal amplifier 176 configured to amplify the transmitted signal received from the up converter 174; a directional coupler 178 configured to apply the transmitted received from the transmitted-signal amplifier 176, to the corresponding antenna element 136, 142, and to apply the received signal received by the corresponding antenna element 136, 142, to a received-signal amplifier 180; the received-signal amplifier 180 configured to amplify the received signal received from the directional coupler 178; a down converter 180 configured to reduce the frequency of the received signal received from the received-signal amplifier 180, by an amount equal to the frequency of the local signal generated by the local-signal generating portion 144; and a received-signal A/D converting portion 182 configured to converter the received signal received from the down converter 182, into FIG. 27 is a view showing in detail an arrangement of the reception weight multiplying portion 152. As shown in FIG. 27, the reception weight multiplying portion 152 includes: a plurality of (six in the example of FIG. 27) multipliers 186a, 186b, 186c, 186d, 186e and 186f (hereinafter collectively referred to as "multipliers 186", unless otherwise specified) configured to multiply the received signals read out from the received-signal memory portion 150, by respective transmission PAA weights; and a combining portion 188 configured to combine together the signals received from the multipliers 186, into a composite signal to be applied to the above-described AM demodulating portion 156. The multiplier 186a corresponds to the vertical antenna element 138a, and the multiplier 186b corresponds to the vertical antenna element 138b, while the multiplier 186c corresponds to the vertical antenna element 138c. The multiplier 186d corresponds to the horizontal antenna element 142a, and the multiplier 186e corresponds to the horizontal antenna element 142b, while the multiplier 186f corresponds to the horizontal antenna element 152c. As described above, the same antenna element is commonly used as the vertical antenna element 138b and the horizontal antenna element 142b, and the received signal received by this antenna element is applied to one of the multipliers 186b, 186e which is selected depending upon whether the directivity of communication is to be controlled in the vertical direction or in the horizontal direction.

There will next be described an operation of the radio-frequency tag communication device 112 to control the directivity of communication, by reference to FIG. 28 through FIG. 31. The radio-frequency tag communication device 112 operates to control the directivity of communication according to the attitudes of the array antenna devices 136, 140 detected by the gravity sensor 162 and the geomagnetic sensor 164. Described in detail, the directivity of transmission is controlled by controlling the transmission PAA weights to be applied from the transmission PAA weight control portion 134 to the transmission weight multiplying portion 132, and the directivity of reception is controlled by controlling the reception PAA weights to be applied from the reception PAA weight control portion 154 to the reception weight multiplying portion 152. Preferably, the directivity of communication described below in detail is not controlled according to the attitudes of the array antenna devices 136, 140, if the control of the directivity of communication is inhibited, that is, while the selector pushbutton 120s provided on the operator's control portion 120 is placed in the ON position.

Figure 28:
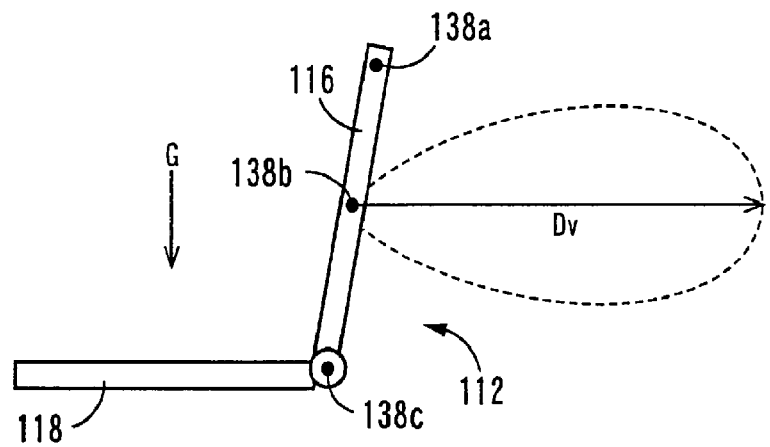
FIG. 28 is a view for explaining a communication directivity control effected in the radio-frequency tag communication device of FIG. 24, with respect to the gravity direction (vertical direction)
Figure 29:
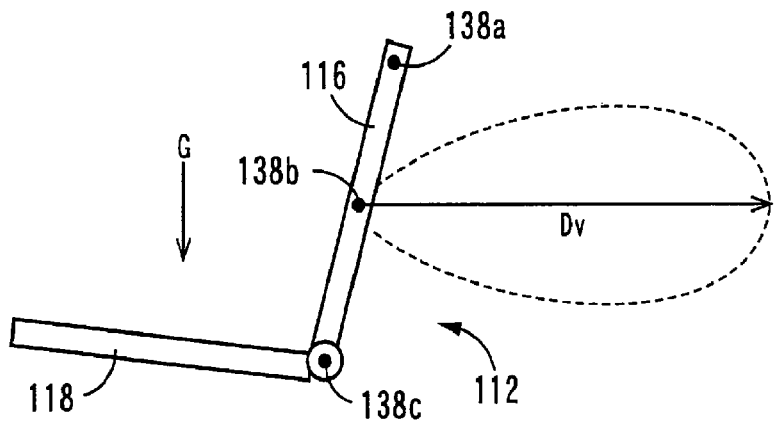
FIG. 29 is a view for explaining the communication directivity control effected in the radio-frequency tag communication device of FIG. 24, with respect to the gravity direction (vertical direction)

FIGS. 28 and 29 are views for explaining the control of the directivity of communication effected in the radio-frequency tag communication device 112, with respect to the gravity direction (vertical direction). In FIGS. 28 and 29, the gravity direction is indicated by arrow-headed line G, and the direction of maximum directivity of communication with the radio-frequency tag 14 with respect to the gravity direction is indicated by arrow-headed line Dv. In the example of FIG. 28, the plane of the holder portion 118 is perpendicular to the gravity direction. In the example of FIG. 29, the radio-frequency tag communication device 112 is rotated with respect to the gravity direction by a predetermined angle, from the state of FIG. 28, while maintaining an angle between the planes of the display portion 116 and holder portion 118. Namely, the display portion 116 has different attitudes with respect to the gravity direction, in the states of FIGS. 28 and 29, so that the vertical array antenna device 136 built in the display portion 116 has different attitudes in the states of FIGS. 28 and 29. The transmission PAA weight control portion 134 is preferably arranged to control the transmission PAA weights to be applied to the transmission weight multiplying portion 132, so that the maximum directivity of transmission is obtained in a predetermined direction with respect to the gravity direction. Similarly, the reception PAA weight control portion 154 is preferably arranged to control the reception PAA weights to be applied to the reception weight multiplying portion 152, so that the maximum directivity of reception is obtained in a predetermined direction with respect to the gravity direction. For example, the direction Dv of maximum directivity of communication is kept perpendicular to the gravity direction irrespective of a change of the attitude of the vertical array antenna device 136 with respect to the gravity direction from the state of FIG. 28 to the state of FIG. 29.

Figure 30:
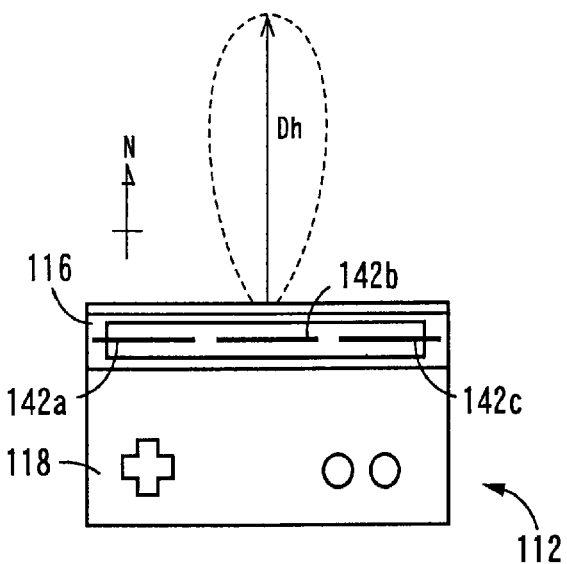
FIG. 30 is a view for explaining a communication directivity control effected in the radio-frequency tag communication device of FIG. 24, with respect to the geomagnetic direction (azimuth direction)
Figure 31:
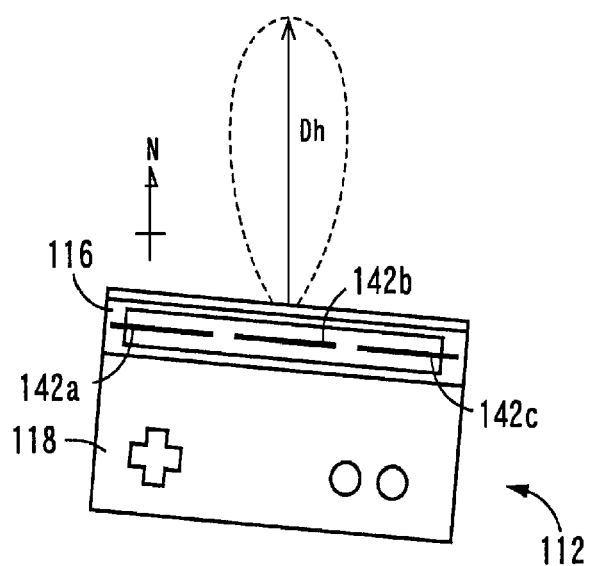
FIG. 31 is a view for explaining the communication directivity control effected in the radio-frequency tag communication device of FIG. 24, with respect to the geomagnetic direction (azimuth direction)

FIGS. 30 and 31 are views for explaining the control of the directivity of communication effected in the radio-frequency tag communication device 112, with respect to the geomagnetic direction (azimuth direction). In FIGS. 30 and 31, the magnetic north is indicated by arrow-headed line N, and the direction of maximum directivity of communication with the radio-frequency tag 14 with respect to the geomagnetic direction is indicated by arrow-headed line Dh. In the example of FIG. 30, the plane of the display portion 116 is perpendicular to the magnetic north. In the example of FIG. 31, the radio-frequency tag communication device 112 is rotated with respect to the magnetic north by a predetermined angle from the state of FIG. 30, while maintaining the angle between the planes of the display portion 116 and holder portion 118. Namely, the display portion 116 has different attitudes with respect to the geomagnetic direction, in the states of FIGS. 30 and 31, so that the horizontal array antenna device 140 built in the display portion 116 has different attitudes in the states of FIGS. 30 and 31. The transmission PAA weight control portion 134 is preferably arranged to control the transmission PAA weights to be applied to the transmission weight multiplying portion 132, so that the maximum directivity of transmission is obtained in a predetermined direction with respect to the geomagnetic direction. Similarly, the reception PAA weight control portion 154 is preferably arranged to control the reception PAA weights to be applied to the reception weight multiplying portion 152, so that the maximum directivity of reception is obtained in a predetermined direction with respect to the geomagnetic direction. For example, the direction Dh of maximum directivity of communication is kept parallel to the magnetic north irrespective of a change of the attitude of the horizontal array antenna device 140 with respect to the geomagnetic direction from the state of FIG. 30 to the state of FIG. 31.

Figure 32:
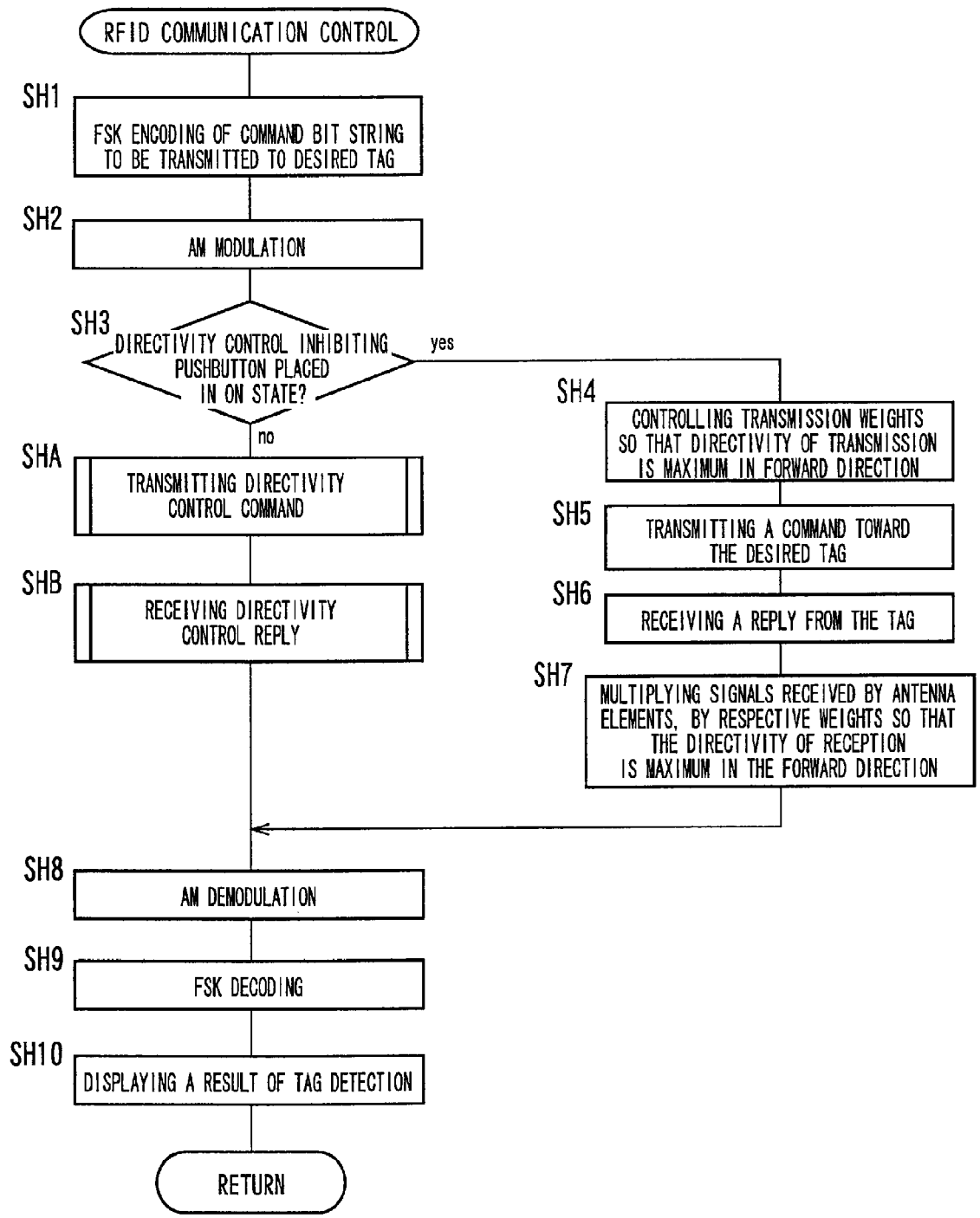
FIG. 32 is a flow chart illustrating a communication control routine (RFID communication control routine) to effect radio communication of the radio-frequency tag communication device of FIG. 24 with the radio-frequency tag of FIG. 3.

FIG. 32 is a flow chart illustrating a communication control routine (RFID communication control routine) to effect radio communication of the radio-frequency tag communication device 112 with the radio-frequency tag 14. This control routine is repeated executed with a predetermined cycle time.

The control routine of FIG. 32 is initiated with step SH1 ("step" being hereinafter omitted) in which a string of command bits corresponding to the transmitted signal to be transmitted to the radio-frequency tag 14 is generated by the transmitted-bit-string generating portion 124, and the string of command bits is encoded by the FSK encoding portion 126, according to the FSK method. Then, the control flow goes to SH2 in which the signal encoded in SH1 is AM-modulated by the AM modulating portion 128, and the AM-modulated signal is stored in the transmitted-signal memory portion 130. The control flow then goes to SH3 to determine whether the selector pushbutton 120s is placed in the ON state to inhibit the directivity control. If a negative determination is obtained in SH3, the control flow goes to SHA to effect a directivity-control-command transmission control illustrated in FIG. 33, and then goes to SHB to effect a directivity-control-reply reception control illustrated in FIG. 35. SHB is followed by SH8 and the subsequent steps. If an affirmative determination is obtained in SH3, the control flow goes to SH4 in which the transmission PAA weights are controlled by the transmission PAA weight control portion 134 so that the directivity of transmission is maximum in the forward direction. Then, the control flow goes to SH5 in which the transmitted signal is read out from the transmitted-signal memory portion 130 and is transmitted toward the search object (communication object) in the form of the radio-frequency tag 14, through the high-frequency-wave transmitter/receiver portions 146, etc. The control flow then goes to SH6 in which the rely signal transmitted from the radio-frequency tag 14 in response to the transmitted signal transmitted in SH5 is received and stored in the received-signal memory portion 150 through the high-frequency-wave transmitter/receiver portions 146, etc. Then, the control flow goes to SH7 in which the reception PAA weights by which the received signals received by the respective antenna elements 138, 142 and read out from the received-signal memory portion 150 are multiplied are controlled by the reception PAA weight control portion 154 so that the directivity of reception is maximum in the forward direction. Then, the control flow goes to SH8 in which the received signals multiplied by the weights by the reception weight multiplying portion 152 are combined together into a composite signal, which is then AM-demodulated by the AM demodulating portion 156. The control flow then goes to SH9 in which the signal demodulated in SH8 is FSK-decoded by the FSK decoding portion 158. and the decoded signal is interpreted by the reply-bit-string interpreting portion 160, whereby information signal relating to the modulation by the radio-frequency tag 14 is read. The control flow then goes to SH10 in which the information read in SH9 is displayed on the display 116, and the present control routine is terminated.

Figure 33:
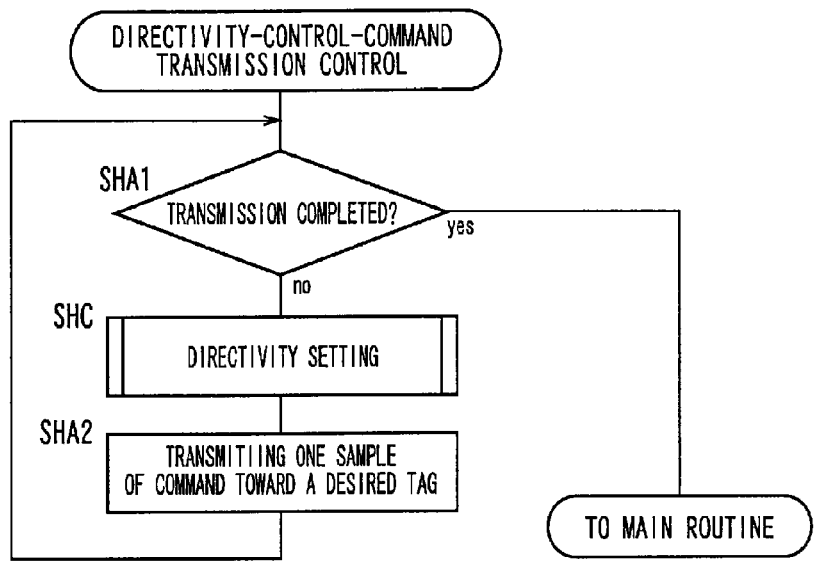
FIG. 33 is a flow chart illustrating a part of the communication control routine of FIG. 32, to effect a directivity-control-command transmission control.
Figure 34:
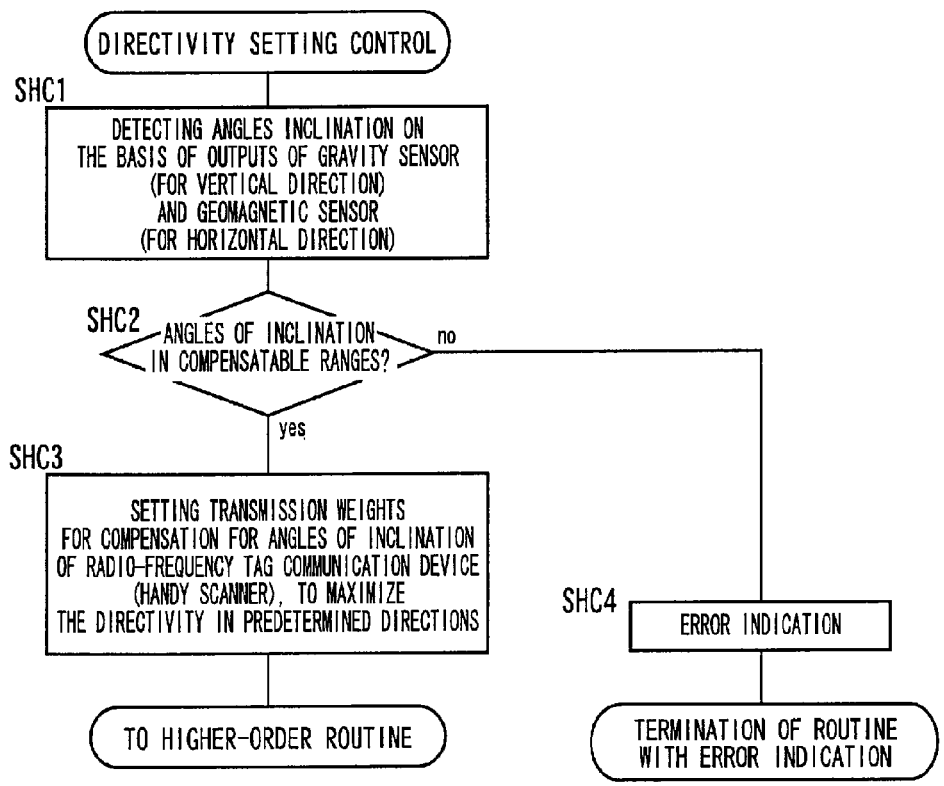
FIG. 34 is a flow chart illustrating another part of the communication control routine of FIG. 32, to effect a directivity setting control.

FIG. 33 is a flow chart illustrating a part of the communication control routine of FIG. 32, to effect a directivity-control-command transmission control. This control is initiated with SHA1 to determine whether the transmission of the transmitted signal toward the radio-frequency tag 14 is completed. If an affirmative determination is obtained in SHA1, the control flow returns to the RFID communication control of FIG. 32. If a negative determination is obtained in SHA1, the control flow goes to SHC in which a directivity setting control of FIG. 34 is effected, and then goes to SHA2 in which one sample of command is transmitted toward the communication object in the form of the radio-frequency tag 14. Then, the control flow goes back to SHAL and the subsequent steps.

FIG. 34 is a flow chart illustrating another part of the communication control routine of FIG. 32, to effect the directivity setting control. This control is initiated with SHC1 in which the angles of inclination (attitude) of the radio-frequency tag communication device 112 are detected on the basis of the outputs of the gravity sensor 162 and the geomagnetic sensor 164. Then, the control flow goes to SHC2 to determine whether the angles of inclination detected in SHC1 are within compensatable ranges. If an affirmative determination is obtained in SHC2, the control flow goes to SHC3 in which the transmission PAA weights are set for compensation for the angles of inclination detected in SHC1, so that the maximum directivity is obtained in the predetermined directions (namely, in the direction perpendicular to the gravity direction, and in the direction parallel to the magnetic north, in the present third embodiment). Then, the control flow returns to the directivity-control-command control of FIG. 33. If a negative determination is obtained in SHC2, the control flow goes to SHC4 in which the display portion 116 provides an indication of an error, and the present control is terminated.

Figure 35:
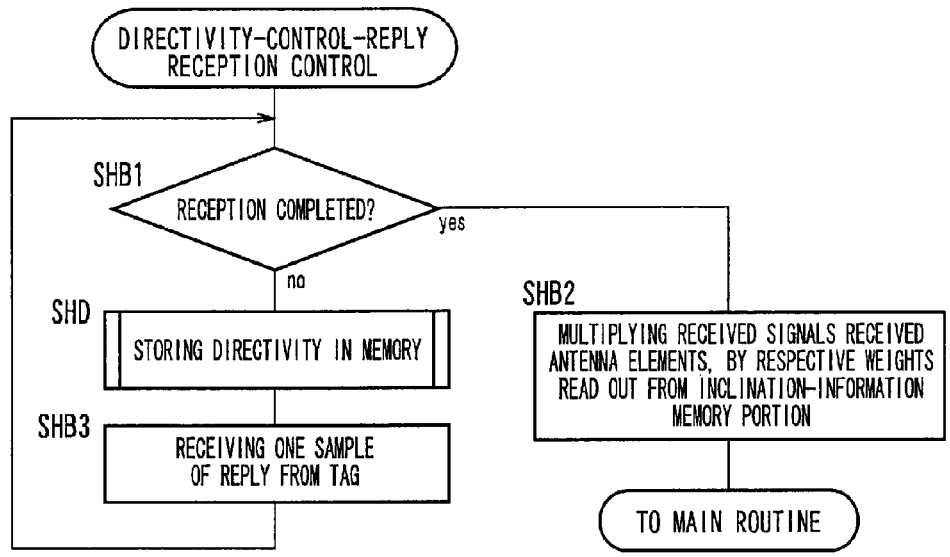
FIG. 35 is a flow chart illustrating a further part of the communication control routine of FIG. 32, to effect a directivity-control-reply reception control.

FIG. 35 is a flow chart illustrating a further part of the communication control routine of FIG. 32, to effect a directivity-control-reply reception control. This control is initiated with SHB1 to determine whether the reception of the reply signal from the radio-frequency tag 14 is completed. If an affirmative determination is obtained in SHB1, the control flow goes to SHB2 in which the received signals received by the antenna elements 138, 142 are multiplied by the respective reception PAA weights read out from the inclination-information memory portion 168. Then, the control flow returns to the RFID communication control of FIG. 32. If a negative determination is obtained in SHB1, the control flow goes to SHD to effect a directivity storing control of FIG. 36, and then goes to SHB3 to receive one sample of reply signal from the communication object in the form of the radio-frequency tag 14. Then, the control flow goes back to SHB1 and the subsequent steps.

Figure 36:
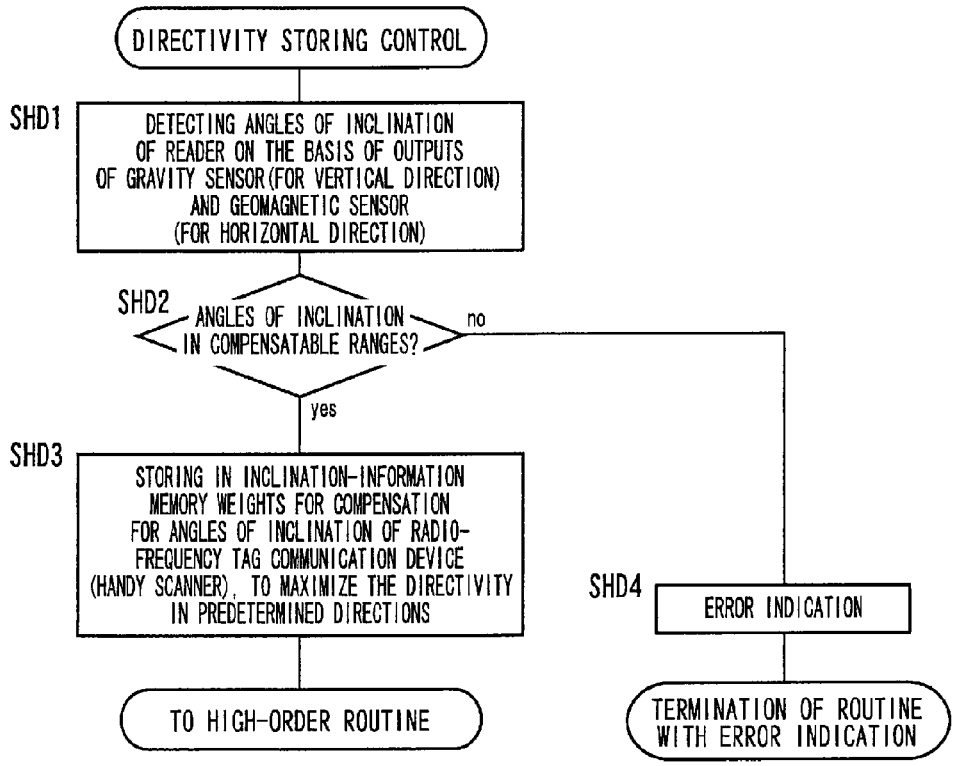
FIG. 36 is a flow chart illustrating a still further part of the communication control routine of FIG. 32, to effect a directivity storing control.

FIG. 36 is a flow chart illustrating a still further part of the communication control routine of FIG. 32, to effect the directivity storing control. This control is initiated with SHD1 in which the angles of inclination (attitude) of the radio-frequency tag communication device 112 are detected on the basis of the outputs of the gravity sensor 162 and the geomagnetic sensor 164. The control flow then goes to SHD2 to determine whether the angles of inclination detected in SHD1 are within compensatable ranges. If an affirmative determination is obtained in SHD2, the control flow goes to SHD3 in which the reception PAA weights are determined for compensation for the angles of inclination detected in SHD1, to maximize the directivity in the predetermined directions, and the determined reception PAA weights are stored in the inclination-information memory portion 168. Then, the control flow returns to the directivity-control-reply reception control of FIG. 35. If a negative determination is obtained in SHD2, the control flow goes to SHD4 in which the display 116 provides an indication of an error, and the present control is terminated.

The radio-frequency tag communication device 112 according to the present embodiment includes the gravity sensor 162 and the geomagnetic sensor 164 functioning as the attitude sensor device configured to detect the attitude of the array antenna devices 136, 140 in the predetermined coordinate system, and the directivity control portion in the form of the transmission PAA weight control portion 134 and the reception PAA weight control portion 154 which are configured to control the directivity of communication with the radio-frequency tag, according to the attitude detected by the attitude sensor device. Accordingly, the direction of the main lobe of the antenna device is kept in the predetermined direction, irrespective of a change of the attitude of the radio-frequency tag communication device 112. Namely, the present embodiment provides the radio-frequency tag communication device 112 capable of optimally controlling the directivity of communication irrespective of its attitude.

The present radio-frequency tag communication device 112 is a portable device which is movable in a predetermined area and the attitude of which is likely to vary during use by the user. However, the maximum directivity of communication is obtained in the desired direction irrespective of the attitude of the portable device.

Further, the attitude sensor device includes the gravity sensor 162 configured to detect the angle of inclination of the vertical array antenna device 136 with respect to the gravity direction. Accordingly, the maximum directivity of communication is obtained in the desired direction irrespective of the attitude of the radio-frequency tag communication device with respect to the gravity direction.

Further, the attitude sensor device includes the geomagnetic sensor 164 configured to detect the angle of inclination of the horizontal array antenna device 140 with respect to the geomagnetic direction. Accordingly, the maximum directivity of communication is obtained in the desired direction irrespective of the attitude of the radio-frequency tag communication device with respect to the geomagnetic direction.

Further, the transmission PAA weight control portion 134 and the reception PAA weight control portion 154 are configured to control directivity of communication such that the controlled directivity of communication is maximized in a predetermined one direction. Accordingly, the maximum directivity of communication is obtained in the predetermined one direction, irrespective of the attitude of the radio-frequency tag communication device.

Further, the radio-frequency tag communication device further includes the selector device configured to selectively enable or disable the directivity control portion to control the directivity of communication. Accordingly, the control of the directivity of communication according to a change of the attitude of the radio-frequency tag communication device can be easily inhibited if this control is not necessary.

Further, the array antenna devices 136, 140 include the plurality of antenna elements 138, 142 commonly used to transmit the transmitted signal and receive the reply signal. Accordingly, the directivity of communication can be suitably controlled with the antenna device which is simple in construction.

Further, each of the array antenna devices 136, 140 includes at least three antenna elements 138, 142 having a directivity of communication in the predetermined one direction. Accordingly, the directivity of communication can be practically controlled.

Further, the array antenna devices (136, 140) include the five antenna elements 138a, 138b (142b), 138c, 142a, 142c the directivity of which is controllable with respect to the gravity direction and the geomagnetic direction, the five antenna elements including one antenna element 138b (142b) commonly used for the gravity and geomagnetic directions. In this case, the directivity of communication can be practically controlled with respect to the gravity direction and the geomagnetic direction.

Further, the radio-frequency tag communication device is a portable device comprising the display portion 116 configured to display images relating to the communication with the radio-frequency tag, and the holder portion 118 at which the radio-frequency tag communication device is held for carrying, the display portion 116 and the holder portion 118 being hinged to each other pivotally foldably, and wherein the above-indicated selector pushbutton 120s is disposed on the holder portion 118. This portable radio-frequency tag communication device can be practically used.

Embodiment 4

Figure 37:
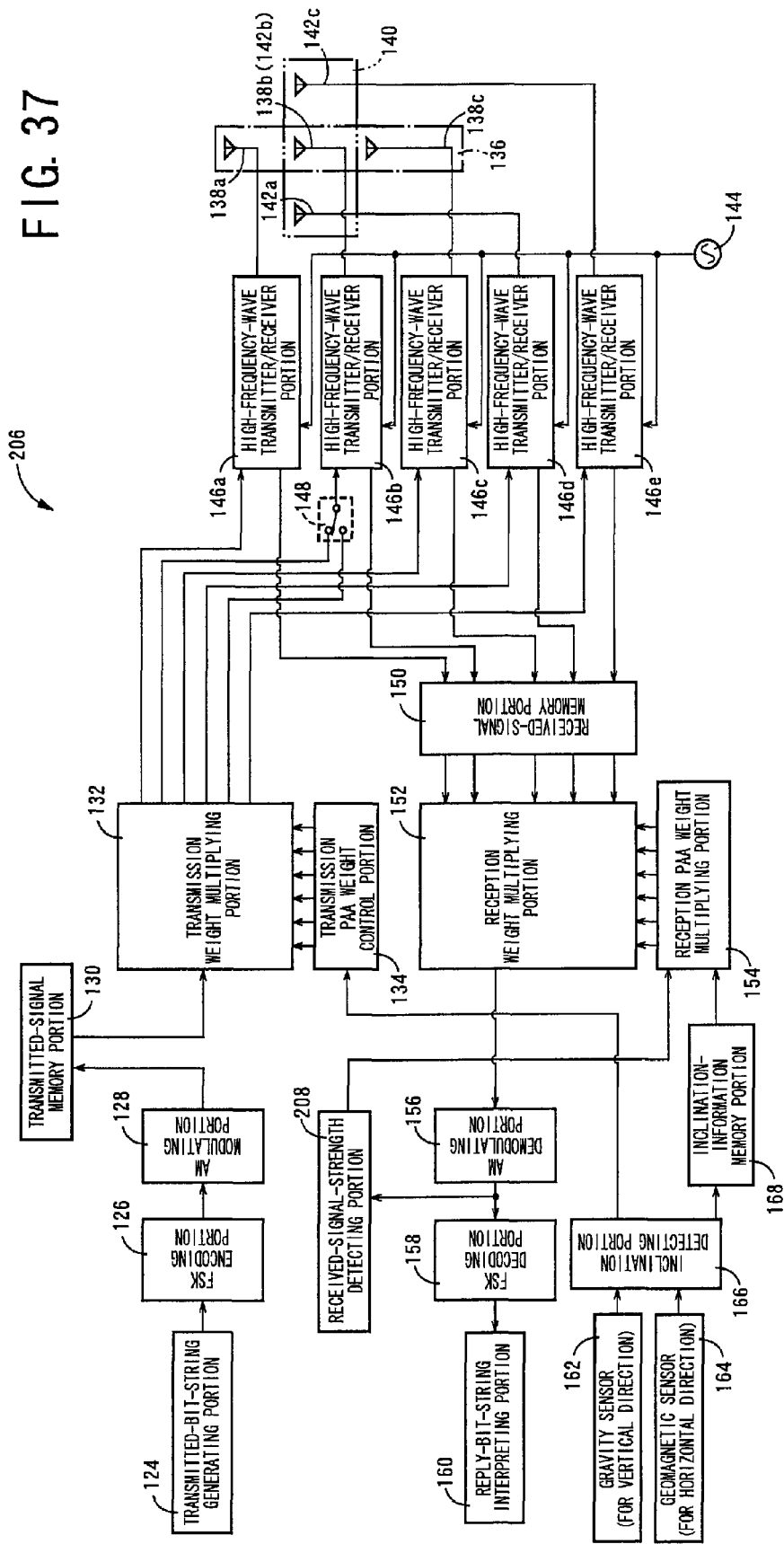
FIG. 37 is a view for explaining an arrangement of another embodiment of the radio-frequency tag communication device according to the second aspect of this invention.

FIG. 37 is a view for explaining an arrangement of another embodiment of a radio-frequency tag communication device 206 according to the second aspect of this invention. Like the radio-frequency tag communication device 12 in the above-described radio-frequency tag communication system 10 shown in FIG. 1, the radio-frequency tag communication device 206 shown in FIG. 37 is suitably used as an interrogator of the radio-frequency tag communication system 10. The radio-frequency tag communication device 206 includes a received-signal-strength detecting portion 208 configured to detect the strength of the received signals received by the array antenna devices 136, 140, on the basis of the demodulated signal received from the AM demodulating portion 156. The strength detected by the received-signal-strength detecting portion 208 is applied to the reception PAA weight control portion 154. The reception PAA weight control portion 154 is configured to control the reception PAA weights on the basis of the strength of the received signals detected by the received-signal-strength detecting portion 208, so that the directivity of reception is maximized in a selected one of a plurality of predetermined directions. Described in detail, where the communication object in the form of the radio-frequency tag 14 is searched for in a plurality of predetermined directions, radio-frequency tags 14 (hereinafter referred to as "reference tags") for specifying the predetermined directions are disposed at respective positions, in addition to the radio-frequency tag 14 affixed to an article to be detected. The direction in which each of the reference tags is located is detected on the basis of the direction in which the strength detected by the received-signal-strength detecting portion 208 has a maximal value during radio communication with each reference tag. The directivity of communication is controlled on the basis of the detected direction in which each reference tag is located. Namely, one of the predetermined directions in which the radio-frequency tag 14 is searched for as the communication object is first determined, and then the communication object is searched for in the determined direction.

Figure 38:
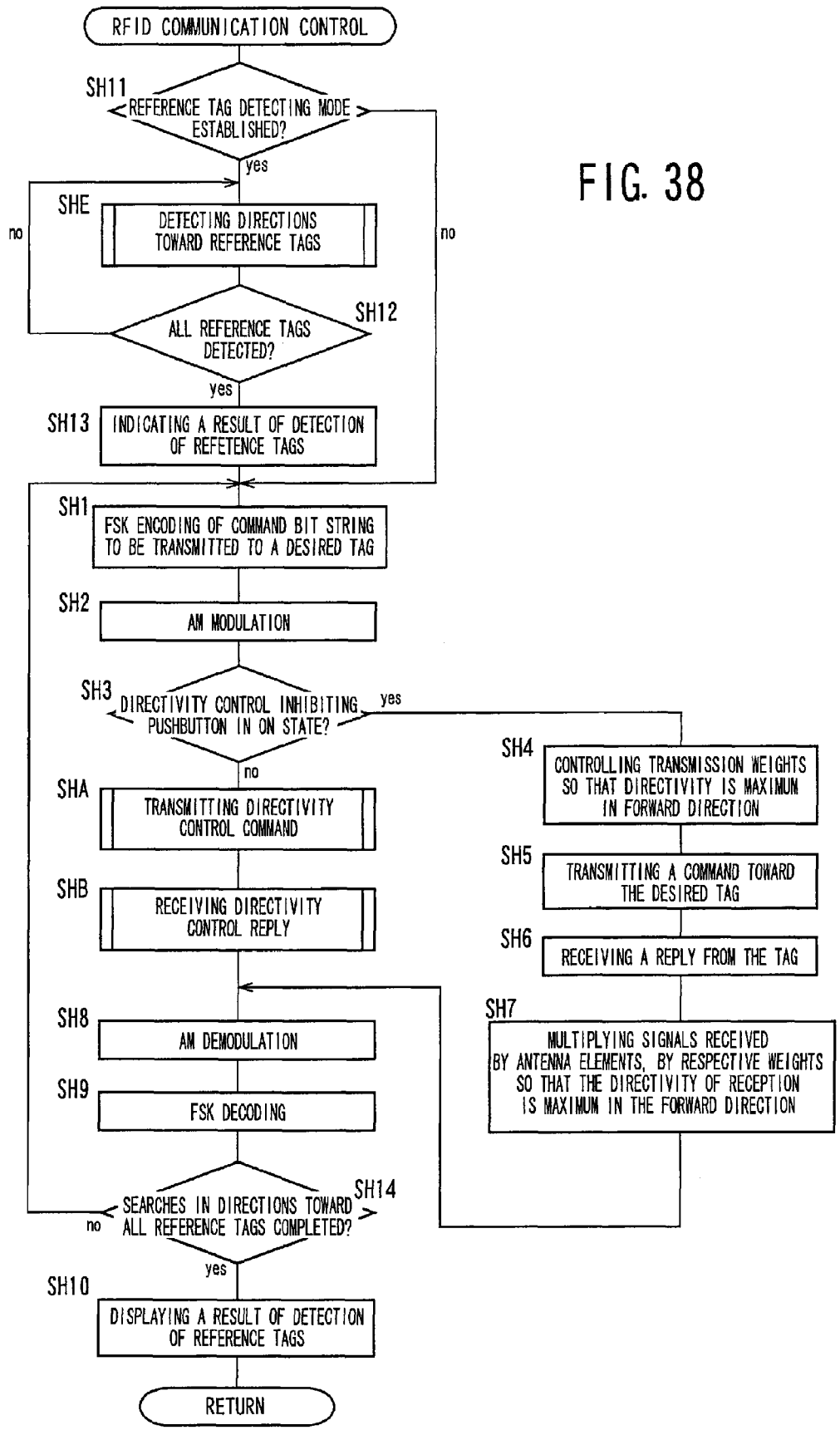
FIG. 38 is a flow chart illustrating a communication control routine (RFID communication control routine) to effect radio communication of the radio-frequency tag communication device of FIG. 37 with the radio-frequency tag of FIG. 3.

FIG. 38 is a flow chart illustrating a communication control routine (RFID communication control routine) to effect radio communication of the radio-frequency tag communication device 206 with the radio-frequency tag 14. This communication control routine is repeated executed with a predetermined cycle time. The same reference signs as used in the communication control routine of FIG. 32 will be used to identify the same steps, which will not be described.

The present communication control routine is initiated with SH11 to determine whether a reference tag detecting mode is established. If a negative determination is obtained in SH11, the control flow goes to SH1 and the subsequent steps. If an affirmative determination is obtained in SH11, the control flow goes to SHE to effect a control of FIG. 39 for detection of the directions toward the reference tags. Then, the control flow goes to SH12 to determine whether all of the reference tags have been detected. If a negative determination is obtained in SH12, the control flow goes back to SHE. If an affirmative determination is obtained in SH12, the control flow goes to SH13 in which the display portion 116 displays a result of the detection of the reference tags, and then goes to the above-described step SH1 and the subsequent steps. In this respect, it is noted that the angles of inclination are in the direction toward each reference tag detected in SHE. The above-described step SH9 is followed by SH15 to determine whether the searches for the radio-frequency tag 14 in the directions toward all reference tags have been are completed. If a negative determination is obtained in SH14, the control flow goes back to SH1 and the subsequent steps. If an affirmative determination is obtained in SH14, the control flow goes to the above-described step SH10, and the present control routine is terminated.

Figure 39:
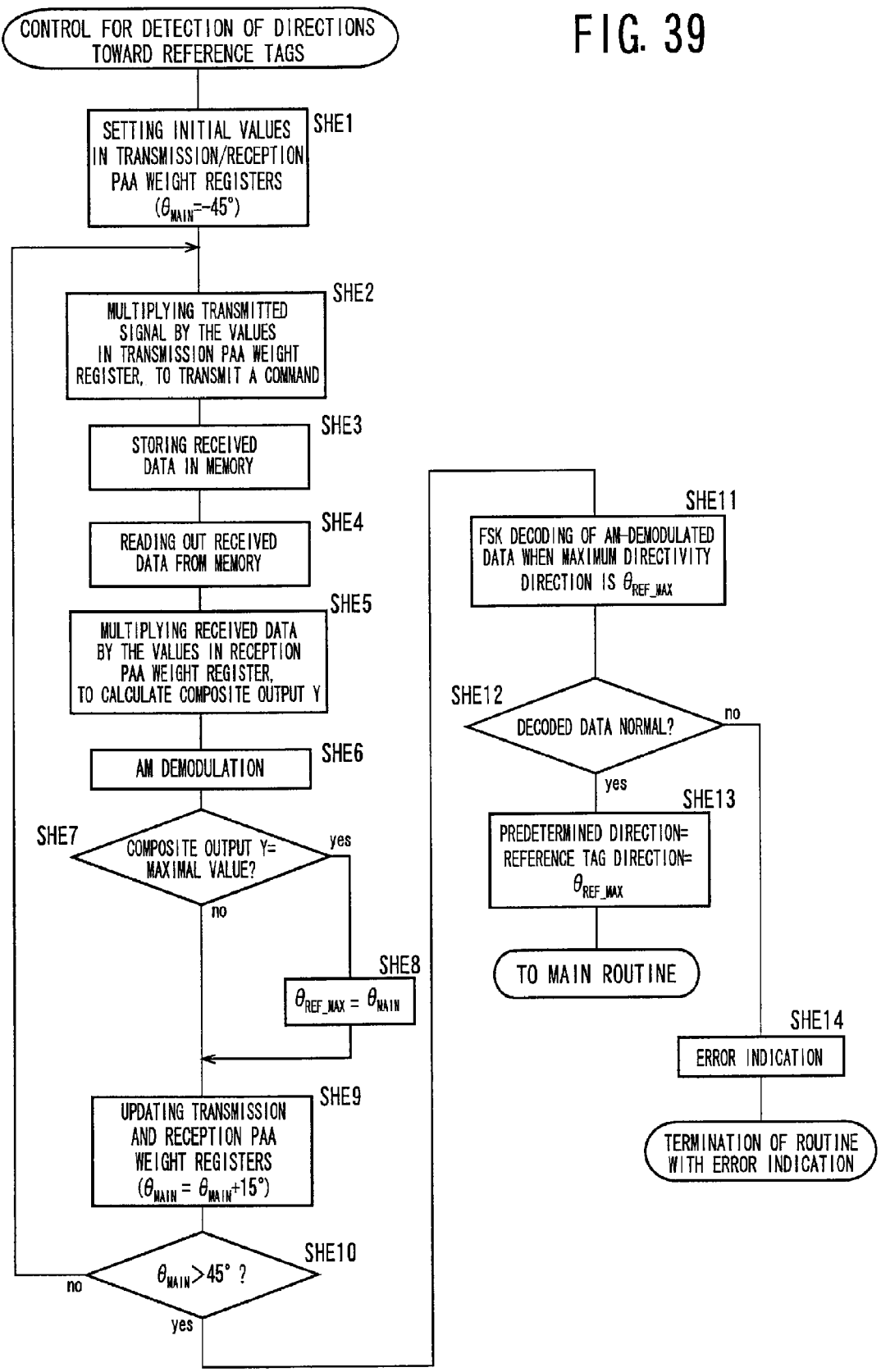
FIG. 39 is a flow chart illustrating a part of the communication control routine of FIG. 38, to effect a control for detection of directions toward reference tags.

FIG. 39 is a flow chart illustrating a part of the RFID control routine of FIG. 38, to effect the control for detection of the directions toward the reference tags. This control is initiated with SHE1 in which an initial value of the direction $\theta_{MAIN}$ is set in each of the transmission PAA weight control portion 134 and the reception PAA weight control portion 154, and is stored in the register. For example, the direction $\theta_{MAIN}$ is set to $\theta=-45°$. Then, the control flow goes to SH2 in which the transmitted signal corresponding to each antenna element 138, 142 is multiplied by the transmission multiplying portion 132, by the value in the register of the transmission PAA weight control portion 134, and the multiplied transmitted signal is transmitted toward the reference tag. The control flow then goes to SHE3 in which the reply signal transmitted from the reference tag in response to the transmitted signal transmitted in SHE2 is received, and the received signals are stored in the received-signal memory portion 150 through the high-frequency-wave receiving portions 146, etc. Then, the control flow goes to SHE4 to read out from the received-signal memory portion 150 the received signals stored in SHE3 in the memory portion 150. The control flow then goes to SHE5 in which the received signal corresponding to each antenna element 138, 142 is multiplied by the reception PAA weight multiplying portion 156, by the value in the register of the reception PAA weight control portion 154, and the multiplied received signals are combined together into a composite output Y. Then, the control flow goes to SHE6 in which the composite output Y calculated in SHE5 is demodulated by the AM demodulating portion 156. SH7 is then implemented to determine whether the composite output Y calculated in SHE5 has a maximal value. If a negative determination is obtained in SHE7, the control flow goes to SHE9 and the subsequent steps. If an affirmative determination is obtained in SHE7, the control flow goes to SHE8 in which the angle $\theta_{REF,MAX}$ indicative of the direction toward the reference tag is set to $\theta_{MAIN}$ ($\theta_{REF\_MAX}=\theta_{MAIN}$), and goes to SHE9 in which the maximum-directivity direction OMMN in the transmission PAA weight control portion 134 and the reception PAA weight control portion 154 is updated (to $\theta_{MAIN}+15°$, for example), and the updated value $\theta_{MAIN}$ is stored in the register. SHE9 is followed by SHE10 to determine whether the present maximum-directivity direction $\theta_{MAIN}$ is larger than 45°. If a negative determination is obtained in SHE10, the control flow goes back to SHE2 and the subsequent steps. If an affirmative determination is obtained in SHE10, the control flow goes to SHE11 in which the AM-demodulated data when the maximum-directivity direction is the direction $\theta_{REF\_MAX}$ toward the reference tag are decoded by the FSK decoding portion 158. Then, the control flow goes to SHE12 to determine whether the decoded data obtained in SHE11 are normal or not. If an affirmative determination is obtained in SHE12, the control flow goes to SHE13 in which the predetermined direction is set to be the direction $\theta_{REF\_MAX}$ toward the reference tag, and then returns to the main routine of FIG. 38. If a negative determination is obtained in SHE12, the control flow goes to SHE14 in which the display portion 116 provides an indication of an error, and the present control is terminated.

In the radio-frequency tag communication device 206 according to the present embodiment described above, the directivity control portion in the form of the transmission PAA weight control portion 134 and the reception PAA weight control portion 154 is configured to control the directivity of communication such that the controlled directivity of communication is maximized in a selected one of a plurality of predetermined directions. Accordingly, the maximum directivity of communication with a selected one of a plurality of radio-frequency tags 14 is controlled to maximize the sensitivity of communication in the corresponding one of the plurality of predetermined directions, irrespective of the attitude of the radio-frequency communication device.

Embodiment 5

There will next be described a further embodiment of the second aspect of this invention, by reference to FIG. 40. The radio-frequency tag communication devices 112, 206 according to the preceding third and fourth embodiments are radio-frequency tag-information reading devices arranged to read information stored in the radio-frequency tag 14, by radio communication with the radio-frequency tag. However, the radio-frequency tag communication device 112, 206 according to the present embodiment function as a radio-frequency tag writing device or a reader/writing arranged to read and write information from or on the radio-frequency tag 14, by radio communication with the radio-frequency tag 14. The present radio-frequency tag communication device has a function of automatically permitting the control of the directivity of communication upon writing of information on the radio-frequency tag 14.

Figure 40:
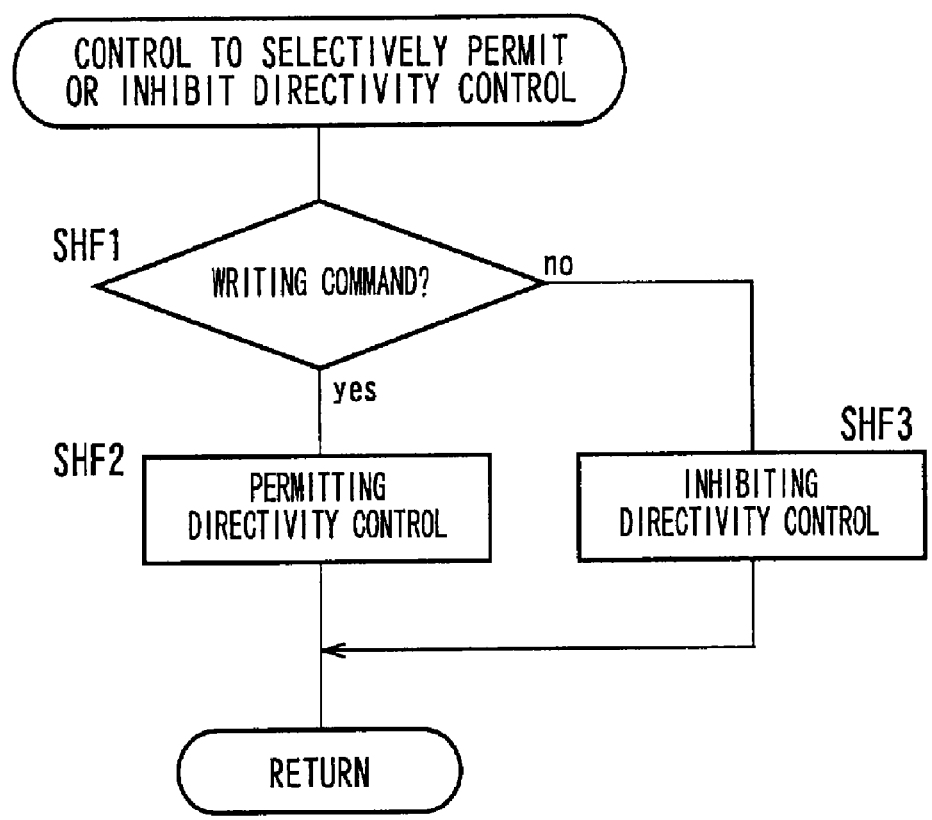
FIG. 40 is a flow chart illustrating a control to selectively permit or inhibit a directivity control in the radio-frequency tag communication device having a function of writing information on the radio-frequency tag of FIG. 3.

FIG. 40 is a flow chart illustrating a control to selectively permit or inhibit the directivity control in the radio-frequency tag communication device 112 having the function of writing information on the radio-frequency tag 14. This control is repeatedly executed with a predetermined cycle time.

The present control is initiated with SHF1 to determine whether the transmitted signal to be transmitted to the radio-frequency tag 14 includes a writing command to write information on the radio-frequency tag 14. If an affirmative determination is obtained in SHF1, the control flow goes to SHF2 in which the control of the directivity of communication according to the attitude of the array antenna devices 136, 140 is permitted, and the present control is terminated. If a negative determination is obtained in SHF1, the control flow goes to SHF3 in which the control of the directivity of communication according to the attitude of the array antenna devices 136, 140 is inhibited, and the present control is terminated.

The radio-frequency tag communication device 112 according to the present embodiment is capable of writing desired information on the radio-frequency tag 14, and the control of the directivity of communication is permitted upon writing of the desired information on the radio-frequency tag 14. Accordingly, the maximum directivity of communication is obtained in the desired direction, upon writing of the desired information on the radio-frequency tag 14, which writing requires a relatively large amount of electric energy and accordingly requires a relatively accurate control of the directivity of communication.

While the preferred embodiments according to the second aspect of this invention have been described in detail by reference to the drawings, it is to be understood that the second aspect is not limited to the details of the illustrated embodiments, but may be otherwise embodied.

In the illustrated embodiments, the transmission weight multiplying portion 132, transmission PAA weight control portion 134, reception weight multiplying portion 152, reception PAA weight control portion 154, etc. are discrete control devices. However, these transmission weight multiplying portion 132, transmission PAA weight control portion 134, reception weight multiplying portion 152, reception PAA weight control portion 154, etc. may be replaced by functional portions of a DSP (Digital Signal Processor) which is a so-called microcomputer system which incorporates a CPU, a ROM, a RAM and which operates to perform signal processing operations according to programs stored in the ROM, while utilizing a temporary data storage function of the RAM. The above-described control portions may be controlled by either digital or analog signal processing operations.

In the illustrated embodiments, the radio-frequency tag communication devices 112, etc. are portable devices movable in a predetermined area. However, the principle of the present invention is equally applicable to a stationary radio-frequency tag communication device which is fixedly installed at a predetermined position. Where the stationary radio-frequency tag communication device is installed on a base which is movable relative to the radio-frequency tag 14, a direction in which the antenna device provided on the radio-frequency tag communication device and the radio-frequency tag 14 are located relative to each other varies with a movement of the base. However, the state of radio communication between the antenna device and the radio-frequency tag 14 can be optimized according to the principle of the present invention.

The radio-frequency tag communication devices 112, etc. according to the illustrated embodiments are provided with the array antenna devices 136, 140 commonly used to transmit the transmitted signal and to receive the reply signal transmitted from the radio-frequency tag 14 in response to the transmitted signal. However, the radio-frequency tag communication device may be provided with a transmitter array antenna device and a receiver array antenna device which are independent of each other.

The radio-frequency tag communication devices 112, etc. according to the illustrated embodiments are arranged to control the directivity of transmission by controlling the transmission PAA weights generated by the transmission PAA weight control portion 134, and to control the directivity of reception by controlling the reception PAA weights generated by the reception PAA weight control portion 154, according to the attitudes detected by the gravity sensor 162 and the geomagnetic sensor 164. However, the radio-frequency tag communication devices may be arranged to control only one of the directivity of transmission and the directivity of reception.

It is to be understood that the second aspect of the invention may be embodied with various other changes not departing from the spirit and scope of the second aspect.

Embodiment 6

Figure 41:
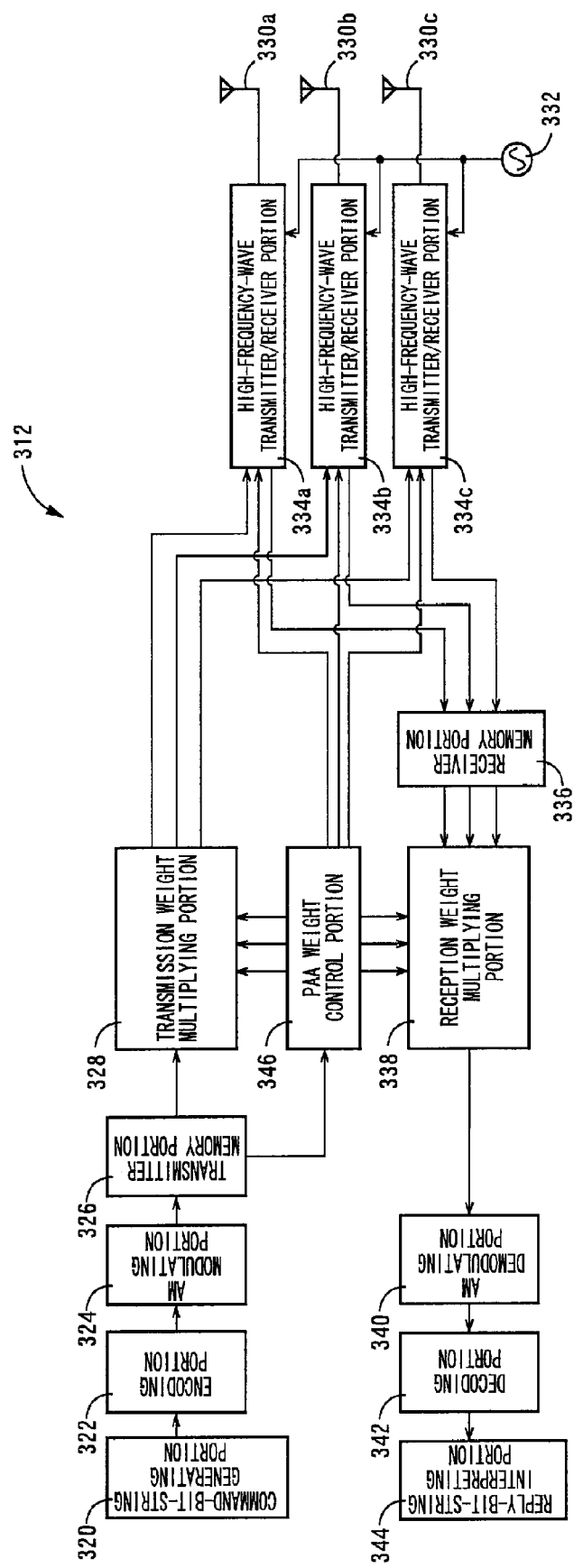
FIG. 41 is a view for explaining an arrangement of one embodiment of a radio-frequency tag communication device according to a third aspect of this invention.

FIG. 41 is a view for explaining an arrangement of one embodiment of a radio-frequency tag communication device 312 according to a third aspect of this invention. Like the radio-frequency tag communication device 12 in the radio-frequency tag communication system 10 shown in FIG. 1, the radio-frequency tag communication device 312 shown in FIG. 41 functions as an interrogator of the radio-frequency tag communication system 10. The radio-frequency tag communication system 10 including the present radio-frequency tag communication device 312 is used for management of articles within a predetermined area of communication, while the radio-frequency tag 14 is provided integrally with an article to be managed, for example, preferably affixed to the article, for example.

The radio-frequency tag communication device 312 includes* a command-bit-string generating portion 320 configured to generate a string of command bits corresponding to the transmitted signal to be transmitted to the radio-frequency tag 14; an encoding portion 322 configured to encode a digital signal received from the command-bit-string generating portion 210, by pulse width modulation, for example; a an AM modulating portion 324 configured to AM-modulate the encoded signal received from the encoding portion 322, and apply (store) the modulated signal to (in) a transmitter memory portion 326, as the transmitted signal; and a transmission PAA (Phased Array Antenna) processing portion in the form of a transmission weight multiplying portion 328 configured to read out transmitted signal from the transmitter memory portion 326 from time to time, and multiply the transmitted signal by predetermined transmission weights (transmission PAA weights).

The radio-frequency tag communication device 312 further includes: a plurality of (three in the example of FIG. 41) transmitter/receiver antenna elements 330a, 330b and 330c (hereinafter collectively referred to as "transmitter/receiver antenna elements 330", unless otherwise specified) for transmitting the interrogating wave $F_c$ toward the radio-frequency tag 14, and for receiving the reply wave $F_r$ transmitted from the radio-frequency tag 14 in response to the transmitted signal; a local-signal oscillator 332 configured to generate a predetermined local signal; and a plurality of (three in the example of FIG. 41) high-frequency-wave transmitter/receiver portions 334a, 334b and 334c (hereinafter collectively referred to as "high-frequency-wave transmitter/receiver portions 334", unless otherwise specified) configured to increase the frequency of the transmitted signals received from the transmission weight multiplying portion 328, according to the local signal received from the local-signal oscillator 332, and transmit the transmitted signals from the plurality of antenna elements 330 as the interrogating wave $F_c$, and to reduce the frequency of the received signals received by the plurality of antenna elements 330, according to the local signal received from the local-signal oscillator 332, and apply (store) the received signals to (in) a receiver memory portion 336.

The radio-frequency tag communication device 312 further includes: a reception PAA processing portion in the form of a reception weight multiplying portion 338 configured to read out the received signals from the receiver memory portion 336 from time to time, and to multiply the received signals by predetermined reception weights (reception PAA weights); an AM demodulating portion 340 configured to AM-demodulate the received signals received from the reception weight multiplying portion 338, for thereby generating an AM-modulated wave; a decoding portion 342 configured to FSK-decode the AM-demodulated wave; a reply-bit-string interpreting portion 344 configured to interpret the decoded signal, for thereby reading an information signal relating to modulation by the radio-frequency tag 14; and a PAA weight control portion 346 configured to control (calculate) the transmission weights used by the transmission weight multiplying portion 328, and the reception weights used by the reception weight multiplying portion 338. The PAA weight control portion 346 functions as a directivity control portion configured to read out the transmitted signal from the transmission memory portion 326 from time to time, and to change the directivity of transmission of the interrogating wave $F_c$ corresponding to the transmitted signal, during a period between moments of initiation and termination of transmission of a unit portion of the transmitted signal, which unit portion permits radio communication with the radio-frequency tag 14.

Figure 42:
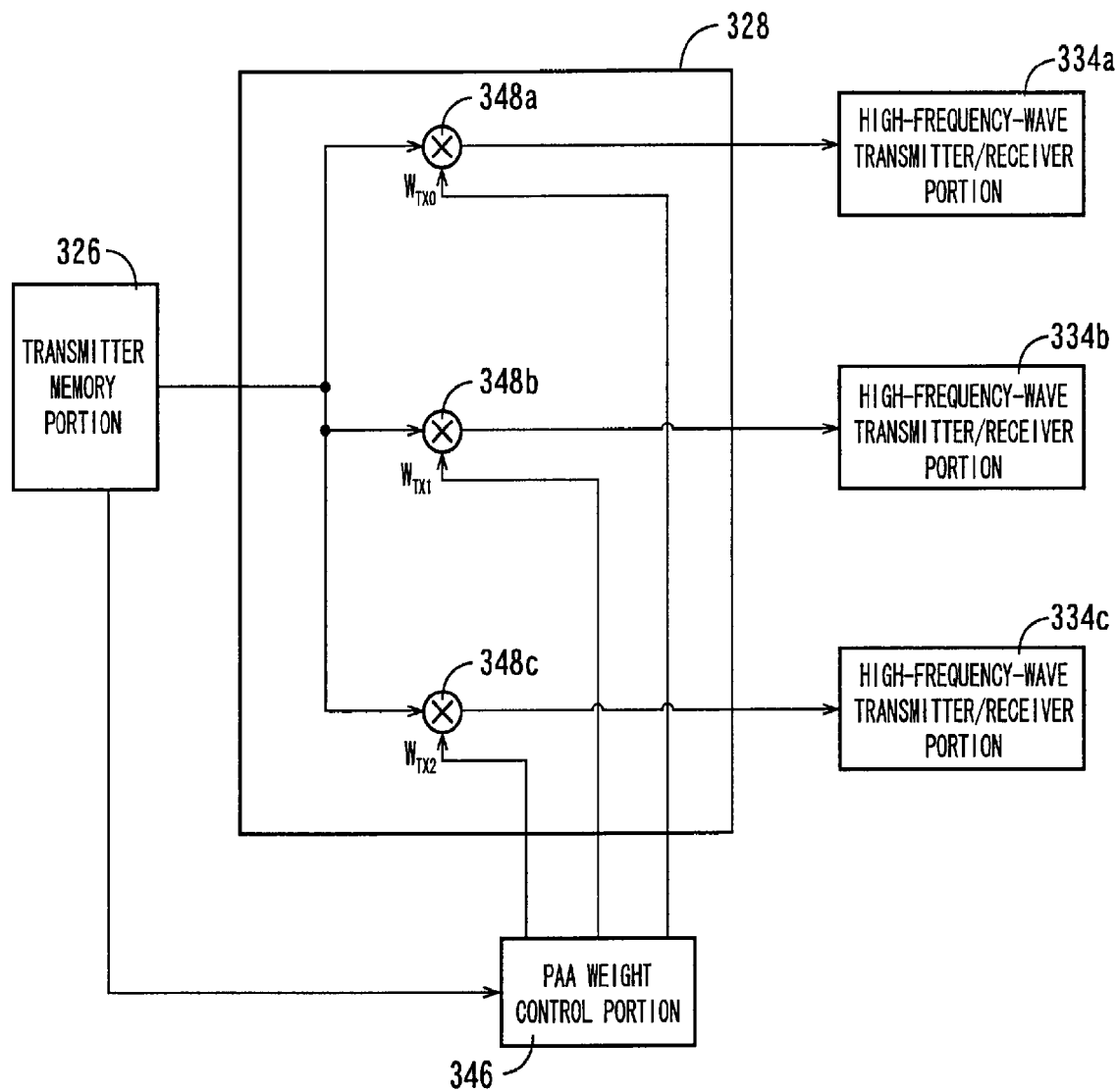
FIG. 42 is a view showing in detail an arrangement of a transmission weight multiplying portion of the radio-frequency tag communication device of FIG. 41.

FIG. 42 is a view showing in detail an arrangement of the transmission weight multiplying portion 328. As shown in FIG. 42, the transmission weight multiplying portion 328 includes a plurality of (three in the example of FIG. 42) multipliers 348a, 348b and 348c (hereinafter collectively referred to as "multipliers 348", unless otherwise specified) configured to multiply the transmitted signals read out from the transmitter memory portion 326, by the respective transmission PAA weights received from the PAA weight control portion 346, and to apply the transmitted signals to the respective high-frequency-wave transmitter/receiver portions 334. The multiplier 348a corresponds to the high-frequency-wave transmitter/receiver portion 334a, and the multiplier 348b corresponds to the high-frequency-wave transmitter/receiver portion 334b, while the multiplier 348c corresponds to the high-frequency-wave transmitter/receiver portion 334c. The outputs of the multipliers 348 are applied to the corresponding high-frequency-wave transmitter/receiver portions 334.

Figure 43:
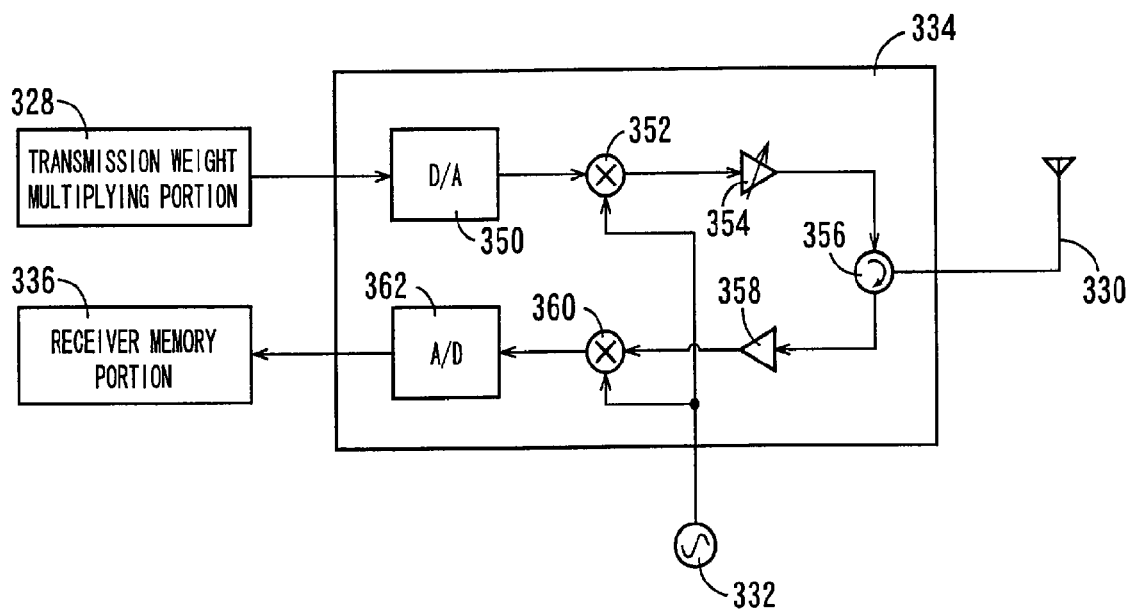
FIG. 43 is a view showing in detail an arrangement of a high-frequency-wave transmitter/receiver portion of the radio-frequency tag communication device of FIG. 41.

FIG. 43 is a view showing in detail an arrangement of each high-frequency-wave transmitter/receiver portion 334. As shown in FIG. 43, the high-frequency-wave transmitter/receiver portion 334 includes: a transmitted-signal D/A converter 350 configured to convert the transmitted signal received from the transmission weight multiplying portion 328, into an analog signal; an up converter 352 configured to increase the frequency of the analog signal received from the transmitted-signal D/A converter 350, by an amount equal to the frequency of the local signal received from the local-signal oscillator 332; a variable amplifier in the form of a transmitted-signal amplifier 354 configured to amplify the transmitted signal received from the up converter 352, at an amplification ratio set by the PAA weight control portion 346; a directional coupler 356 configured to apply the amplified transmitted signal, to the corresponding antenna element 330, and to apply the received signal received from the corresponding antenna element 330, to a received-signal amplifier 358; the received-signal amplifier 358 configured to amplify the received signal received from the directional coupler 356; a down converter 360 configured to reduce the frequency of the amplified received signal received from the received-signal amplifier 358, by an amount equal to the frequency of the local signal received from the local-signal oscillator 332; and a received-signal A/D converter 362 configured to convert the received signal received from the down converter 360, into a digital signal, and to apply the digital signal to the receiver memory portion 336.

Figure 44:
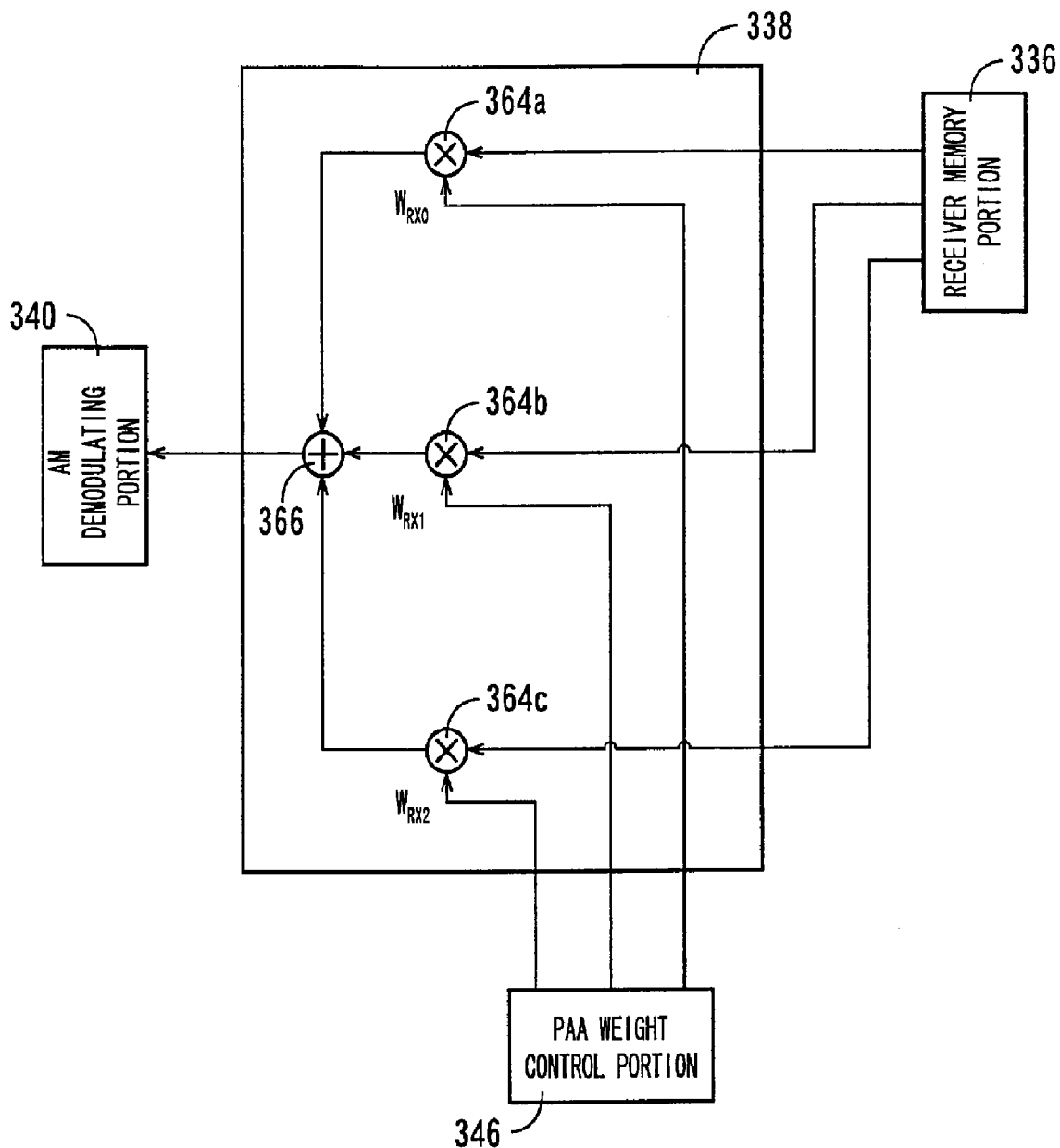
FIG. 44 is a view showing in detail an arrangement of a reception weight multiplying portion of the radio-frequency tag communication device of FIG. 41.

FIG. 44 is a view showing in detail an arrangement of the reception weight multiplying portion 338. As shown in FIG. 44, the reception weight multiplying portion 338 includes: a plurality of (three in the example of FIG. 44) multipliers 364a, 364b and 364c (hereinafter collectively referred to as "multipliers 364", unless otherwise specified) configured to multiply the received signals received from the receiver memory portion 336, by the respective reception PAA weights received from the PAA weight control portion 346; and a combiner 366 configured to combine together the received signals received from the multipliers 364, for obtaining a composite signal to be applied to the AM demodulating portion 340. The multiplier 364a corresponds to the high-frequency-wave transmitter/receiver portion 334a, and the multiplier 364b corresponds to the high-frequency-wave transmitter/receiver portion 334b, while the multiplier 364c corresponds to the high-frequency-wave transmitter/receiver portion 334c.

There will next be described in detail radio communication of the radio-frequency tag communication device 312 with the radio-frequency tag 14. FIG. 45 is a view indicating commands used for radio communication with the radio-frequency tag circuit element 61. As indicated in FIG. 45, a plurality of commands are selectively used depending upon the purpose of the radio communication with the radio-frequency tag circuit element 61. For the purpose of identifying the communication object in the form of the radio-frequency tag circuit element 61, for example, commands "PING" and "SCROLL ID" are used for reading out information from the radio-frequency tag circuit element 61. For the purpose of writing information on the radio-frequency tag circuit element 61, a command "ERASE ID" for initializing the information stored in the circuit element 61, a command "PROGRAM ID" for writing the information, a command "VERIFY" for verifying the information written, and a command "LOCK" for inhibiting the writing of information are used.

Figure 46:
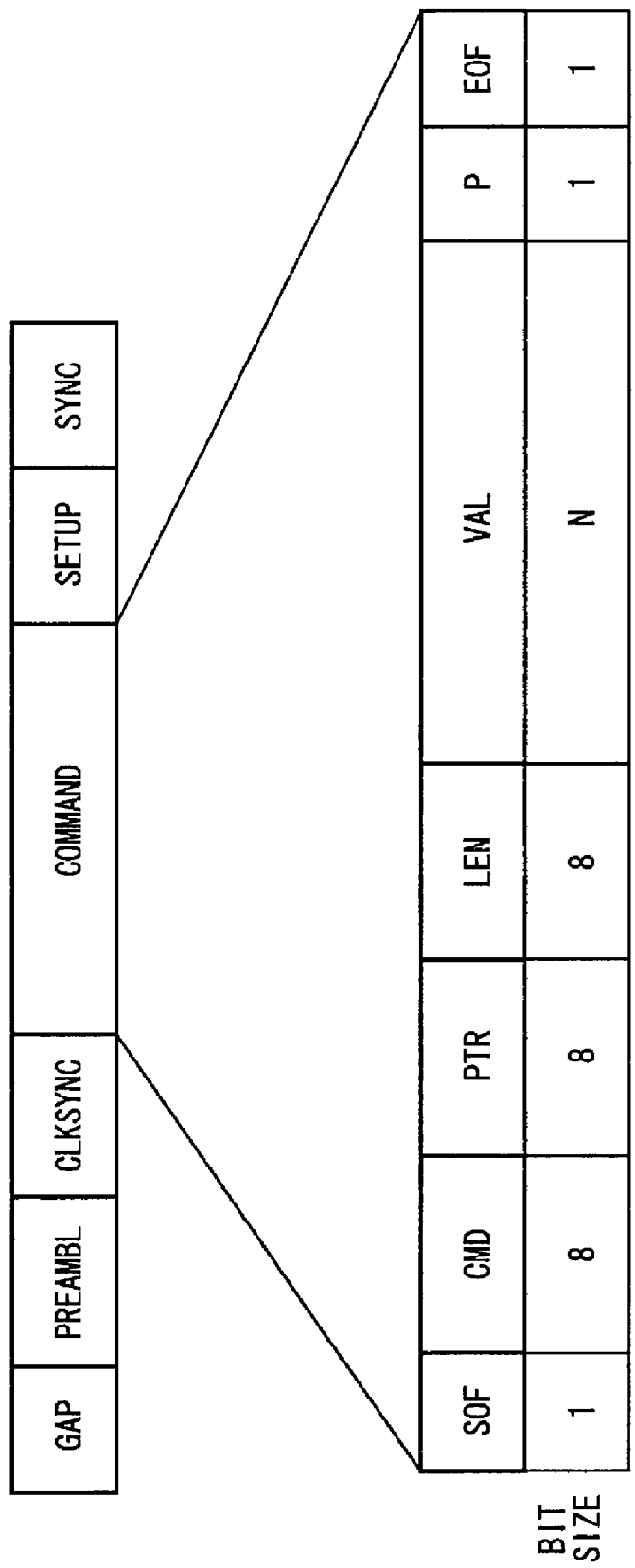
FIG. 46 is a view showing in detail a command frame generated by the radio-frequency tag communication device of FIG. 41.

FIG. 46 is a view showing in detail a command frame generated by the radio-frequency tag communication device 312. This command frame consists of a transmission power-off segment "GAP of a time length of $2T_0$, a transmission power-on segment "PREAMBL" of a time length of $5T_0$, a lock synchronization segment "CLKSYNC" for transmission of 20 0-signals, a command segment "COMMAND", a transmission power-on segment "SET UP" of a time length of $8T_0$, and a segment "SYNC" for transmission of one 1-signal, wherein "$T_0$" represents a time for transmitting one bit. The segment "COMMAND" interpreted by the radio-frequency tag circuit element 61 consists of "SOF" indicative of the beginning of the command, "CMD" which is one of the commands of FIG. 45, pointer "PTR" specifying the memory address of the circuit element 61 at which the information is written, "LEN" indicative of the length of the information, "VAL" which is the content of the information to be transmitted, "P" which is parity information of "PTR", "LEN" and "VAL", and "EOF" indicative of the end of the command.

Figure 47:
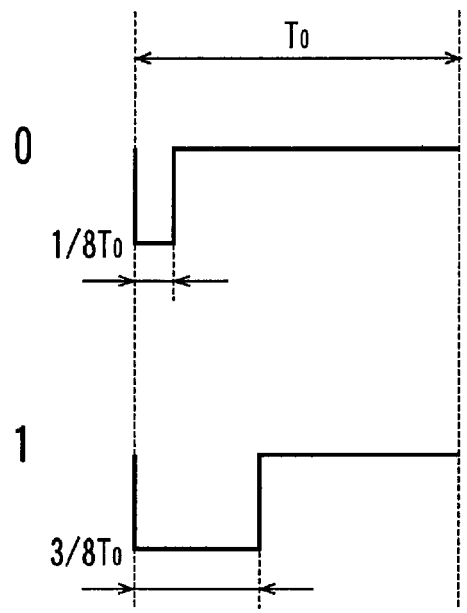
FIG. 47 is a view for explaining an O-signal and an I-signal which are elements of the command frame of FIG. 46.

The command frame consists of the 0-signal, 1-signal, and predetermined transmission power-on and power-off times, as indicated in FIG. 47. For identifying the radio-frequency tag circuit element 61 on which information is written, or for writing information on the circuit element 61, an information signal modulated on the basis of the command frame is generated by the command-bit-string generating portion 320 of the radio-frequency tag communication device 312, and is encoded by the encoding portion 322 and modulated by the AM modulating portion 324. The modulated signal is transmitted from the antenna elements 330 toward the radio-frequency tag 14. When the signal is received by the antenna portion 62 of the communication object in the form of the radio-frequency tag 14 and applied to the circuit element 61, the information corresponding to the command is written in the memory portion 72 under the control of the control portion 76, and reply information is transmitted from the radio-frequency tag 14.

Figure 48:
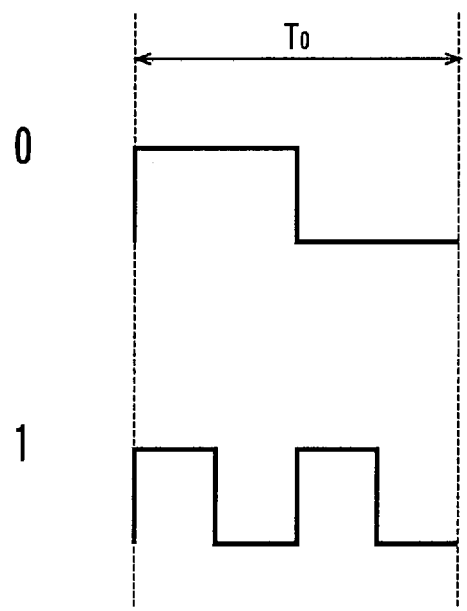
FIG. 48 is a view for explaining theo-signal and I-signal used by the circuit element of the radio-frequency tag of FIG. 3 to generate reply information.
Figure 49:
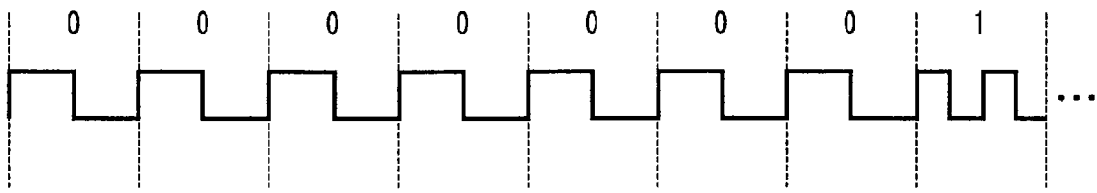
FIG. 49 is a view illustrating an identification signal specific to the circuit element of the radio-frequency tag of FIG. 3.

The reply information to be transmitted from the radio-frequency tag circuit element 61 consists of a series of signals in the form of FM-encoded 0-signals and 1-signals, as indicated in FIG. 48. On the basis of the reply information, the carrier wave is modulated into a reflected wave to be transmitted to the radio-frequency tag communication device 312. For instance, the radio-frequency tag circuit element 61 on which the information is to be written is identified by the reflected wave generated by modulation according to an identification signal specific to the circuit element 61, as indicated in FIG. 49.

Figure 50:
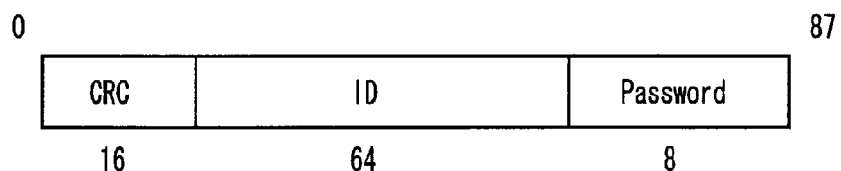
FIG. 50 is a view indicating an arrangement of a memory portion of the radio-frequency tag circuit element of FIG. 3.
Figure 51:
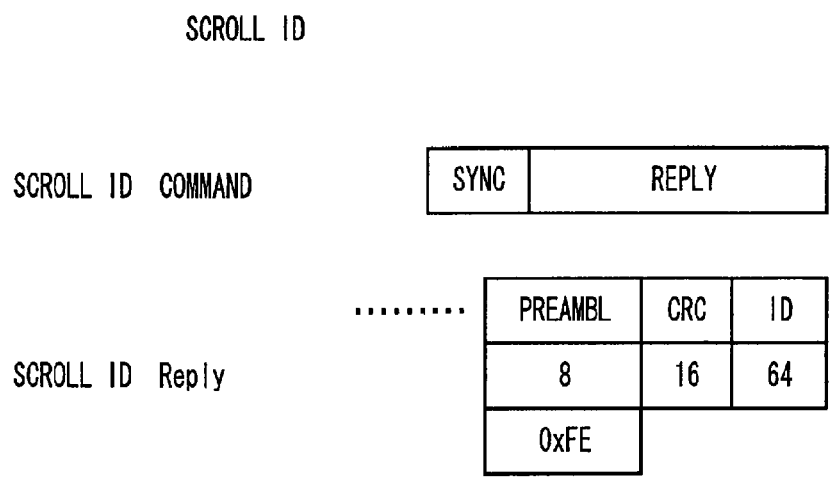
FIG. 51 is a view for explaining a SCROLL ID Reply signal transmitted from the radio-frequency tag circuit element of FIG. 3 in response to a signal including a SCROLL ID command.

FIG. 50 is a view indicating an arrangement of the memory portion 72 of the radio-frequency tag circuit element 61. As shown in FIG. 50, the memory portion 72 of the circuit element 61 stores a result of calculation of the above-described CRC codes, and a pass word used for the identification specific to the circuit element 61 and the command "LOCK". The above-described reply information is generated on the basis of the information stored in the memory portion 72. Where the signal including the command "SCROLL ID" is received, as indicated in FIG. 51, a reply signal is generated such that the reply signal consists of a 8-bit signal "PREAMBL" represented by 0xFE, a signal "CRC" which is the result of calculation of the CRC code stored in the memory portion 72, and a signal "ID" indicative of the identification of the circuit element 61.

Figure 52:
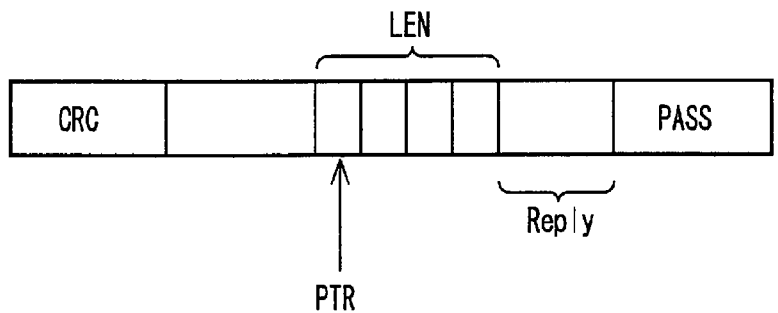
FIG. 52 is a view for explaining extraction of a part of information stored in a memory portion of the radio-frequency tag circuit element of FIG. 3, which part follows "LEN"

The command "PING" indicated in FIG. 45 is a command specifying the position in the memory portion 72 of the circuit element 61 of each of a plurality of radio-frequency tags, so that the reply signal is generated according to the information stored at the specified position. As shown in FIG. 52, the command "PING" includes start address pointer "PTR", data length "LEN", and value "VAL". For example, the reply signal consists of 8 bits at the (PTR+LEN+1)th position and following positions, where the number of bits at the PTR-th position and the following positions in the memory portion 72, which number is represented by "LEN", is equal to "VAL". Where the number of bits at the PTR-th position and the following positions in the memory portion 72, which number is represented by "LEN", is not equal to "VAL", this indicates that the circuit element 61 is not the communication object. In this case, the reply signal is not generated.

Figure 53:
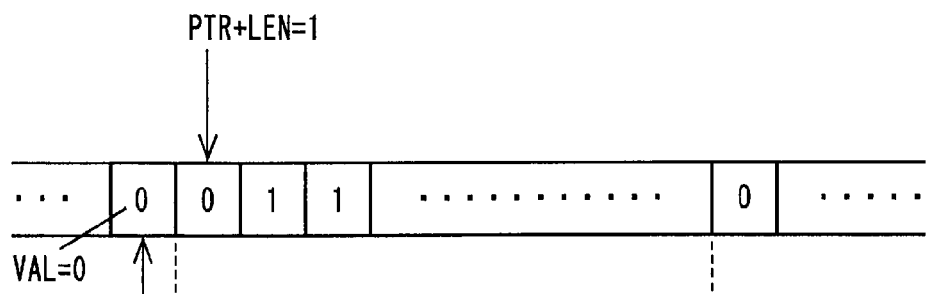
FIG. 53 is a view for explaining in detail the SCROLL ID Reply signal of FIG. 51.
Figure 53:
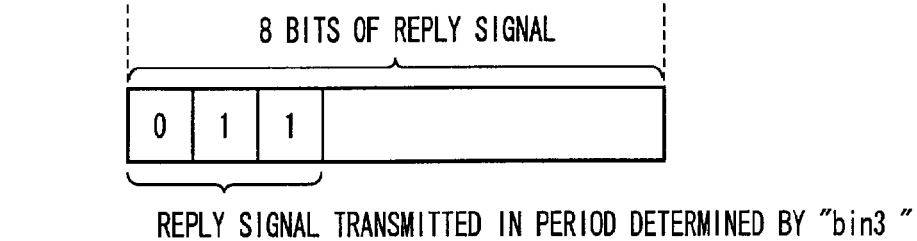

The timing at which the reply signal is transmitted from the radio-frequency tag circuit element 61 in response to the command "PING" is determined by upper three bits of the reply signal. The reply signal is transmitted in any of periods determined by "bin0" through "bin7" that are defined by BIN pulses following the command "PING" received from the radio-frequency tag communication device 312. Where the command "PING" includes "PTR=0", "LEN=0" and "VAL=0", as indicated at (a) in FIG. 53, for example, the circuit element 61 in which the first bit of the information stored in the memory portion 72 is equal to VAL=0 extracts the signal as indicated at (b), which is included in the reply signal. Where the upper three bits of the reply signal is "011", the reply signal is transmitted in response to the command "PING", in a period determined by "bin3".

In the radio-frequency tag communication device 312 according to the present embodiment, the PAA weight control portion 346 functioning as a directivity control portion for controlling the directivity of transmission of the interrogating wave $F_c$ toward the radio-frequency tag 14 is configured to change or control the directivity of transmission of the interrogating wave $F_c$, during the period between the moments of initiation and termination of transmission of the interrogating wave $F_c$ which corresponds to a unit portion of the transmitted signal, which unit portion permits radio communication with the radio-frequency tag 14. This unit portion is a series of signals for predetermined radio communication with the radio-frequency tag 14. For instance, the unit portion of the transmitted signal is a series of signals having a command frame including the command portion for radio communication with the radio-frequency tag 14, and the non-command portion not including a command, as indicated in FIG. 46.

Figure 54:
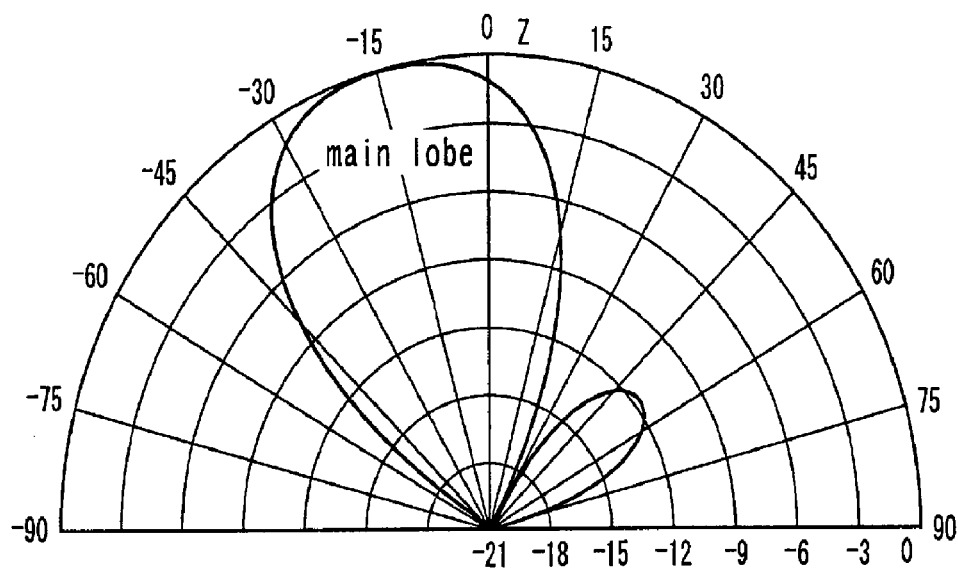
FIG. 54 is a view showing a main lobe of directivity of transmission of a unit portion of an interrogating wave, before a change of the directivity of transmission by a PAA weight control portion of the radio-frequency tag communication device of FIG. 41 during a period between moments of initiation and termination of transmission of the interrogating wave.
Figure 55:
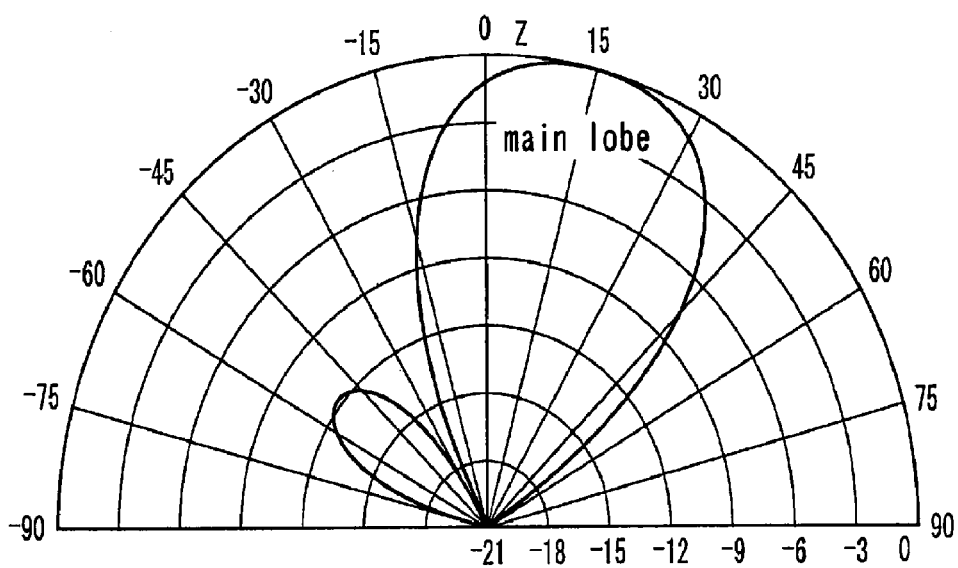
FIG. 55 is a view showing the main lobe of directivity of transmission of the unit portion of the interrogating wave, after the change of the directivity of transmission by the PAA weight control portion of the radio-frequency tag communication device of FIG. 41 during the period between the moments of initiation and termination of transmission of the interrogating wave.

FIGS. 54 and 55 are views for explaining a change of the directivity of transmission by the PAA weight control portion 346 during the period between the moments of initiation and termination of transmission of the unit portion of the interrogating wave $F_c$. FIG. 54 shows the main lobe before the change of the directivity of transmission, while FIG. 55 shows the main lobe after the change of the directivity of transmission. The PAA weight control portion 346 is preferably arranged to change the main lobe direction of the directivity of transmission of the interrogating wave $F_c$, as indicated in FIGS. 54 and 55, during the period between the moments of initiation and termination of transmission of the unit portion of the interrogating wave $F_c$. More preferably, the PAA weight control portion 346 is configured to change the directivity of transmission of the interrogating wave $F_c$ during the period between the moments of initiation and termination of the unit portion of the interrogating wave $F_c$, such that the main lobes before and after the change of the directivity of transmission are symmetrical with each other with respect to an axis indicative of a predetermined reference direction (direction of 0° in FIGS. 54 and 55). In the example of FIGS. 54 and 55, a angular difference of the main lobes with respect to the reference direction is ±15°. The PAA weight control portion 346 controls this angular difference to control an effective angular range of communication which corresponds to an area of overlapping of the two main lobes before and after the change of the directivity of transmission. The main lobe of the directivity of transmission of the interrogating wave $F_c$ corresponds to an angular range in which the radio-frequency tag 14 can transmit the reply wave $F_r$ in response to the interrogating wave $F_c$, that is, corresponds to the effective angular range of communication. In this respect, the PAA weight control portion 346 is considered to function as effective-angular-range changing means for changing the effective angular range of communication with the radio-frequency tag 14 during the period between the moments of initiation and termination of transmission of the unit portion of the interrogating wave $F_c$.

Figure 67:
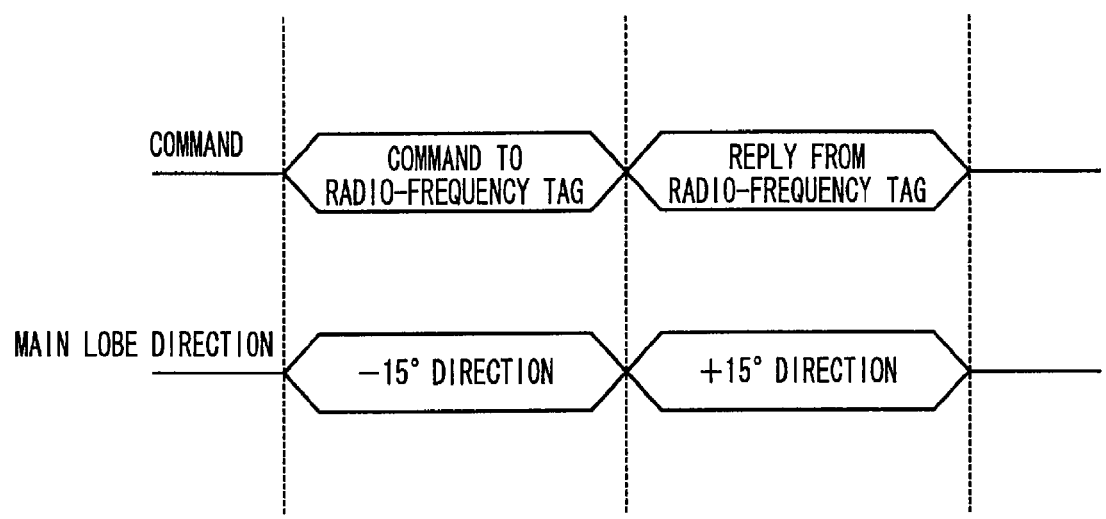
FIG. 67 is a view indicating a frame of a command to be transmitted toward the circuit element of the radio-frequency tag of FIG. 3, a frame of a reply from the radio-frequency tag, and a timing of changing the weights to be given to the interrogating wave to be transmitted.

FIG. 67 is a view indicating the frame of the command to be transmitted toward the radio-frequency tag 14, the frame of the reply signal from the radio-frequency tag 14, and the timing of changing the weights to be given to the interrogating wave $F_c$ to be transmitted. This figure indicates at least one change of the weights during the period between the moment of initiation of transmission of the command and the moment of reception of the reply signal. The PAA weight control portion 346 is preferably configured to change the weights upon switching between the command frame and the reply frame, so that the communication is less likely to be adversely influenced by a noise or any other phenomenon caused by the switching.

Figure 56:
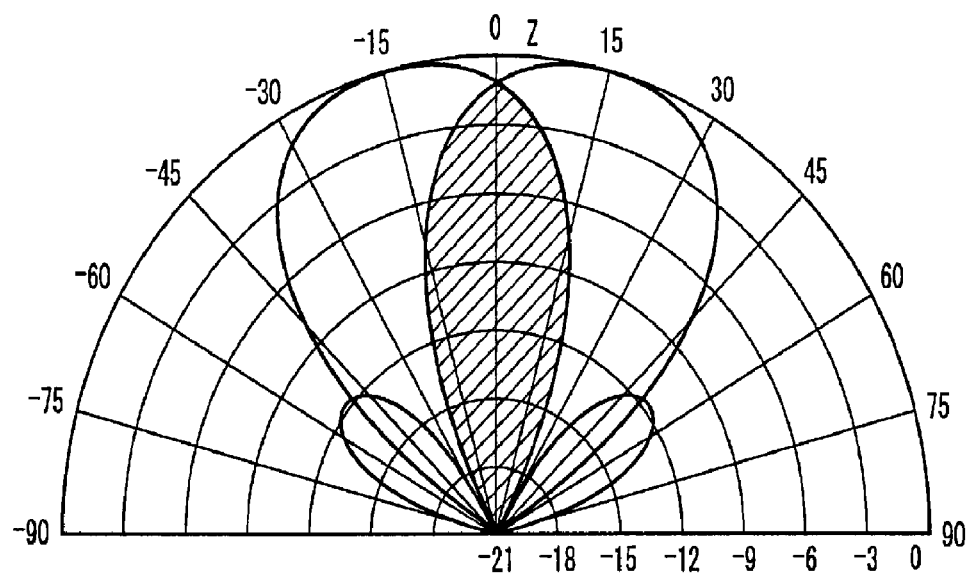
FIG. 56 is a view in which hatched lines indicate an area of overlapping of the main lobes before and after the change of the directivity of transmission of the unit portion of the interrogating wave by the PAA weight control portion of the radio-frequency tag communication device of FIG. 41 during the period between the moments of initiation and termination of transmission of the interrogating wave.

FIG. 56 is a view in which hatched lines indicate the area of overlapping of the main lobes before and after the change of the directivity of transmission of the interrogating wave $F_c$ by the PAA weight control portion 346 during the period between the moments of initiation and termination of transmission of the unit portion of the interrogating wave $F_c$. The PAA weight control portion 346 is preferably configured to change the directivity of transmission of the interrogating wave $F_c$ during the period between the moments of initiation and termination of transmission of the unit portion of the interrogating wave $F_c$, such that the area of overlapping of the two main lobes before and after the change of the directivity of transmission is narrower than a sum of the main lobes before and after the change, as indicated in FIG. 56. As described above, the main lobe of the directivity of transmission corresponds to the angular range in which the interrogating wave $F_c$ can reach the radio-frequency tag 14, that is, corresponds to the effective angular range. In this respect, the PAA weight control portion 346 is considered to change the directivity of transmission of the interrogating wave $F_c$ during the period between the moments of initiation and termination of transmission of the unit portion of the interrogating wave $F_c$, such that the effective angular range corresponding to the area of overlapping of the main lobes before and after the change is narrower than a sum of the effective angular range corresponding to the transmission directivity before the change and the effective angular range corresponding to the transmission directivity after the change.

As described above by reference to FIGS. 46-53, the radio-frequency tag 14 transmits the reply wave $F_r$ in response to the interrogating wave $F_c$ in the form of a string of command bits transmitted from the radio-frequency tag communication device 312. Namely, the reply wave $F_r$ is transmitted only after the unit portion of the interrogating wave $F_c$ has been entirely received. If the entirety of the unit portion has not been received, the reply wave $F_r$ is not transmitted. Where the main lobe of the directivity of transmission of the interrogating wave $F_c$ is changed from that of FIG. 54 to that of FIG. 55 during the period between the moments of initiation and termination of transmission of the unit portion of the interrogating wave $F_c$, the entirety of the unit portion of the interrogating wave $F_c$ is received by the radio-frequency tag 14 located in the angular range corresponding to the area of overlapping of the main lobes before and after the change of the directivity of transmission, which area of overlapping is indicated by the hatched area in FIG. 56. However, the interrogating wave $F_c$ is not received by the radio-frequency tag 14 located in the other angular range. Accordingly, the reply wave $F_r$ is transmitted from only the radio-frequency tag 14 located in the angular range corresponding to the area of overlapping (hatched area) of the main lobes before and after the change. Thus, the effective angular range in which the radio communication of the present radio-frequency tag communication device 312 with the radio-frequency tag 14 is possible is set to correspond to the area of overlapping of the two main lobes before and after the change of the directivity of transmission of the unit portion of the interrogating wave $F_c$. The area of overlapping is narrower than the sum of the main lobes before and after the change, so that the directivity of communication has a comparatively narrow effective angular range.

The PAA weight control portion 346 is preferably configured to change the directivity of transmission of the interrogating wave $F_c$ during the period between the moments of initiation and termination of the command portion of the interrogating wave $F_c$, that is, a string of bits corresponding to the segment "COMMAND" indicated in FIG. 46. Only the radio-frequency tag 14 which has received the entirety of the command portion transmits the reply wave $F_r$. Accordingly, the effective angular range of communication with the radio-frequency tag 14 can be set to correspond to the overlapping area of communications effected before and after the change of the directivity of transmission of the unit portion of the interrogating wave.

The PAA weight control portion 346 is preferably configured to change the directivity of transmission of the interrogating wave, after the transmission of the command portion, that is, between the moments of initiation and termination of transmission of the non-command portion such as the segments "SET UP", "SYNC" and the following carrier wave of a predetermined length. The length of the carrier wave is determined to supply the radio-frequency tag 14 with an amount of electric energy enough to transmit the reply wave $F_r$. Accordingly, the reply wave is transmitted from only the radio-frequency tag 14 which has received the non-command portion as an electric power supply source after the reception of the entirety of the command portion. Thus, the effective angular range of the directivity of communication with the radio-frequency tag 14 can be set to correspond to the overlapping area of communications effected before and after the change of the directivity of transmission of the unit portion of the interrogating wave.

The PAA weight control portion 346 is preferably configured to change the directivity of transmission of the interrogating wave $F_c$, when a predetermined time has passed after the moment of initiation of transmission of the unit portion of the interrogating wave $F_c$ for radio communication with the radio-frequency tag 14. This predetermined time is determined so that the change of the directivity of transmission takes place during the period between the moments of initiation and termination of the command portion, or during a period between moments of initiation and termination of transmission of the non-command portion after the transmission of the command portion. Thus, the effective angular range of communication with the radio-frequency tag 14 is set to correspond to the overlapping area of communications effected before and after the change of the directivity of transmission of the unit portion of the interrogating wave.

Figure 57:
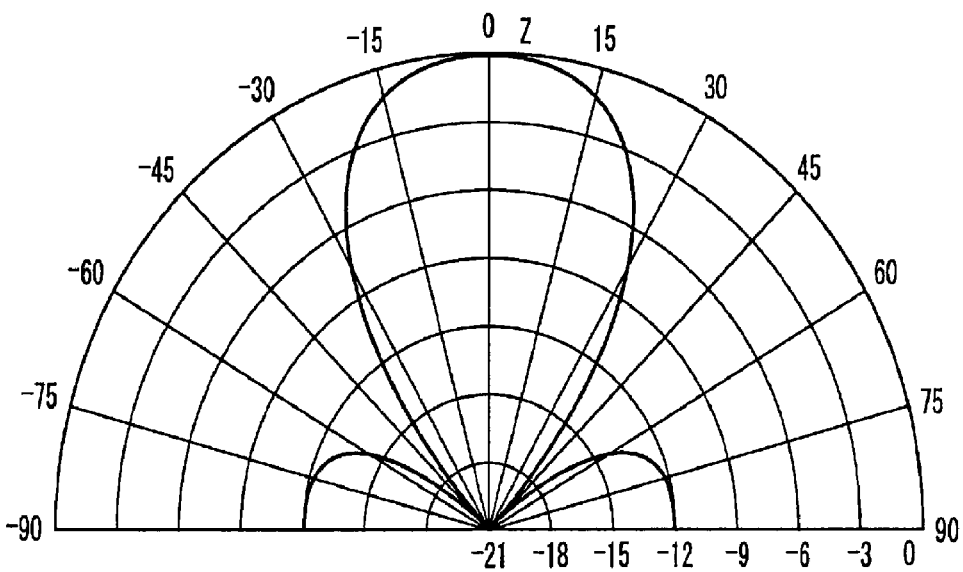
FIG. 57 is a view showing an example of a main lobe of directivity of reception of a reply wave from the circuit element of the radio-frequency tag of FIG. 3, which directivity of reception is determined according to the directivity of transmission changed by the PAA weight control portion of the radio-frequency tag communication device of FIG. 41 as shown in FIG. 56.

The PAA weight control portion 346 is preferably configured to control the directivity of transmission of the interrogating wave $F_c$ such that the direction of the main lobe is parallel to the above-described reference direction indicated in FIG. 57 (corresponding to FIG. 56), after the moment of initiation of reception of the reply wave $F_r$ transmitted by the radio-frequency tag 14 in response to the interrogating wave $F_c$. In other words, the directivity of transmission of the interrogating wave $F_c$ is controlled after the moment of initiation of reception of the reply wave $F_r$ transmitted by the radio-frequency tag 14 in response to the reply wave $F_r$, such that the main lobe of the controlled directivity of transmission is substantially coincident with the effective angular range of communication corresponding to the area of overlapping of the main lobes before and after the change of the directivity of transmission of the unit portion of the interrogating wave. The angular range of transmission of the interrogating wave $F_c$ is narrowed for the purpose of detecting the position of the communication object in the form of the radio-frequency tag 14. After the transmission of the command portion, the directivity of transmission is controlled such that the main lobe of the directivity of transmission extends in the direction in which the radio-frequency tag 14 has been detected, so that the radio-frequency tag 14 is supplied with an amount of electric energy required for transmission of the reply wave $F_r$.

The PAA weight control portion 346 is preferably configured to control the directivity of transmission of the unit portion of the interrogating wave such that the area of overlapping of the main lobes before and after the change of the directivity of transmission is reduced as the transmission of the unit portion is repeated. As described above, the PAA weight control portion 346 can control the area of overlapping of the two main lobes before and after the change of the directivity of transmission, that is, can change the effective angular range of communication, by controlling the angular difference of the two main lobes with respect to the reference direction, for example. For instance, the PAA weight control portion 346 is arranged to increment the angular difference with respect to the reference direction as the transmission of the unit portion of the interrogating wave is repeated, for thereby decrementing the area of overlapping of the main lobes before and after the change of the directivity of transmission. Accordingly, the effective angular range of communication with the radio-frequency tag 14 is gradually reduced, to permit accurate detection of the position or direction of the radio-frequency tag.

Figure 58:
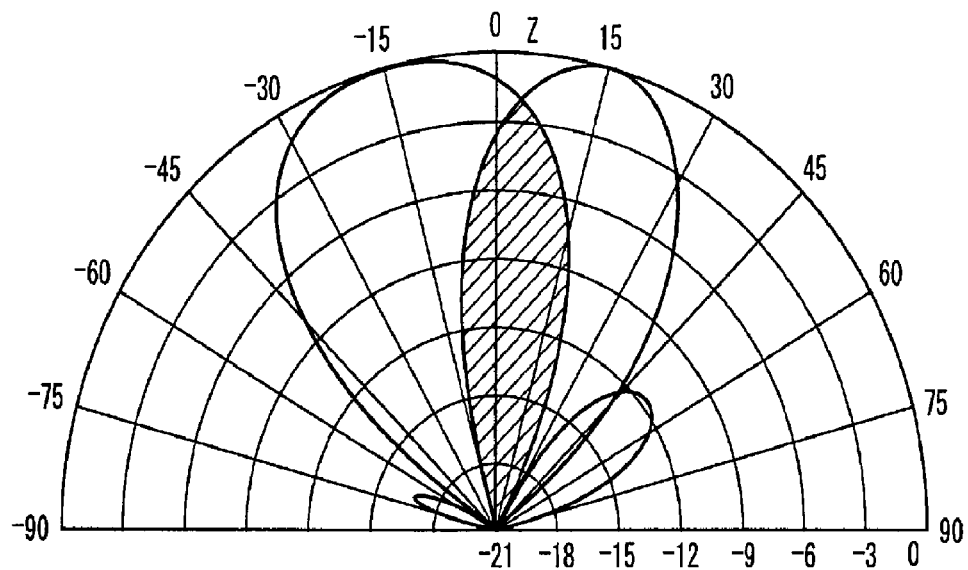
FIG. 58 is a view in which hatched lines indicate an area of overlapping of the main lobes before and after a change of the direction of the main lobe of the directivity of transmission of the interrogating wave and before and after a concurrent change of the transmission directivity characteristic by the PAA weight control portion of the radio-frequency tag communication device of FIG. 41 during the period between the moments of initiation and termination of transmission of the unit portion of the interrogating wave.

The PAA weight control portion 346 is preferably configured to change a characteristic of directivity of transmission of the interrogating wave $F_c$ during the moments of initiation and termination of transmission of the unit portion of the interrogating wave $F_c$. More preferably, the PAA weight control portion 346 is configured to change not only the direction of the main lobe of the directivity of transmission of the interrogating wave $F_c$, but also the characteristic of directivity of transmission, during the period between the moments of initiation and termination of transmission of the unit portion of the interrogating wave $F_c$. FIG. 58 is a view in which hatched lines indicate an area of overlapping of the main lobes before and after a change of the direction of the main lobe of the directivity of transmission of the interrogating wave $F_c$ and before and after a concurrent change of transmission directivity characteristic, during the period between the moments of initiation and termination of transmission of the unit portion of the interrogating wave. In the example of FIG. 58 in which the characteristic of directivity of transmission of the interrogating wave $F_c$ is changed during the period between the moments of initiation and termination of the unit portion of the interrogating wave $F_c$, the area of overlapping of the main lobes before and after the change of the directivity of transmission is made narrower than that indicated in FIG. 56. Thus, the area of overlapping of the main lobes before and after the change of the directivity of transmission, that is, the effective angular range of communication can be changed as desired, by changing the characteristic of directivity of transmission of the interrogating wave $F_c$ during the period between the moments of initiation and termination of transmission of the unit portion of the interrogating wave $F_c$.

Figure 59:
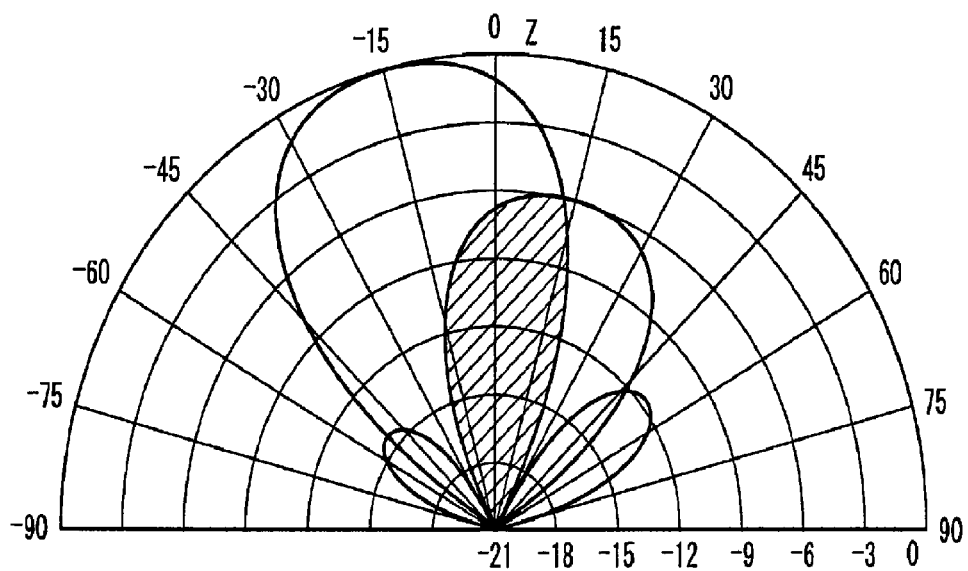
FIG. 59 is a view in which hatched lines indicate an area of overlapping of the main lobes before and after a change of the direction of the main lobe of the directivity of transmission of the interrogating wave and before and after a concurrent change of an electric energy of transmission, by the PAA weight control portion of the radio-frequency tag communication device of FIG. 41 during the period between the moments of initiation and termination of transmission of the unit portion of the interrogating wave.

The PAA weight control portion 346 is arranged to change the electric energy of transmission of the interrogating wave $F_c$, by controlling the ratio of amplification of the transmitted signal by the transmitted-signal amplifier 354, preferably, to change the electric energy of transmission of the interrogating wave $F_c$ in timed relation with the control of the direction of the main lobe, during the period between the moments of initiation and termination of transmission of the unit portion of the interrogating wave $F_c$. FIG. 59 is a view in which hatched lines indicate an area of overlapping of the main lobes before and after a change of the direction of the main lobe of the directivity of transmission of the interrogating wave $F_c$ and a concurrent change of the electric energy of transmission during the period between the moments of initiation and termination of transmission of the unit portion of the interrogating wave $F_c$. In the example of FIG. 49 in which the electric energy of transmission of the interrogating wave $F_c$ is changed during the period between the moments of initiation and termination of the unit portion of the interrogating wave $F_c$, the area of overlapping of the main lobes before and after the change of the directivity of transmission is made narrower than that indicated in FIG. 56. Thus, the area of overlapping of the main lobes before and after the change of the directivity of transmission, that is, the effective angular range of communication can be changed as needed, by changing the electric energy of transmission of the interrogating wave $F_c$ during the period between the moments of initiation and termination of transmission of the unit portion of the interrogating wave $F_c$.

Figure 60:
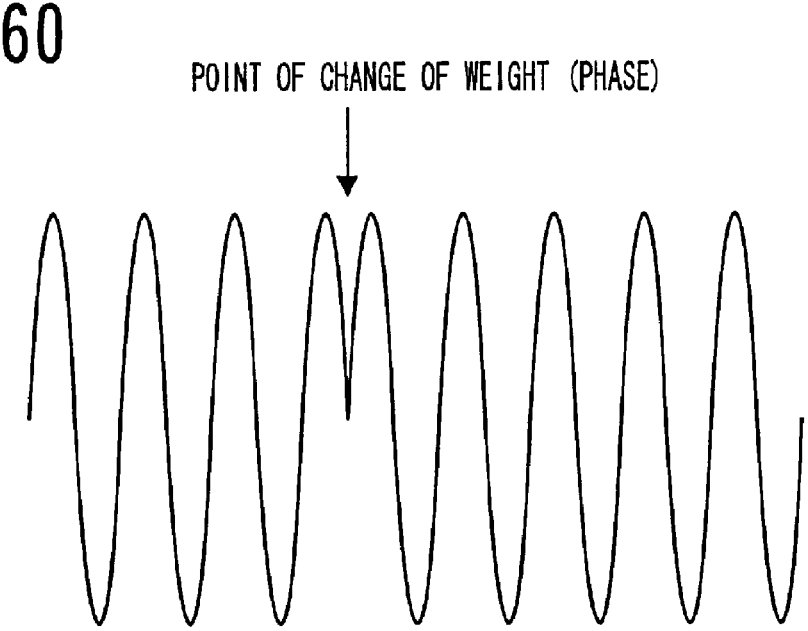
FIG. 60 is a view indicating the waveform of the interrogating wave, which waveform is discontinuous in the vicinity of a point of change of the directivity of transmission of the interrogating wave by the PAA weight control portion of the radio-frequency tag communication device of FIG. 41 during the period between the moments of initiation and termination of transmission of the unit portion of the interrogating wave.
Figure 61:
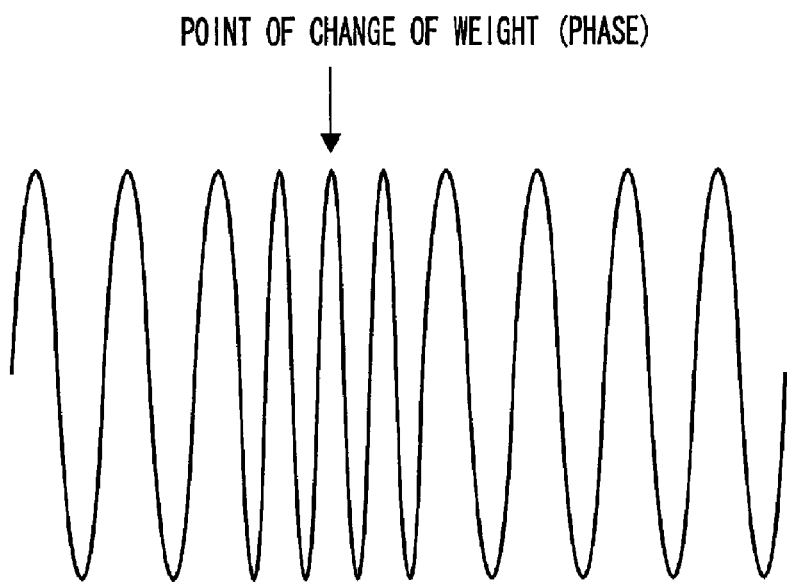
FIG. 61 is a view indicating the waveform of the interrogating wave, which waveform is made continuous by increasing the frequency of a carrier wave, in the vicinity of the point of change of the directivity of transmission of the interrogating wave by the PAA weight control portion of the radio-frequency tag communication device of FIG. 41 during the period between the moments of initiation and transmission of the unit portion of the interrogating wave.

The radio-frequency tag communication device 312 is preferably arranged to gradually change the frequency of the carrier wave of the interrogating wave $F_c$ upon changing of the directivity of transmission of the interrogating wave $F_c$ during the period between the moments of initiation and termination of the unit portion of the interrogating wave $F_c$. Where the directivity of transmission of the interrogating wave $F_c$ is changed during the period between the moment of initiation and termination of the unit portion of the interrogating wave $F_c$, as in the present embodiment, the waveform of the interrogating wave would be discontinuous in the vicinity of a point of change of the directivity of transmission (a point of change of the weights), giving rise to a risk of undesirable generation of higher harmonics, as indicated in FIG. 60. For effectively eliminating the above-indicted risk, the frequency of the carrier wave of the interrogating wave $F_c$ is temporarily gradually changed in the vicinity of the point of change of the directivity of transmission, so that the waveform is made continuous in the vicinity of the point of change of the directivity of transmission, as indicated in FIG. 61.

Figure 62:
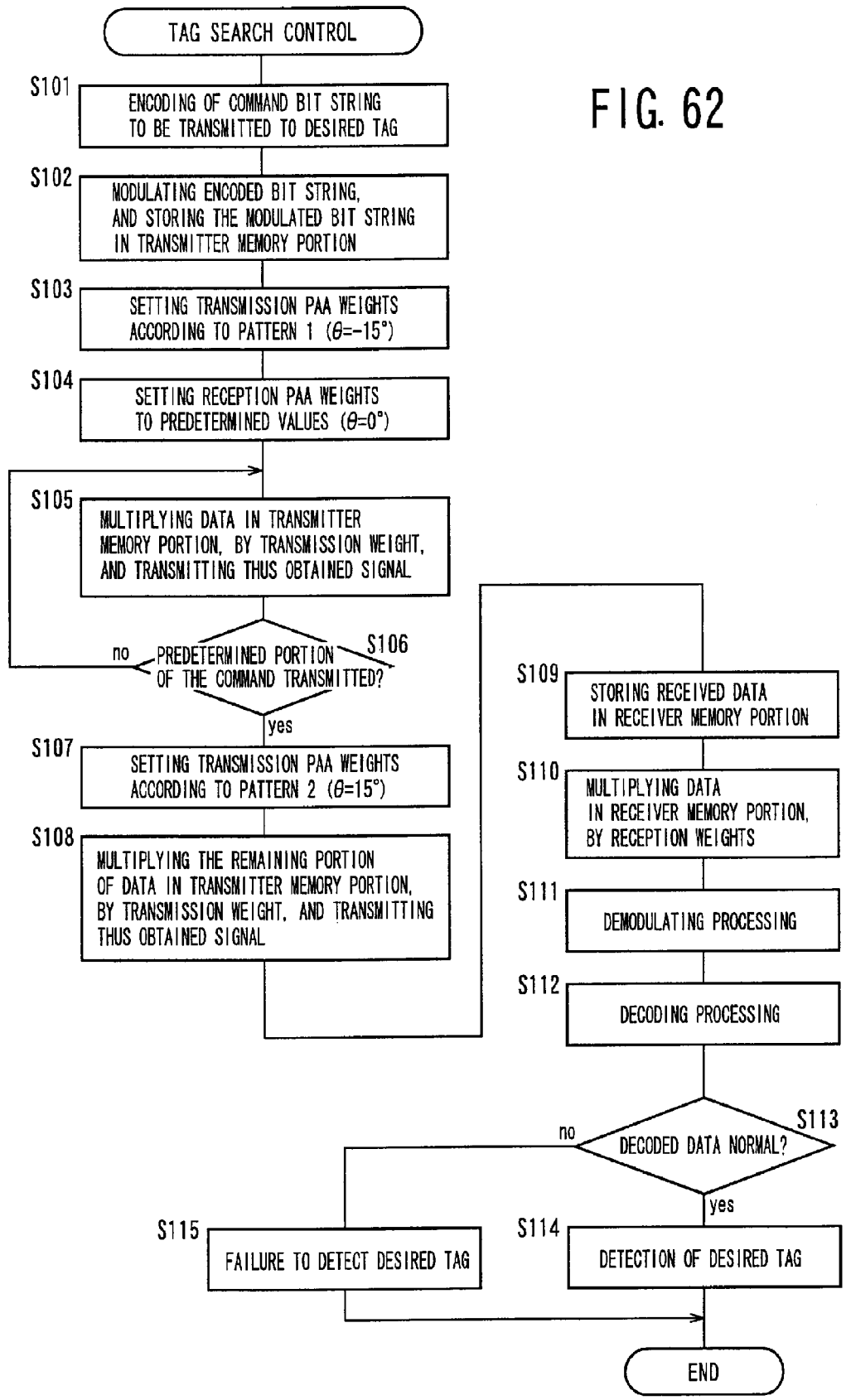
FIG. 62 is a flow chart illustrating an example of a tag search control by the radio-frequency tag communication device of FIG. 41.

FIG. 62 is a flow chart illustrating an example of a tag search control by the radio-frequency tag communication device 312. This tag search control is repeatedly executed with a predetermined cycle time.

The tag search control is initiated with step S101 ("step" being hereinafter omitted) in which the transmitted signal in the form of a string of command bits to be transmitted to the communication object in the form of the radio-frequency tag 14 is generated by the command-bit-string generating portion 320, and the generated transmitted signal is encoded b the encoding portion 322. Then, the control flow goes to S102 in which the transmitted signal encoded in S101 is modulated by the AM modulating portion 324, and the modulated signal is stored in the transmitter memory portion 326. The control flow then goes to S103 in which the transmission PAA weights are set according to a pattern 1 corresponding to the main lob direction θ=−15°. Then, the control flow goes to S104 in which the reception PAA weights are set to predetermined values corresponding to the main lobe direction θ=0°. The control flow then goes to S105 in which the transmitted signal stored in the transmitter memory portion 326 in S102 is read out and multiplied by the transmission weight multiplying portion 328, by the corresponding transmission PAA weight set in S103, and is transmitted as the interrogating wave $F_c$ from the corresponding antenna element 330 through the corresponding high-frequency-wave transmitter/receiver portion 334. Then, the control flow goes to S106 to determine whether a predetermined portion of the command portion of the transmitted signal has been transmitted. If a negative determination is obtained in S106, the control flow goes back to S105. If an affirmative determination is obtained in S106, the control flow goes to S107 in which the transmission PAA weights are set according to a pattern 2 corresponding to the main lobe direction θ=+15°. The control flow then goes to S108 in which the remaining portion of the transmitted signal stored in the transmitter memory portion 326 in S102 is read out and is multiplied by the transmission weight multiplying portion 328, by the corresponding transmission PAA weight, and is transmitted as the interrogating wave $F_c$ from the corresponding antenna element 330 through the corresponding high-frequency-wave transmitter/receiver portion 334. The control flow then goes to S109 in which the received signals received by the plurality of antenna elements 330 are stored in the receiver memory portion 336 through the respective high-frequency-wave transmitter/receiver portions 334. Then, the control flow goes to S110 in which the received signals stored in the receiver memory portion 336 in S109 are read out from time to time, and are multiplied by the reception weight multiplying portion 338, by the respective reception PAA weights set in S104, and are combined together into a composite signal. The control flow then goes to S111 in which the composite signal obtained in S110 is demodulated by the AM demodulating portion 340. Then, the control flow goes to S112 in which the demodulated signal obtained in S111 is decoded by the decoding portion 342. The control flow then goes to S113 in which the decoded signal obtained in S112 is interpreted by the reply-bit-string interpreting portion 344, and a determination is made as whether the decoded signal is normal or not. If an affirmative determination is obtained in S113, the control flow goes to S114 in which the detection of the desired radio-frequency tag 14 is confirmed, and the present control routine is terminated. If a negative determination is obtained in S113, the control flow goes to S115 in which a failure to detect the radio-frequency tag 14 is confirmed, and the present control routine is terminated. It will be understood that S103 through S108 and S110 correspond to the PAA weight control portion 346.

Figure 63:
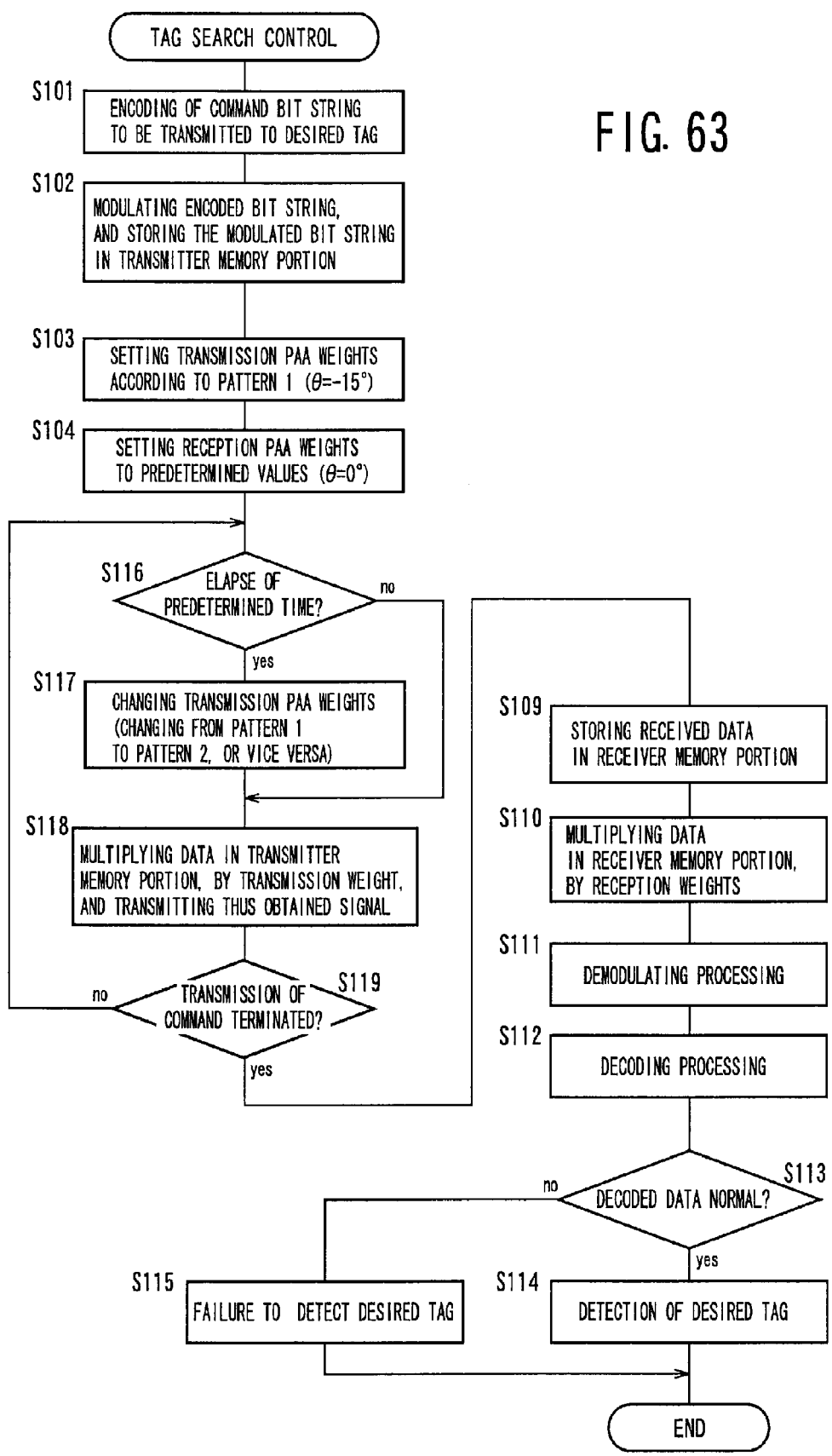
FIG. 63 is a flow chart illustrating another example of the tag search control by the radio-frequency tag communication device of FIG. 41.

FIG. 63 is a flow chart illustrating another example of the tag search control by the radio-frequency tag communication device 312. This tag search control is repeatedly executed with a predetermined cycle time. The same reference signs as used in FIG. 62 are used in FIG. 63 to identify the same steps, which will not be described.

In the tag search control of FIG. 63, the above-described step S104 is followed by S116 to determine whether a predetermined time has passed after the moment of initiation of transmission of the interrogating wave $F_c$ corresponding to the transmitted signal stored in the transmitter memory portion 326. If a negative determination is obtained in S116, the control flow goes to S118 and the subsequent steps. If an affirmative determination is obtained in S116, the control flow goes to S117 in which the presently established one of the patterns 1 and 2 corresponding to the respective main lobe directions θ=−15° and θ=15° is changed to the other pattern. Namely, the transmission PAA weights according to the presently established pattern 1 are changed to those according to the other pattern 2, or the transmission PAA weights according to the presently established pattern 2 are changed to those according to the other pattern 1. Then, the control flow goes to S118 in which the transmitted signal is multiplied by the transmission weight multiplying portion 328, by the corresponding transmission PAA weight set in S103 or S117, and is transmitted as the interrogating wave $F_c$ from the corresponding one of the plurality of high-frequency-wave transmitter/receiver portions 334. The control flow then goes to S119 to determine whether the transmission of the interrogating wave $F_c$ corresponding to the transmitted wave stored in S102 in the transmitter memory portion 326 is terminated. If a negative determination is obtained in S119, the control flow goes back to S116 and the subsequent steps. If an affirmative determination is obtained in S119, the control flow goes to S109 and the subsequent steps. It will be understood that S103, S104, S116 through S119, and S110 correspond to the PAA weight control portion 346.

Figure 64:
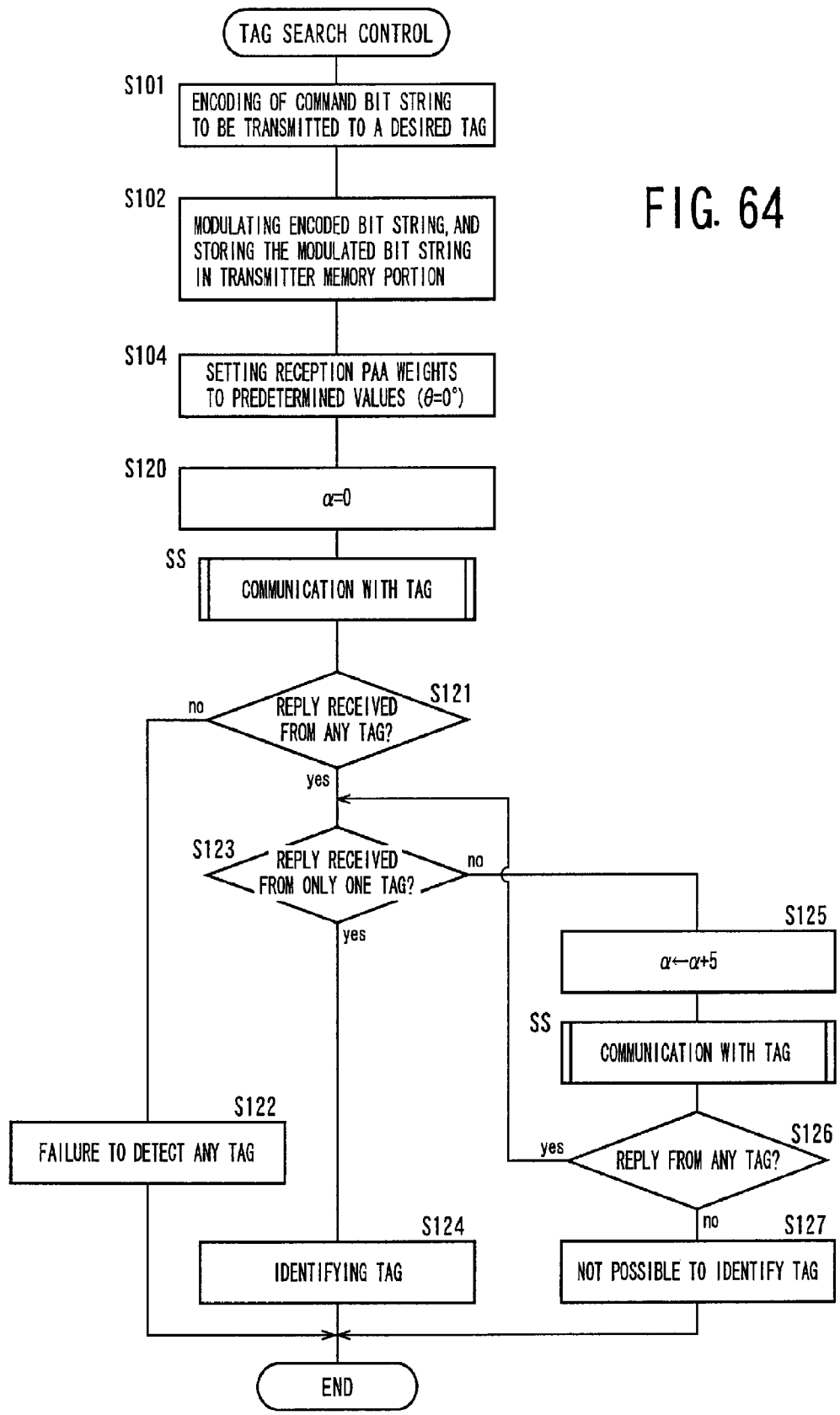
FIG. 64 is a flow chart illustrating a further example of the tag search control by the radio-frequency tag communication device of FIG. 41.

FIG. 64 is a flow chart illustrating a further example of the tag search control by the radio-frequency tag communication device 312. This tag search control is repeatedly executed with a predetermined cycle time. The same reference signs as used in FIG. 62 are used in FIG. 64, to identify the same steps, which will not be described.

Figure 65:
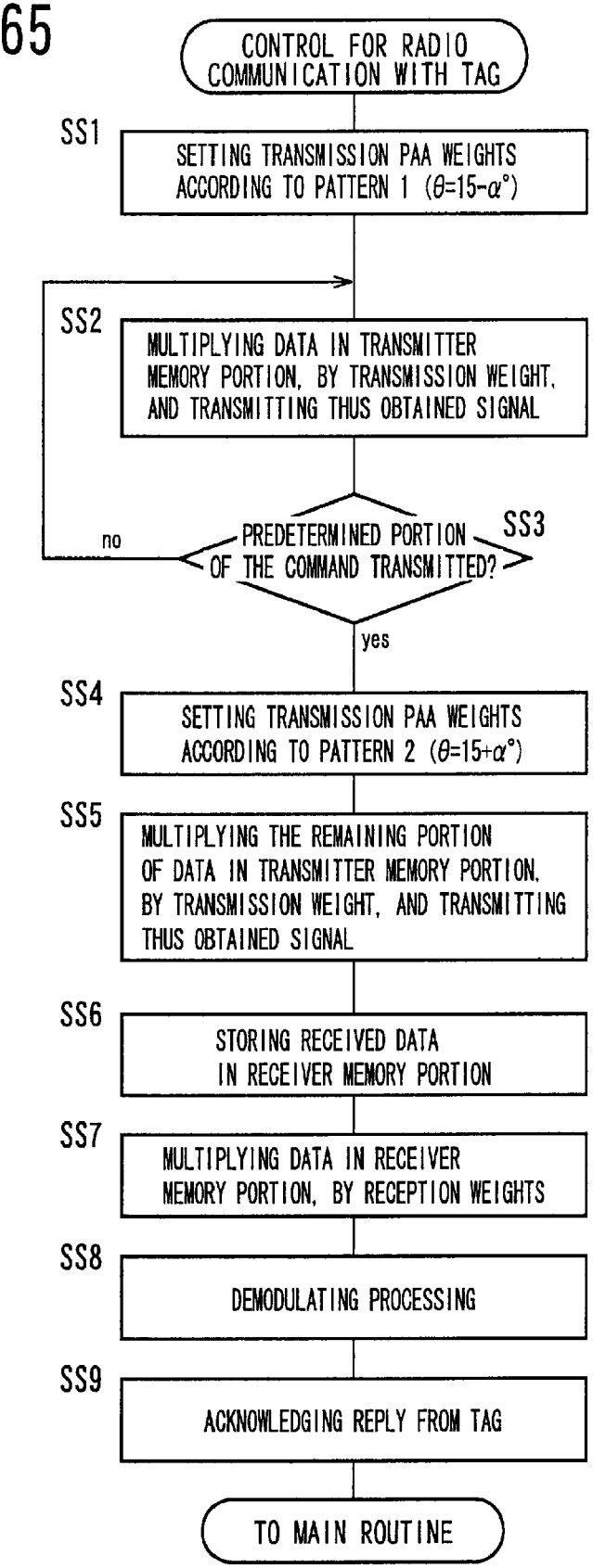
FIG. 65 is a flow chart illustrating a part of the tag search control of FIG. 64, to effect radio communication with the radio-frequency tag.

In the tag search control of FIG. 64, the above-described sep S104 is followed by S120 in which a value Vindicative of an angle of change the directivity of transmission during the period between the moments of initiation and termination of transmission of the unit portion of the interrogating wave $F_c$ is reset to an initial value of 0. Then, the control flow goes to SS to perform a control for radio communication with the radio-frequency tag as illustrated in FIG. 65. Then, the control flow goes to S121 to determine whether a reply has been received from any radio-frequency tag 14. If a negative determination is obtained in S121, the control flow goes to S122 in which a failure to detect any radio-frequency tag 14 is confirmed, and the present control is terminated. If an affirmative determination is obtained in S121, the control flow goes to S123 to determine whether the reply has been received from only one radio-frequency tag 14. If an affirmative determination is obtained in S123, the control flow goes to S124 in which the radio-frequency tag 14 from which the reply has been received is identified, and the present control is terminated. If a negative determination is obtained in S123, the control flow goes to S125 in which the value α indicative of the angle of change the directivity of transmission is incremented by "5", and then goes to SS to perform the control for radio communication with the radio-frequency tag 14 as illustrated in FIG. 65. The control flow then goes to S126 to determine whether a reply has been received from any radio-frequency tag 14. If an affirmative determination is obtained in S126, the control flow goes back to S123 and the subsequent steps. If a negative determination is obtained in S126, the control flow goes to S127 in which a failure to identify the radio-frequency tag 14 is confirmed, and the present control is terminated. It is noted that the angle between the directions of the two main lobes before and after the change of the main lobe direction increases with an increase of the value a indicative of the angle of change the directivity of transmission, so that the effective angular range of communication corresponding to the area of communication of the two main lobes decreases with the increase of the value α, whereby the effective angular range of the directivity of communication is narrowed with the increase of the value α.

FIG. 65 is a flow chart illustrating a part of the tag search control of FIG. 64, to effect the radio communication with the radio-frequency tag. This control is initiated with SS1 in which the transmission PAA weights are set according to the pattern 1 corresponding to the main lobe direction $\theta=-15°-\alpha°$. Then, the control flow goes to SS2 in which the transmitted signal stored in the transmitter memory portion 326 in S102 is read out and multiplied by the transmission weight multiplying portion 328, by the corresponding transmission PAA weight, and is transmitted as the interrogating wave $F_c$ from the corresponding antenna element 330 through the corresponding one of the plurality of high-frequency-wave transmitter/receiver portions 334. The control flow then goes to SS3 to determine whether the predetermined portion of the command portion of the transmitted signal has been transmitted. If a negative determination is obtained in SS3, the control flow goes back to SS3. If an affirmative determination is obtained in SS3, the control flow goes to SS4 in which the transmission PAA weights are set according to the pattern 2 corresponding to the main lobe direction $\theta=15°+\alpha$. Then, the control flow goes to SS5 in which the remaining portion of the transmitted signal stored in the transmitter memory portion 326 in S102 is read out and multiplied by the transmission weight multiplying portion 328, by the corresponding transmission PAA weight set in SS4, and is transmitted as the interrogating wave $F_c$ from the corresponding antenna element 330 through the corresponding one of the plurality of high-frequency-wave transmitter/receiver portions 334. The control flow then goes to SS6 in which the received signals received by the respective antenna elements 330 are stored in the receiver memory portion 336 through the respective high-frequency-wave transmitter/receiver portions 334. Then, the control flow goes to SS7 in which the received signals stored in the receiver memory portion 336 in SS6 are read out and multiplied by the reception weight multiplying portion 338, by the respective reception PAA weights set in S104, and combined together into a composite signal. The control flow then goes to SS8 in which the composite signal obtained in SS7 is demodulated by the AM demodulating portion 340, and then goes to SS9 in which the reply from the radio-frequency tag 14 is acknowledged on the basis of the demodulated wave obtained in SS8. Then, the control flow returns to the tag search control of FIG. 64. It will be understood that S104, S125, SS1 through SS5 and SS7 correspond to the PAA weight control portion 346.

Figure 66:
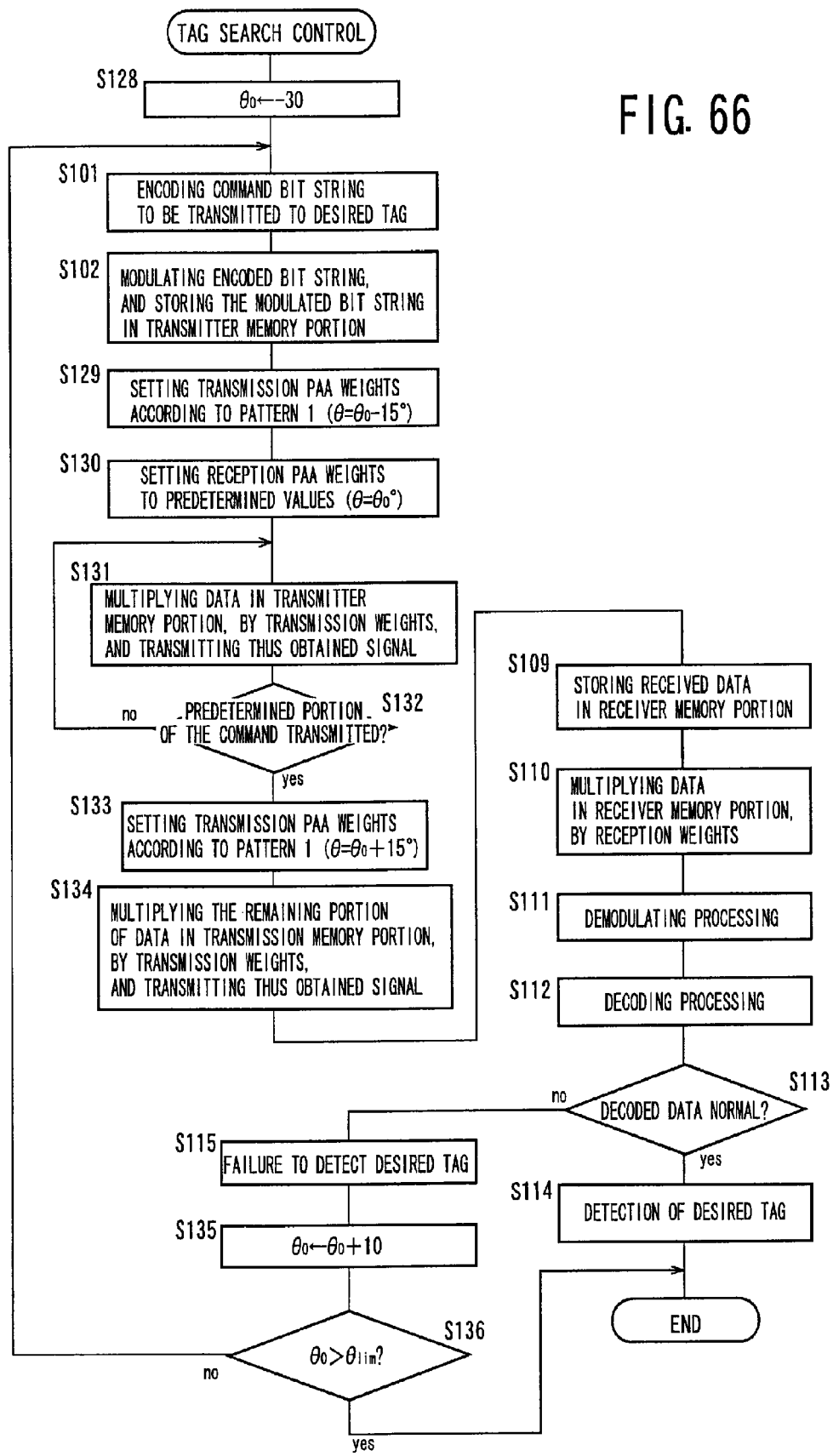
FIG. 66 is a flow chart illustrating a still further example of the tag search control by the radio-frequency tag communication device of FIG. 41.

FIG. 66 is a flow chart illustrating a still further example of the tag search control by the radio-frequency tag communication device 312. This tag search control is repeatedly executed with a predetermined cycle time. The same reference signs as used in FIG. 62 are used in FIG. 66 to identify the same steps, which will not be described.

The tag search control of FIG. 66 is initiated with S128 in which an angle $\theta_0$ indicative of the reference direction used to change the directivity of transmission during the period between the moments of initiation and termination of transmission of the unit portion of the interrogating wave $F_c$ is set to an initial value of $-30°$. Then, the control flow goes to S101 and S102. Then, the control flow goes to S129 in which the transmission PAA weights are set according to the pattern 1 corresponding to the main lobe direction $\theta=\theta_0°-15°$. Then, the control flow goes to S130 in which the reception PAA weights are set to predetermined values corresponding to the main lobe direction $\theta=\theta_0°$. The control flow then goes to S131 in which the transmitted signal stored in the transmitter memory portion 326 in S102 is read out and multiplied by the transmission weight multiplying portion 328, by the corresponding transmission PAA weight set in S129, and is transmitted as the interrogating wave $F_c$ from the corresponding antenna element 330 through the corresponding one of the plurality of high-frequency-wave transmitter/receiver portions 334. Then, the control flow goes to S132 to determine whether a predetermined portion of the command portion of the transmitted signal has been transmitted. If a negative determination is obtained in S132, the control flow goes back to S131. If an affirmative determination is obtained in S132, the control flow goes to S133 in which the transmission PAA weights are set according to the pattern 2 corresponding to the main lobe direction $\theta=\theta_0°+15°$. Then, the control flow goes to S134 in which the remaining portion of the transmitted signal stored in the transmitter memory portion 326 in S102 is read out and multiplied by the transmission weight multiplying portion 328, by the corresponding transmission PAA weight set in S133, and is transmitted as the interrogating wave $F_c$ from the corresponding antenna element 330 through the corresponding one of the plurality of high-frequency-wave transmitter/receiver portions 334. The above-described step S115 is followed by S135 in which the angle $\theta_0$ indicative of the reference direction is incremented by "10", and S136 to determined whether the angle $\theta_0$ is larger than a predetermined value $\theta_{lim}$. If a negative determination is obtained in S136, the control flow goes back to S101 and the subsequent steps. If an affirmative determination is obtained in S136, the present tag search control is terminated. It will be understood that S110, and S128 through S136 correspond to the PAA weight control portion 346.

In the tag search control of FIG. 66, the reference direction is incremented, and after the desired radio-frequency tag 14 is detected, the effective angular range of the directivity of communication is narrowed as in the tag search controls of FIGS. 64 and 65, so that the direction in which the desired radio-frequency tag 14 is located can be detected with a higher degree of accuracy. In the tag search control of FIG. 64, the control is terminated when the reply has been received from only one radio-frequency tag 14. However, the tag search control may be terminated when the value a has been reduced to a predetermined value, that is, when the effective angular range of the directivity of communication has been narrowed to a predetermined value. A fine adjustment of the reference direction may be made each time the value α is incremented, so that the desired radio-frequency tag 14 can be detected with high stability.

As described above, the radio-frequency tag communication device according to the present embodiment comprises the directivity control portion in the form of the PAA weight control portion 346 (S103 through S108, and S110) configured to change the directivity of transmission of the interrogating wave during a period between moments of initiation and termination of transmission of a unit portion of the interrogating wave, which unit portion permits the radio communication with the radio-frequency tag 14. Accordingly, the effective angular range of the directivity of communication with the radio-frequency tag 14 can be set to correspond to an overlapping area of communications effected before and after a change of the directivity of transmission of the unit portion of the interrogating wave. Namely, the third aspect of the invention provides the radio-frequency tag communication device 312 which is simple in construction and which has a comparatively narrow effective angular range of directivity of communication Further, the PAA weight control portion 346 changes the directivity of transmission of the interrogating wave $F_c$ during the period between the moments of initiation and termination of transmission of the unit portion of the interrogating wave, such that effective areas of communication corresponding to the directivity of transmission before and after a change of the directivity of communication partially overlap each other. Accordingly, the effective angular range of the directivity of communication with the radio-frequency tag 14 can be set to correspond to an overlapping area of communications effected before and after the change of the directivity of transmission of the unit portion of the interrogating wave.

Further, the PAA weight control portion 346 changes the directivity of transmission such that an overlapping area of communications before and after the change of the directivity of transmission is narrower than a sum of the effective area of communication corresponding to the directivity of transmission before the change and the effective area of communication corresponding to the directivity of transmission after the change. Accordingly, the effective angular range of the directivity of communication with the radio-frequency tag 14 can be practically set.

Further, the PAA weight control portion 346 is capable of changing an overlapping area of communications before and after the change of the directivity of transmission. Accordingly, the effective angular range of the directivity of communication with the radio-frequency tag can be set as desired depending upon a specific manner of communication with the radio-frequency tag.

Further, the interrogating wave $F_c$ includes the command portion including a command for radio communication with the radio-frequency tag 14, and the non-command portion not including the command. Accordingly, the radio-frequency tag communication device which is simple in construction has a comparatively narrow effective angular range of directivity of communication, where the commonly used interrogating wave $F_c$ is used for the radio communication with the radio-frequency tag.

Further, the PAA weight control portion 436 changes the directivity of transmission of the interrogating wave $F_c$ during the period between the moments of initiation and termination of transmission of the above-indicated command portion. In this case, the reply wave $F_r$ is received from only the radio-frequency tag 14 which has received the entirety of the command portion, so that the effective angular range of the directivity of communication or effective area of communication with the radio-frequency tag can be set to correspond to the overlapping area of communications effected before and after the change of the directivity of transmission of the unit portion of the interrogating wave.

Further, the PAA weight control portion 346 changes the directivity of transmission of the interrogating wave $F_c$ during a period of initiation and termination of transmission of the non-command portion, after the transmission of the command portion. Accordingly, the reply wave $F_r$ is transmitted from only the radio-frequency tag 14 which has received the non-command portion as an electric power supply source after the reception of the entirety of the command portion. Thus, the effective angular range of the directivity of communication with the radio-frequency tag 14 can be set to correspond to the overlapping area of communications effected before and after the change of the directivity of transmission of the unit portion of the interrogating wave.

Further, the PAA weight control portion 346 changes the directivity of transmission of the interrogating wave $F_c$ at a moment of switching from the transmission of the command portion to the transmission of the non-command portion. Accordingly, the reply wave $F_r$ is transmitted from only the radio-frequency tag 14 which has received the non-command portion as the electric power supply source after the reception of the entirety of the command portion. Thus, the effective angular range of the directivity of communication with the radio-frequency tag 14 can be set to correspond to the overlapping area of communications effected before and after the change of the directivity of transmission of the unit portion of the interrogating wave. In addition, the communication is less likely to be adversely influenced by a noise or any other phenomenon caused by the switching.

Further, the PAA weight control portion 346 (S103, S104, S116 through S119, and S110) changes the directivity of transmission of the interrogating wave $F_c$ when the predetermined time has passed after the moment of termination of the unit portion of the interrogating wave $F_c$. Accordingly, the effective angular range of the directivity of communication with the radio-frequency tag 14 can be set to correspond to the overlapping area of communications effected before and after the change of the directivity of transmission of the unit portion of the interrogating wave, by suitably determining the predetermined time.

Further, the PAA weight control portion 346 changes the direction of the main lobe of the directivity of transmission of the interrogating wave $F_c$, during the period between the moments of initiation and termination of the unit portion of the interrogating wave $F_c$. Accordingly, the overlapping area of communications effected before and after the change of the directivity of transmission of the unit portion of the interrogating wave $F_c$ can be practically changed as desired.

Further, the PAA weight control portion 346 changes the characteristic of directivity of transmission of the interrogating wave $F_c$ during the period between the moments of initiation and termination of transmission of the unit portion of the interrogating wave $F_c$. Accordingly, the overlapping area of communications effected before and after the change of the directivity of transmission of the unit portion of the interrogating wave $F_c$ can be practically changed as desired.

Further, the present radio-frequency tag communication device 312 is configured to change an electric energy of transmission of the interrogating wave $F_c$ during the period between the moments of initiation and termination of transmission of the unit portion of said interrogating wave $F_c$. Accordingly, the overlapping area of communications effected before and after the change of the directivity of transmission of the unit portion of the interrogating wave $F_c$ can be practically changed as desired.

Further, the PAA weight control portion 346 changes the directivity of transmission of the interrogating wave $F_c$ during the period between the moments of initiation and termination of transmission of the unit portion of the interrogating wave $F_c$, such that directions in which the directivity of transmission is maximum before and after the change of the directivity of transmission are symmetrical with each other with respect to an axis indicative of the predetermined reference direction. Accordingly, the overlapping area of communications effected before and after the change of the directivity of transmission of the unit portion of the interrogating wave $F_c$ can be practically changed with respect to the predetermined reference direction.

Further, the PAA weight control portion 346 changes the directivity of reception of the interrogating wave $F_c$ such that the above-described reference direction is the direction of the main lobe of the directivity of reception of the reply wave $F_r$ transmission from the radio-frequency tag in response to the interrogating wave $F_r$. Accordingly, the overlapping area of communications effected before and after the change of the directivity of transmission of the unit portion of the interrogating wave $F_c$ can be practically changed with respect to the direction in which the reply wave is received from the radio-frequency tag.

Further, the PAA weight control portion 346 (S110, S128 through S136) changes the directivity of transmission of the interrogating wave $F_c$ during the period between the moments of initiation and termination of transmission of the unit portion of the interrogating wave $F_c$, such that directions in which the directivity of transmission is maximum before and after the change of the directivity of transmission are symmetrical with each other with respect to an axis indicative of the predetermined reference direction, and such that the reference direction is changed each time the interrogating wave $F_c$ is transmitted toward the radio-frequency tag. Accordingly, the overlapping area of communications effected before and after the change of the directivity of transmission of the unit portion of the interrogating wave $F_c$ can be practically changed with respect to the predetermined reference direction, and the direction in which the radio-frequency tag 14 exists can be suitably detected, by gradually changing the reference direction.

Further, the PAA weight control portion 346 changes the directivity of transmission of the interrogating wave $F_c$ after a moment of initiation of reception of the reply wave $F_r$ from the radio-frequency tag 14 in response to the interrogating wave $F_c$, such that the direction of the main lobe of the directivity of transmission is parallel to the predetermined reference direction. Accordingly, the direction of the main lobe of the directivity of transmission is made coincident with the direction in which the radio-frequency tag 14 to be detected is located, so that the radio-frequency tag 14 can be suitably supplied with an electric energy.

Further, the PAA weight control portion 436 changes the directivity of transmission of the interrogating wave $F_c$ after a moment of initiation of reception of the reply wave $F_r$ from the radio-frequency tag 14 in response to said interrogating wave $F_c$, such that the main lobe of the directivity of transmission is substantially coincident with the overlapping area of communications before and after the change of the directivity of transmission. In this case, the direction of the main lobe of the directivity of transmission is made coincident with the direction in which the radio-frequency tag 14 to be detected is located, so that the radio-frequency tag 14 can be suitably supplied with an electric energy.

Further, the PAA weight control portion 346 changes the directivity of transmission of the interrogating wave $F_c$ such that an area of overlapping of the main lobes of the directivity of transmission before and after the change of the directivity of transmission of the unit portion of the interrogating wave $F_c$ is narrowed each time the interrogating wave $F_c$ is transmitted toward the radio frequency tag 14. In this case, the direction in which the radio-frequency tag 14 exists can be suitably detected, by narrowing the effective angular range of the directivity of communication with the radio-frequency tag 14.

While the preferred embodiment of the third aspect of this invention have been described above in detail by reference to the drawings, it is to be understood that the third aspect is not limited to the details of the illustrated embodiment, but may be otherwise embodied.

In the illustrated embodiment, the transmission weight multiplying portion 328, reception weight multiplying portion 338, PAA weight control portion 346, etc. are discrete control devices. However, these transmission weight multiplying portion 328, reception weight multiplying portion 338, PAA weight control portion 346, etc. may be replaced by functional portions of a DSP (Digital Signal Processor) which is a so-called microcomputer system which incorporates a CPU, a ROM, a RAM and which operates to perform signal processing operations according to programs stored in the ROM, while utilizing a temporary data storage function of the RAM. The above-described control portions may be controlled by either digital or analog signal processing operations.

In the illustrated embodiment, the PAA weight control portion 346 is provided to apply the transmission PAA weights to the transmission weight multiplying portion 328 and to apply the reception PAA weights to the reception weight multiplying portion 338. However, a transmission PAA weight control portion to set the transmission PAA weights, and a reception PAA weight control portion to set the reception PAA weights may be provided independently of each other.

In the illustrated embodiment, the directivity of communication with the radio-frequency tag 14 is controlled by the PAA (Phased Array Antenna) processing. However, the principle of the present invention is equally applicable to a radio-frequency tag communication device in which the directivity of communication with the radio-frequency tag 24 is controlled by AAA (Adaptive Array Antenna) processing or other suitable processing.

The radio-frequency tag communication devices 312 according to the illustrated embodiment is provided with the transmitter/receiver antenna elements 330 commonly used to transmit the transmitted signal and to receive the reply signal transmitted from the radio-frequency tag 14 in response to the transmitted signal. However, the radio-frequency tag communication device may be provided with a transmitter antenna device for transmitting the transmitted signal and a receiver antenna device for receiving the received signals, which transmitter and receiver antenna devices are independent of each other.

It is to be understood that the present invention may be embodied with various other changes and modifications, without departing from the sprint of the present invention.

What is claimed is:

1. A radio-frequency tag communication device configured to transmit an interrogating wave toward a desired radio-frequency tag and to receive a reply wave transmitted from the radio-frequency tag, for thereby effecting radio communication with the radio-frequency tag, said radio-frequency tag communication device comprising:

a directivity control portion configured to change a directivity of transmission of said interrogating wave during a period between moments of initiation and termination of transmission of a unit portion of the interrogating wave, which unit portion permits the radio communication with the radio-frequency tag, wherein said directivity control portion changes the directivity of transmission of the interrogating wave during the period between the moments of initiation and termination of transmission of the unit portion of the interrogating wave, such that effective areas of communication corresponding to the directivity of transmission before and after a change of the directivity of communication partially overlap each other.

2. The radio-frequency tag communication device according to claim 1, wherein said directivity control portion changes the directivity of transmission such that an overlapping area of communications before and after the change of the directivity of transmission is narrower than a sum of the effective area of communication corresponding to the directivity of transmission before said change and the effective area of communication corresponding to the directivity of transmission after said change.

3. The radio-frequency tag communication device according to claim 1, wherein said directivity control portion is capable of changing an overlapping area of communications before and after the change of the directivity of transmission.

4. The radio-frequency tag communication device according to claim 1, wherein said unit portion permits the radio communication with the radio-frequency tag and includes a command portion including a command for radio communication with the radio-frequency tag, and a non-command portion not including said command.

5. The radio-frequency tag communication device according to claim 4, wherein said directivity control portion changes the directivity of transmission of said interrogating wave during the period between the moments of initiation and termination of transmission of said command portion.

6. The radio-frequency tag communication device according to claim 4, wherein said directivity control portion changes the directivity of transmission of said interrogating wave during a period of initiation and termination of transmission of said non-command portion, after the transmission of said command portion.

7. The radio-frequency tag communication device according to claim 4, wherein said directivity control portion changes the directivity of transmission of said interrogating wave at a moment of switching from the transmission of said command portion to the transmission of said non-command portion.

8. The radio-frequency tag communication device according to claim 1, wherein said directivity control portion changes the directivity of transmission of said interrogating wave when a predetermined time has passed after the moment of termination of said unit portion of the interrogating wave.

9. The radio-frequency tag communication device according to claim 1, wherein said directivity control portion changes a direction of a main lobe of the directivity of transmission of said interrogating wave, during the period between the moments of initiation and termination of said unit portion of the interrogating wave.

10. The radio-frequency tag communication device according to claim 1, wherein said directivity control portion changes a shape of the main lobe during the period between the moments of initiation and termination of transmission of said unit portion of the interrogating wave.

11. The radio-frequency tag communication device according to claim 1, which is configured to change an electric energy of transmission of said interrogating wave during the period between the moments of initiation and termination of transmission of said unit portion of the interrogating wave.

12. The radio-frequency tag communication device according to claim 1, wherein said directivity control portion changes the directivity of transmission of said interrogating wave during the period between the moments of initiation and termination of transmission of said unit portion of the interrogating wave, such that directions in which the directivity of transmission is maximum before and after a change of the directivity of transmission are symmetrical with each other with respect to an axis indicative of a predetermined reference direction.

13. The radio-frequency tag communication device according to claim 12, wherein said predetermined reference direction is a direction of main lobe of a directivity of reception of said reply wave transmission from the radio-frequency tag in response to said interrogating wave.

14. The radio-frequency tag communication device according to claim 1, wherein said directivity control portion changes the directivity of transmission of said interrogating wave during the period between the moments of initiation and termination of transmission of said unit portion of the interrogating wave, such that directions in which the directivity of transmission is maximum before and after a change of the directivity of transmission are symmetrical with each other with respect to an axis indicative of a predetermined reference direction, said directivity control portion changing said reference direction each time the interrogating wave is transmitted toward said radio-frequency tag.

15. The radio-frequency tag communication device according to claim 12, wherein said directivity control portion changes the directivity of transmission of said interrogating wave after a moment of initiation of reception of said reply wave from said radio-frequency tag in response to said interrogating wave, such that a direction of a main lobe of the directivity of transmission is parallel to said predetermined reference direction.

16. The radio-frequency tag communication device according to claim 1, wherein said directivity control portion changes the directivity of transmission of said interrogating wave after a moment of initiation of reception of said reply wave from said radio-frequency tag in response to said interrogating wave, such that a main lobe of the directivity of transmission is substantially coincident with the overlapping area of communications before and after the change of the directivity of transmission.

17. The radio-frequency tag communication device according to claim 1, wherein said directivity control portion changes the directivity of transmission of said interrogating wave such that an area of overlapping of main lobes of the directivity of transmission before and after a change of the directivity of transmission of said unit portion of the interrogating wave is narrowed each time the interrogating wave is transmitted toward said radio frequency tag.

* * * * *